Jan. 9, 1962   M. KRUSKAL ET AL   3,016,342
CONTROLLED NUCLEAR FUSION REACTOR
Filed Aug. 29, 1957   25 Sheets-Sheet 1

WITNESSES:

INVENTORS
Sterling A. Colgate, Martin Kruskal
Marshall Rosenbluth, James L. Tuck
BY Jan. 9, 1962　　　M. KRUSKAL ET AL　　　3,016,342
CONTROLLED NUCLEAR FUSION REACTOR
Filed Aug. 29, 1957　　　　　　　　　　　　25 Sheets-Sheet 3
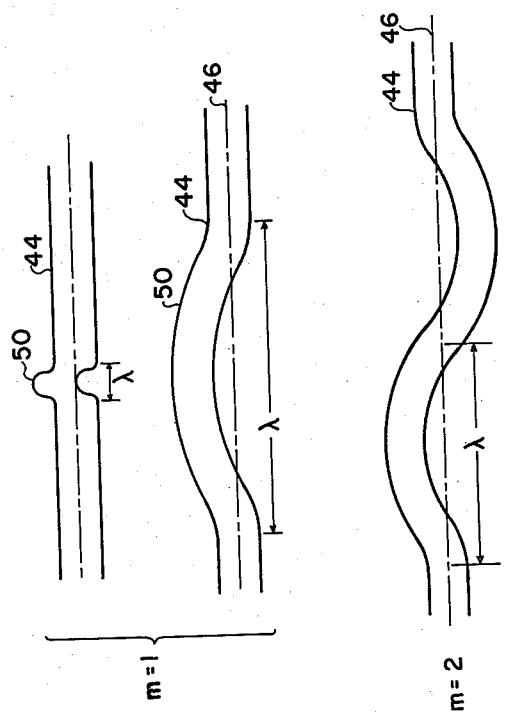
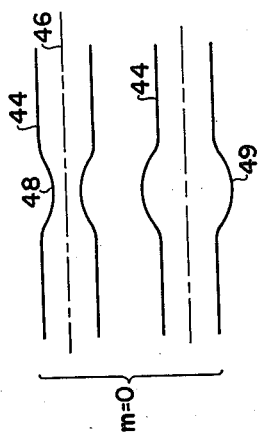
Fig. 4
INVENTORS
Sterling A. Colgate, Martin Kruskal
Marshall Rosenbluth, James L. Tuck
BY Jan. 9, 1962 M. KRUSKAL ET AL 3,016,342
CONTROLLED NUCLEAR FUSION REACTOR
Filed Aug. 29, 1957 25 Sheets-Sheet 4

WITNESSES:

INVENTORS
Sterling A.Colgate, Martin Kruskal
Marshall Rosenbluth, James L.Tuck
BY Jan. 9, 1962 M. KRUSKAL ET AL 3,016,342
CONTROLLED NUCLEAR FUSION REACTOR
Filed Aug. 29, 1957 25 Sheets-Sheet 9

WITNESSES:
S. Frederick Damann
Henry Heyman

INVENTORS
Sterling A. Colgate, Martin Kruskal
Marshall Rosenbluth, James L. Tuck
BY INVENTORS
Sterling A. Colgate, Martin Kruskal
Marshall Rosenbluth, James L. Tuck INVENTOR.
Sterling A. Colgate, Martin Kruskal
Marshall Rosenbluth, James L. Tuck INVENTORS
Sterling A. Colgate, Martin Kruskal
Marshall Rosenbluth, James L. Tuck INVENTOR.
Sterling A. Colgate, Martin Kruskal
Marshall Rosenbluth, James L. Tuck
BY

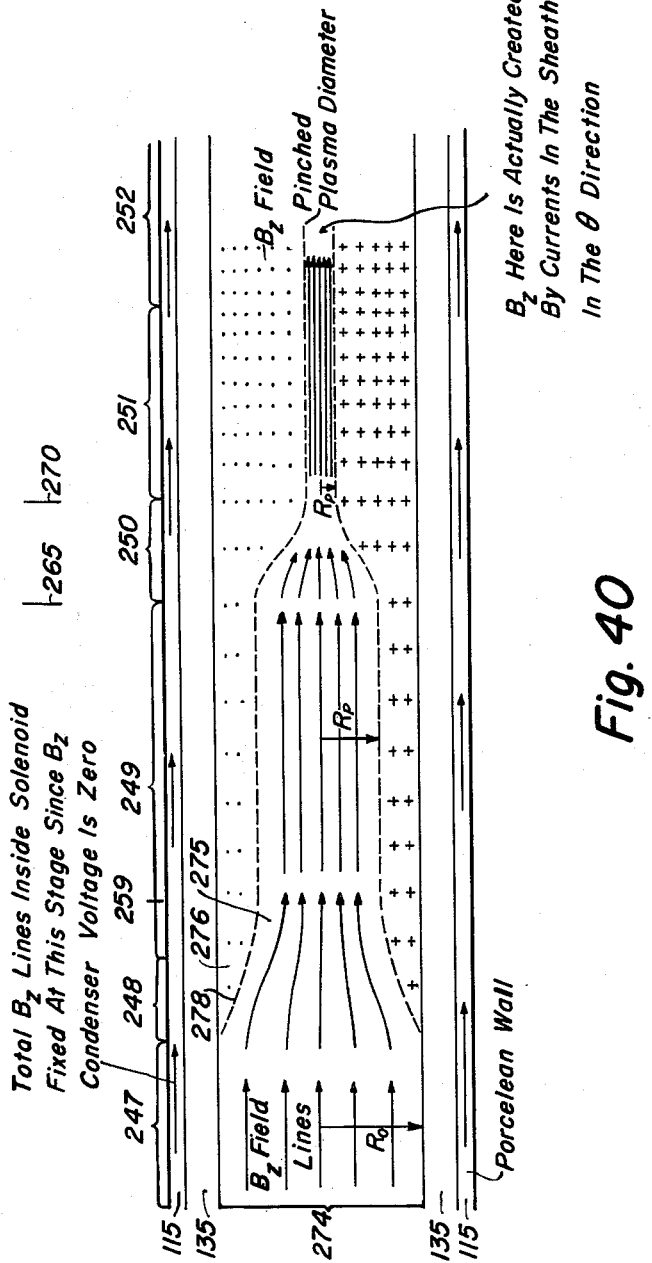

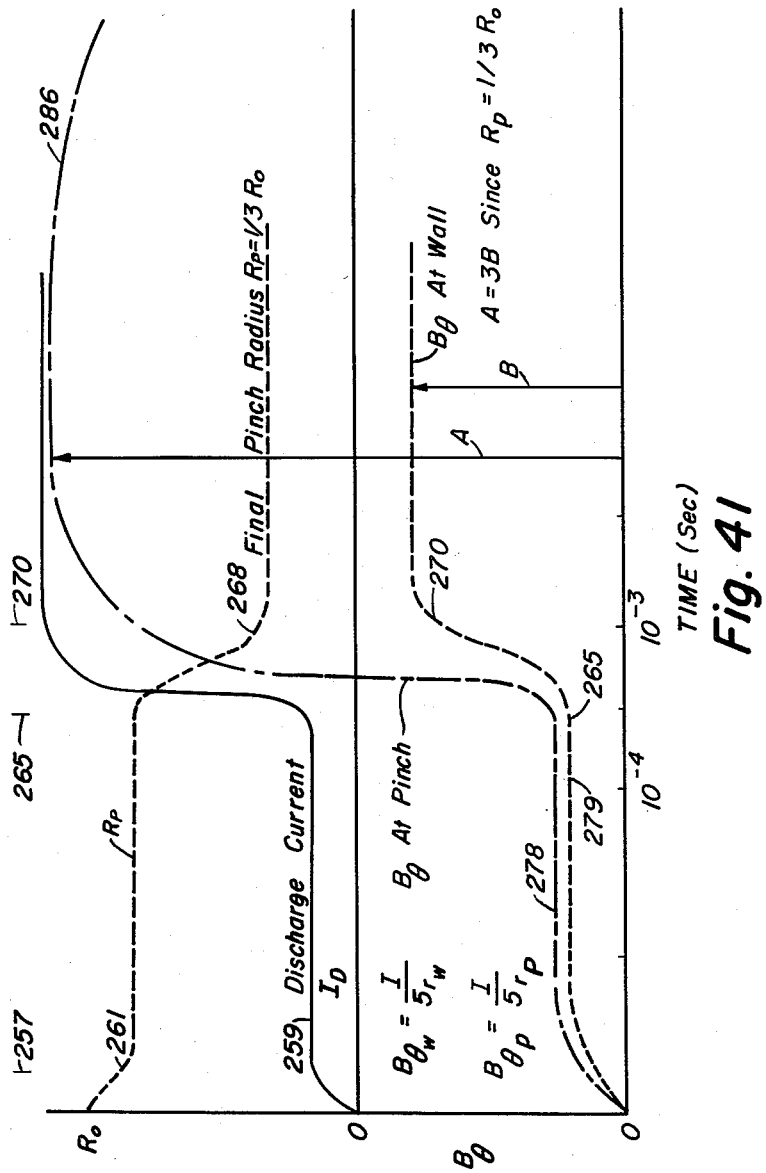

United States Patent Office 3,016,342
Patented Jan. 9, 1962

3,016,342
CONTROLLED NUCLEAR FUSION REACTOR
Martin Kruskal, Princeton, N.J., James L. Tuck, Los Alamos, N. Mex., and Stirling A. Colgate, Livermore, and Marshall N. Rosenbluth, San Diego, Calif., assignors to the United States of America as represented by the United States Atomic Energy Commission
Filed Aug. 29, 1957, Ser. No. 685,771
3 Claims. (Cl. 204—193.2)
(Filed under Rule 47(a) and 35 U.S.C. 116)

The present invention relates to extremely high temperature producing systems, and more particularly to controlled nuclear fusion reactors involving the generation of temperatures of the order of $10^8$ degrees Kelvin, and the creation of a copious supply of radiation in the form of neutrons, bremsstrahlung, and charged particles.

In general there are two ways in which nuclear reactions may be made to take place. The first of these methods involves increasing the temperature of a volume of gas to the region of a million degrees Kelvin, whereby the nuclei will acquire sufficient kinetic energy to overcome the electrostatic repulsion which normally prevents interaction. This method is generally referred to as a thermonuclear reaction, and takes place in the sun and stars. The second method involves the bombardment of stationary target nuclei by other nuclei which, for example, have been accelerated by such devices as the cyclotron, synchrocyclotron, etc., until they have relative velocities equivalent to many million degrees.

The present invention is particularly concerned with the first of these two methods, and has as its general objective the creation of temepratures in a suitable fuel of approximately 100 million degrees K.

It is not certain that thermonuclear fusion, or a controlled thermonuclear reactor with net power output can be obtained with the present invention, however, these are goals that may be achieved using the disclosed device or through improvements therein.

The present description incorporates terminology such as "thermonuclear," "thermonuclear reaction," "thermonuclear fuel," and "controlled thermonuclear reactor." These terms are applied in the theoretical sense and are not to be taken as an assertion that the present invention has achieved thermonuclear reactions or has been proved to be a controlled thermonuclear reactor with sustained, net power output. In a similar manner, the terms "nuclear fusion," "nuclear fusion reaction," "nuclear fuel," and "controlled nuclear fusion reactor" are also used and, again, these terms are not to be taken as an assertion that the present invention has produced a thermonuclear reaction, or a controlled thermonuclear reaction with a net power output.

The attainment of this objective involves the acceleration of nuclei of a gaseous thermonuclear fuel in such a manner that the velocity distribution of the gas is random, and each nucleus is subjected to frequent collisions. Thus, the nuclei will not be accelerated lineally, as is the case in linear accelerators or accelerated particle beam sources, but will be accelerated in a random manner thereby increasing the kinetic energy of random motion of each particle and consequently the temperature of the gas.

More specifically, it is the object of the present invention to provide an apparatus for creating and controlling a nuclear fusion reaction.

Another object of the present invention is to provide such an apparatus for creating and controlling a nuclear fusion reaction in an economical way so that the nuclear fusion energy output exceeds the electrical energy input, leaving a balance of useful energy.

A further object of the present invention is to provide such an apparatus for creating and controlling a nuclear fusion reaction from which useful energy may be extracted, wherein a gas is ionized and so energized as to attain the temperatures required to obtain a nuclear fusion reaction.

A still further object of the present invention is to provide such an apparatus for producing and utilizing nuclear fusion energy wherein a gas is ionized, and partially pinched in the presence of an axial magnetic field during which the plasma is joule or resistively heated in the first stage, and wherein said plasma is further heated in the second stage by the intermixing or interdiffusion of the axial and pinching magnetic fields, and maintained stable without contacting the surrounding walls because of the presence of the axial magnetic field which is predominantly in the interior of the plasma, and the presence of conducting walls in the reaction vessel; these features having the effect of maintaining the system stable and in a condition for producing nuclear fusion energy for a longer time than would have been the case without their use.

A still further object of the present invention is to provide such an apparatus for creating and controlling nuclear fusion reaction utilizing an energized, ionized, stabilized, pinched, current carrying gas, wherein said gas consists of a thermonuclear fuel.

A still further object of the present invention is to provide such method and apparatus for creating and controlling nuclear fusion reaction utilizing an ionized, energized, stabilized, pinched, current carrying thermonuclear fuel in the form of a gas, wherein the pinched plasma is stable for long periods of time and thus the nuclear fusion reaction takes place for long periods of time.

A still further object of the present invention is to provide such an apparatus for creating and controlling a nuclear fusion reaction utilizing an ionized, energized, pinched, current carrying thermonuclear fuel in the form of a gas, said pinched current carrying gas or plasma being stabilized for long periods of time wherein the energy liberated by said method and in said apparatus includes energy in the form of bremsstrahlung, and accelerated neutrons, protons, tritons, $He^3$, and alpha particles.

The objects and advantages as well as the relationship of the various considerations and theories outlined below will become more apparent from the following description of the several embodiments of the invention, including also certain novel structures illustrated in the annexed drawings hereby made a part of this specification, wherein:

FIGURE 4 is a schematic representation of the various pinch instabilities,

Figure 5:
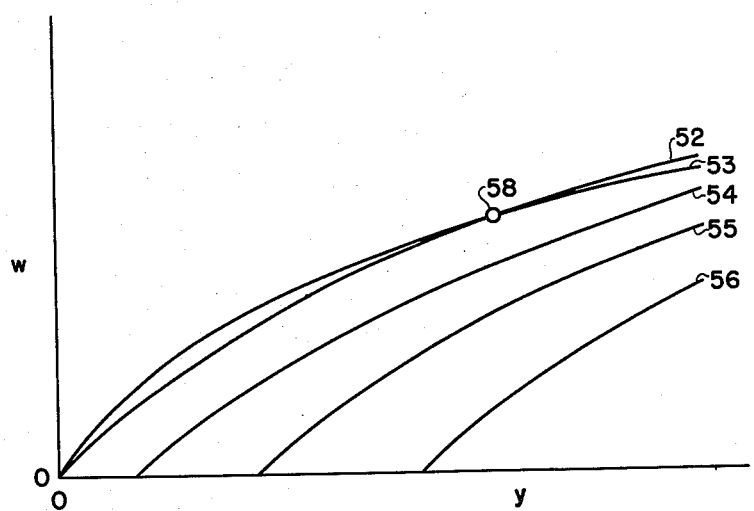
Figure 6:
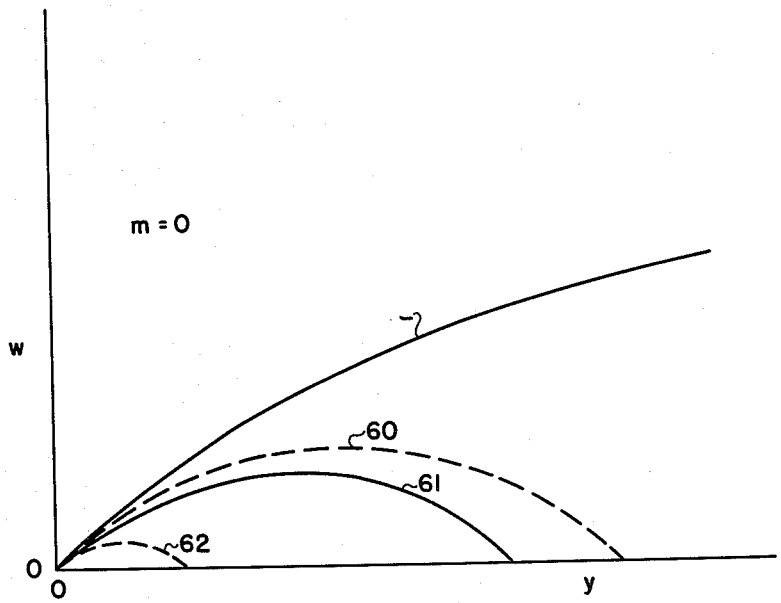
Figure 7:
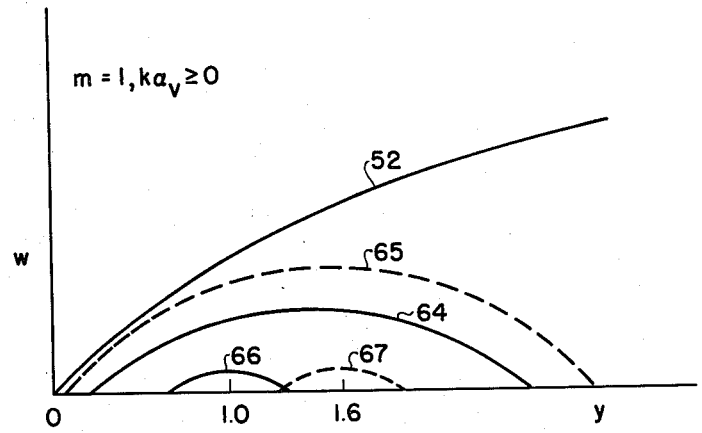
Figure 8:
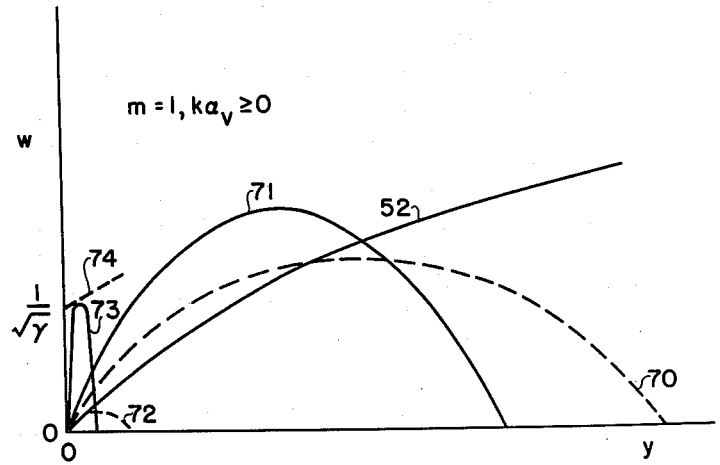
Figure 9:
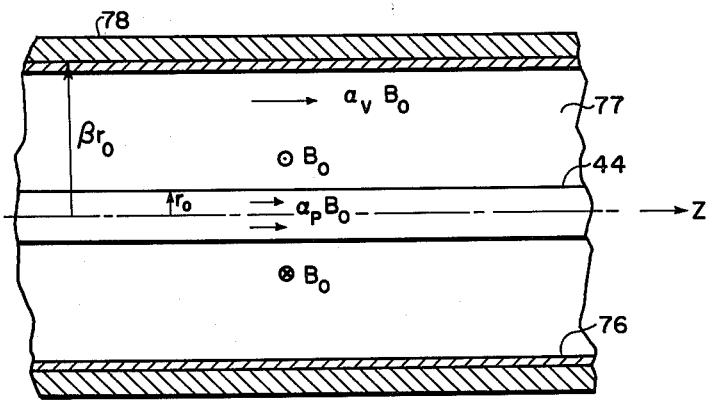
Figure 10:
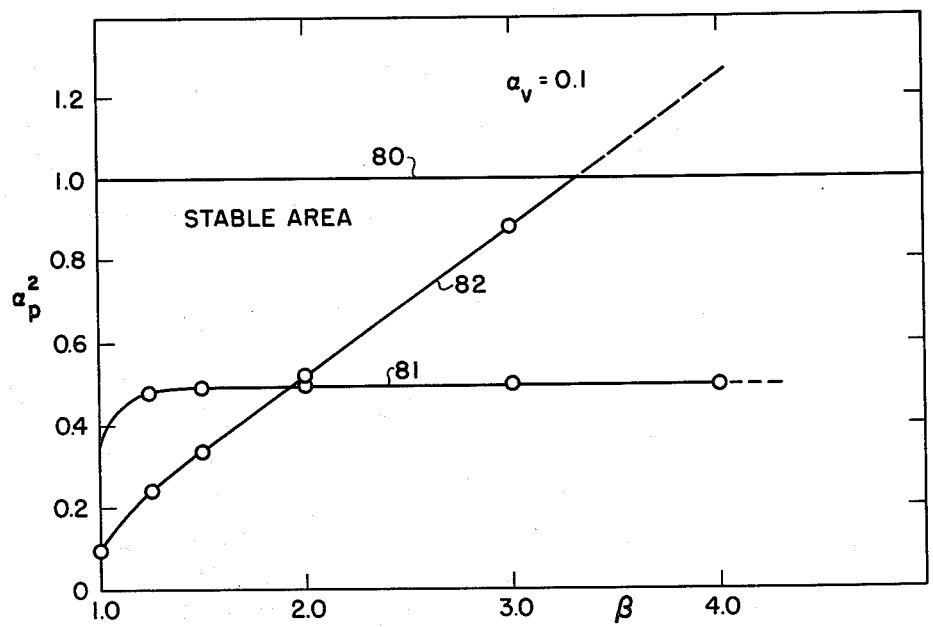
Figure 12:
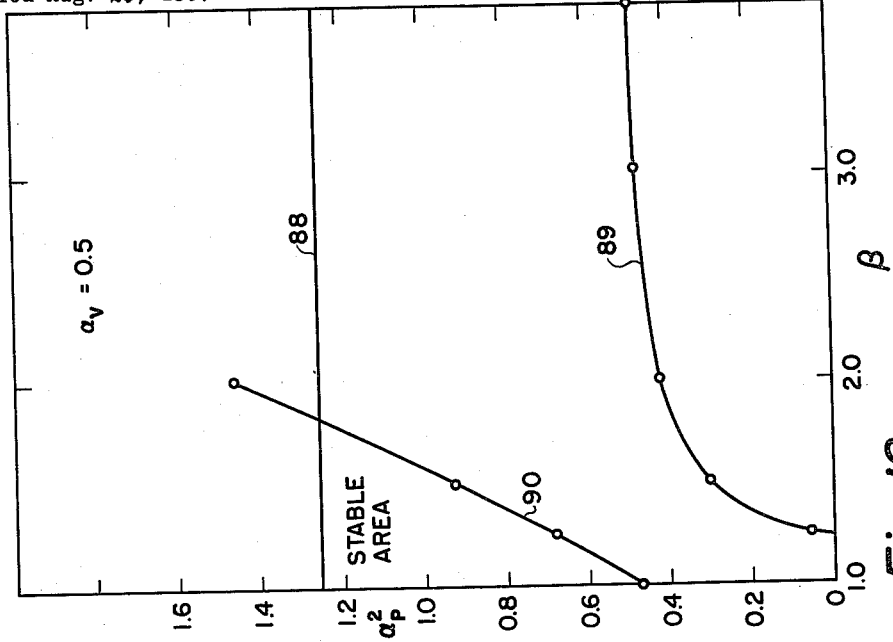
Figure 11:
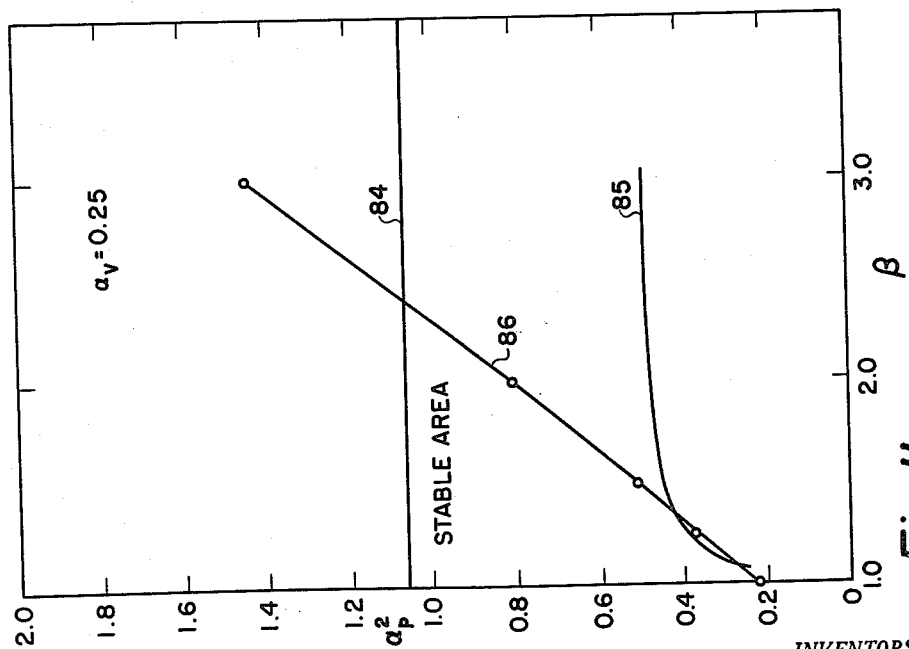
Figure 13:
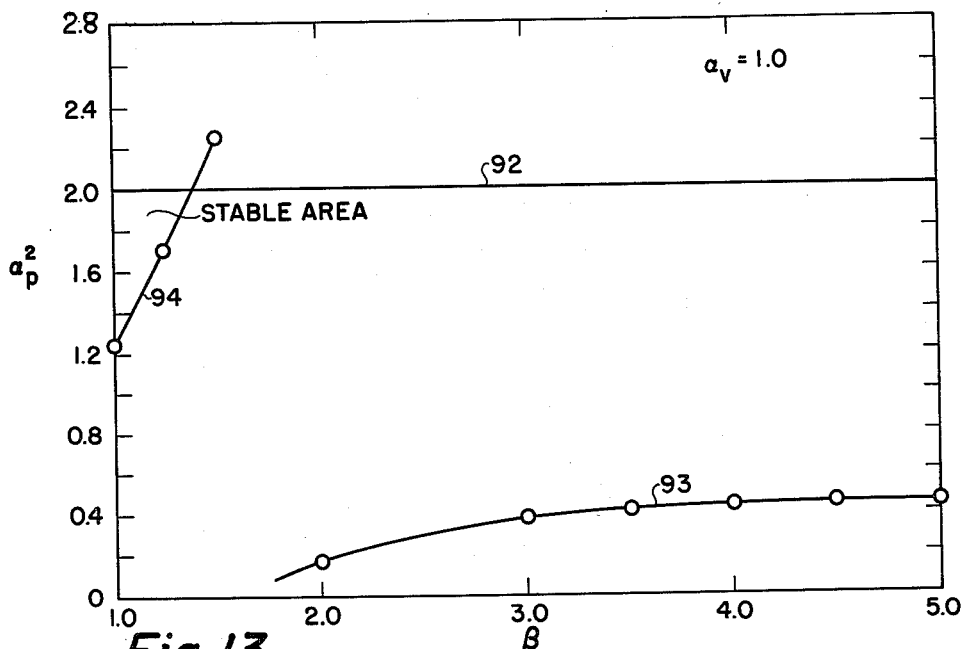
Figure 14:
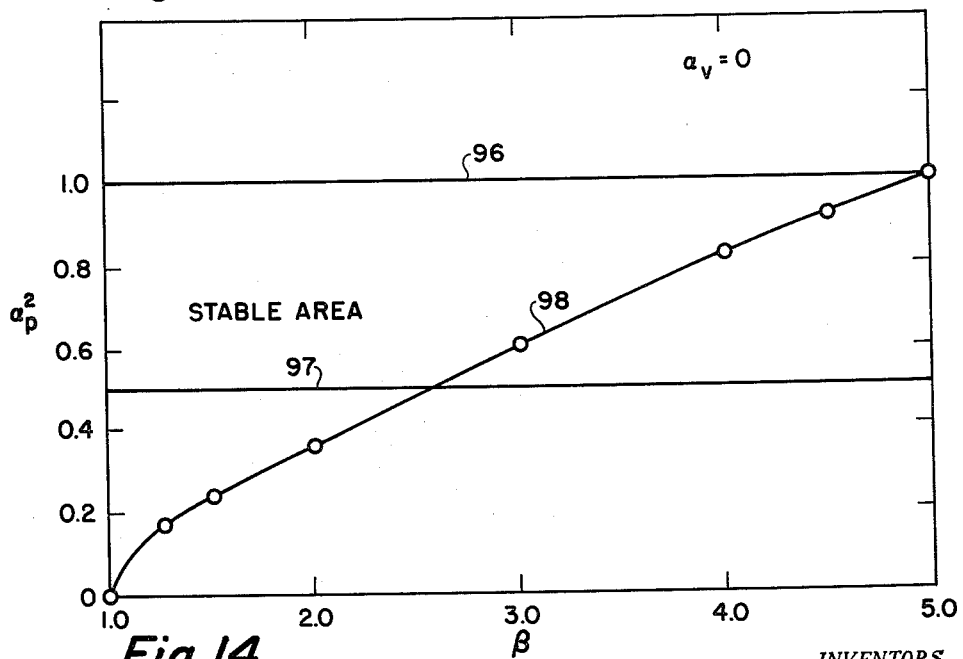
Figure 15:
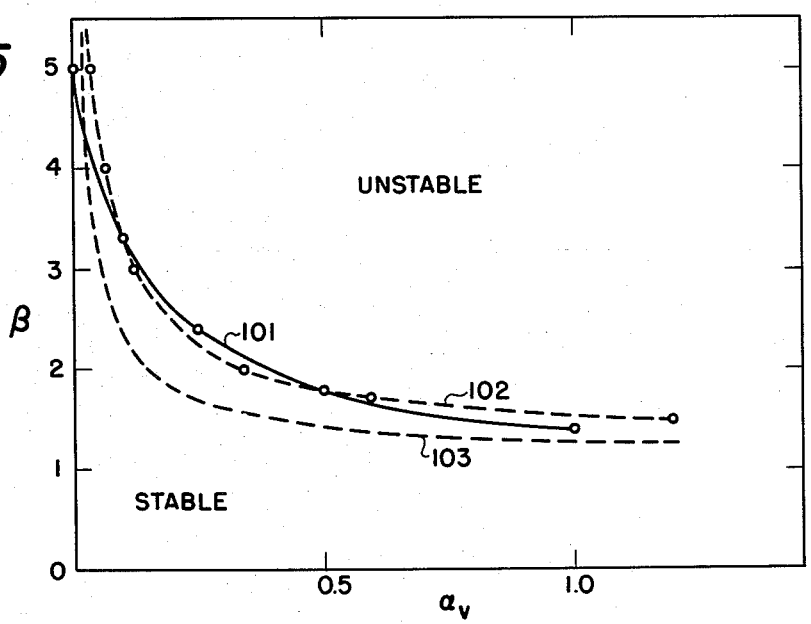
Figure 16:
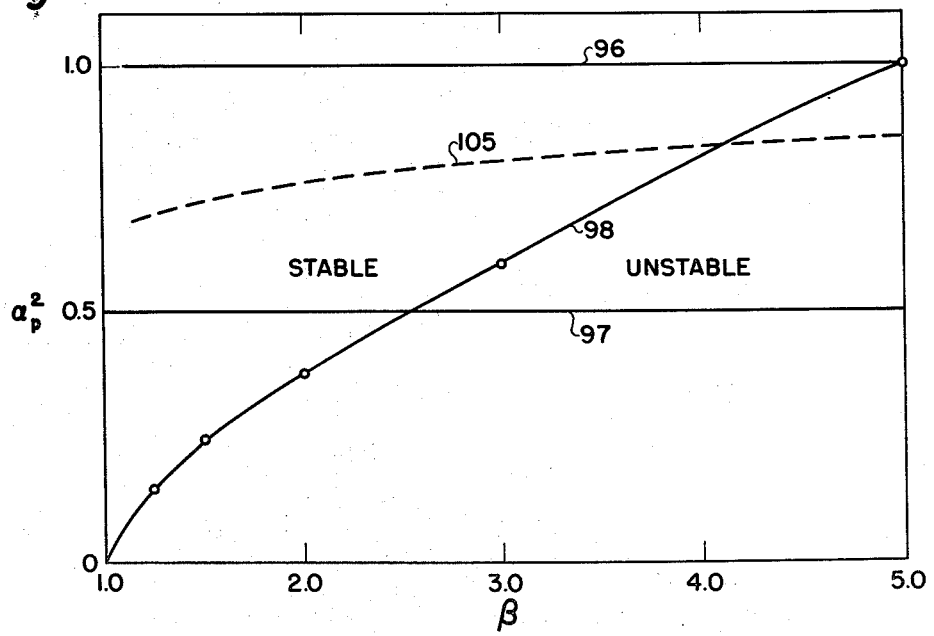
Figure 17:
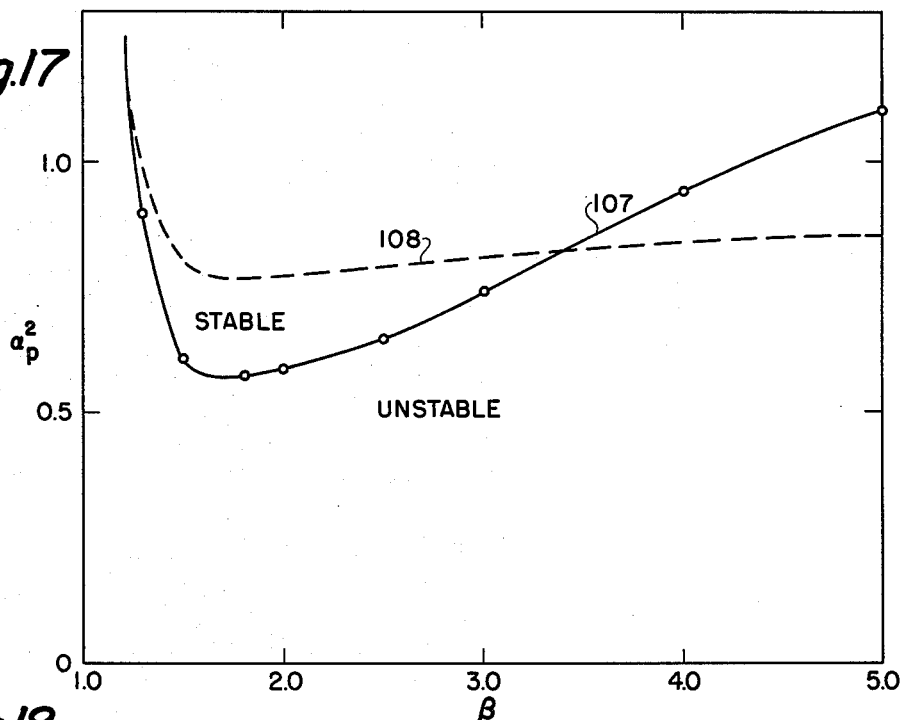
Figure 18:
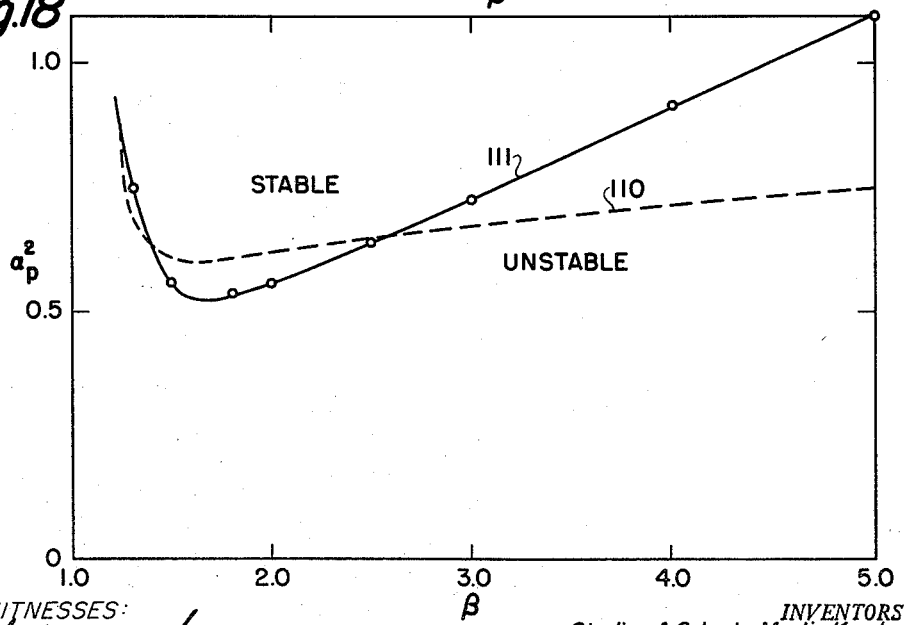
Figure 19:
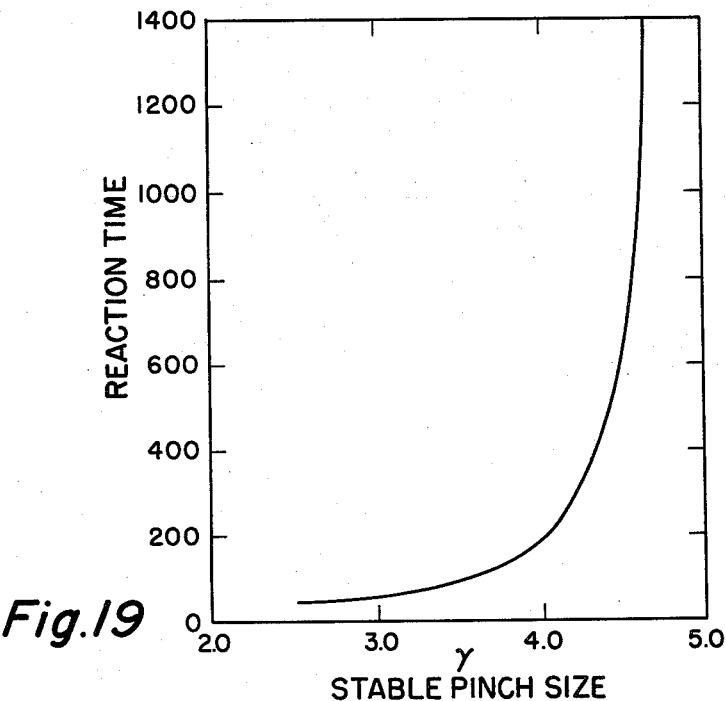
Figure 20:
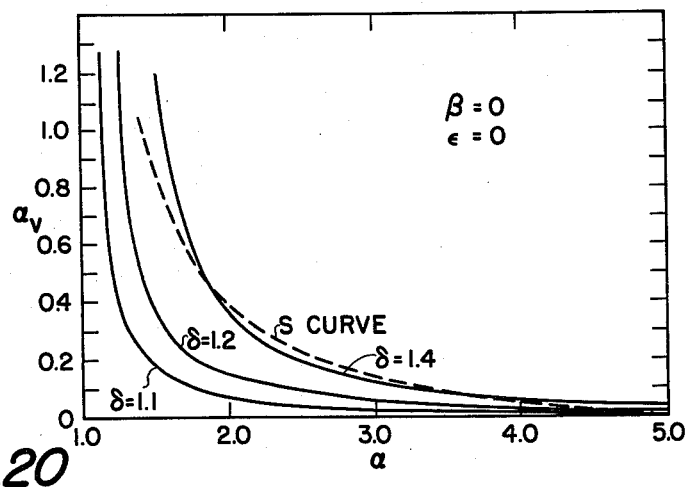
Figure 21:
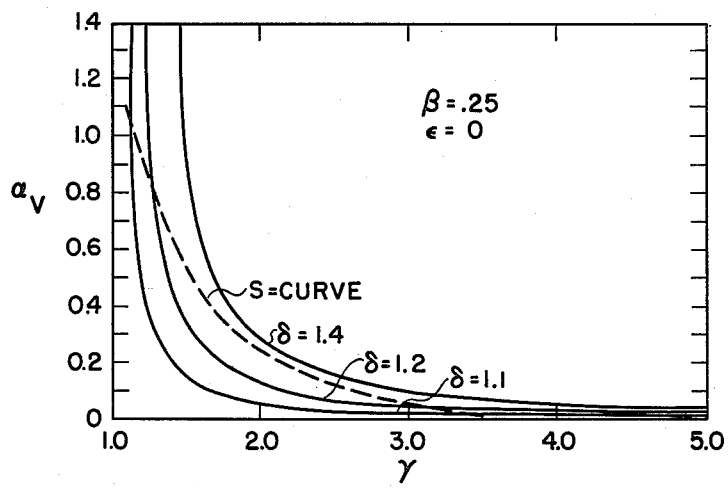
Figure 22:
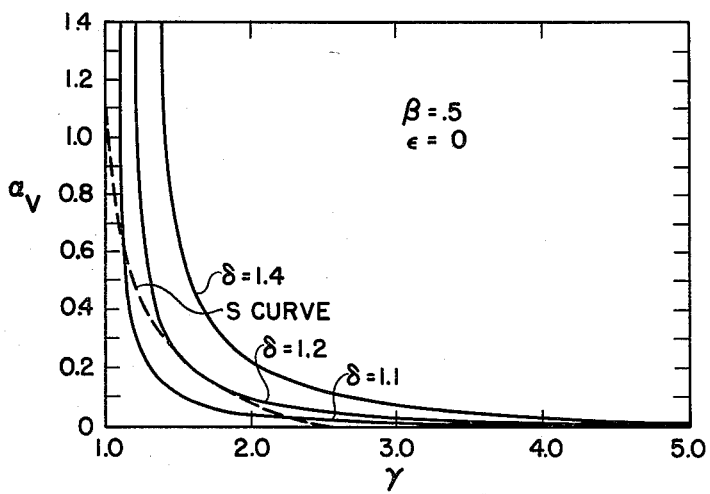
Figure 23:
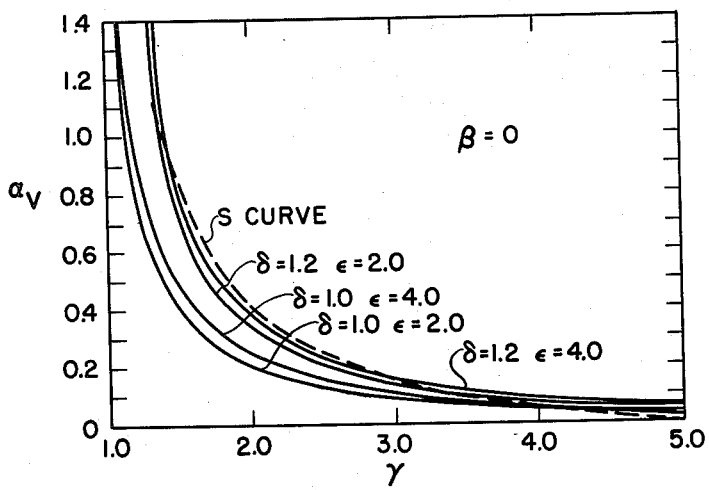
Figure 24:
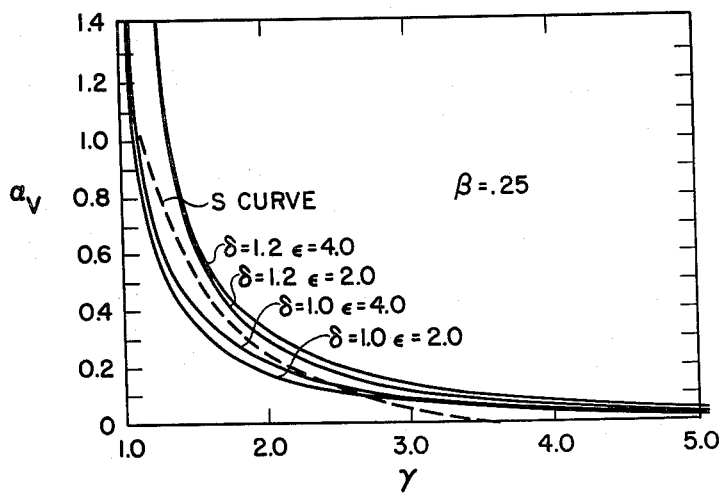
Figure 25:
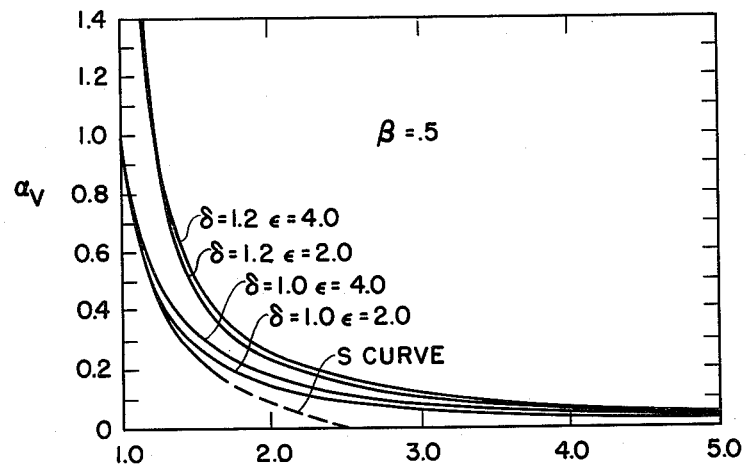
Figure 26:
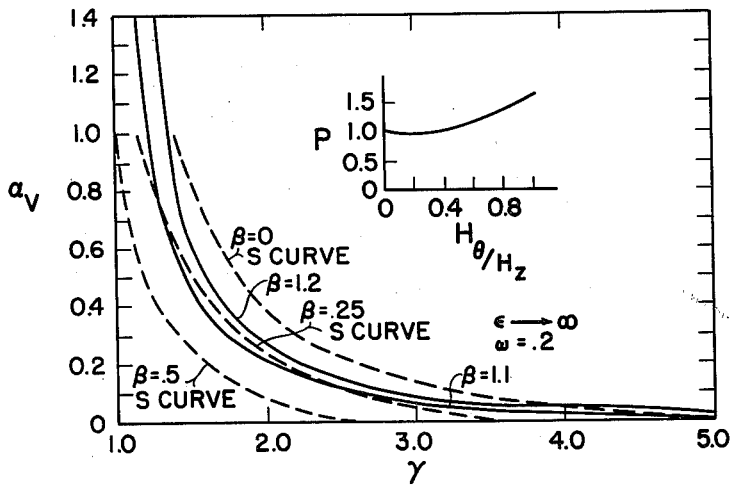
Figure 27:
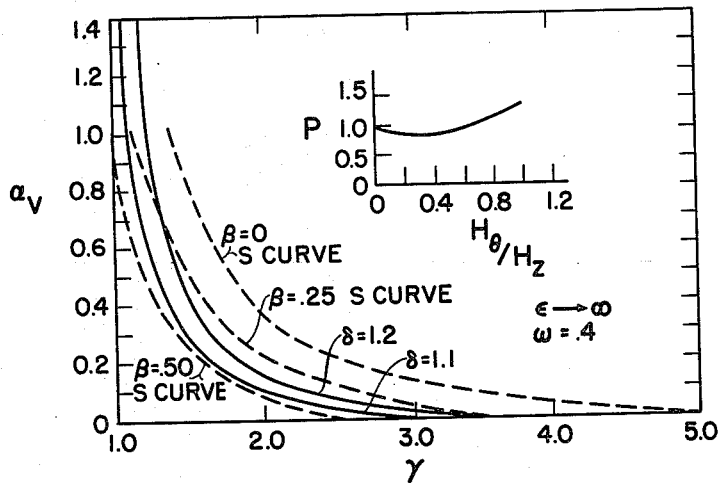
Figure 28:
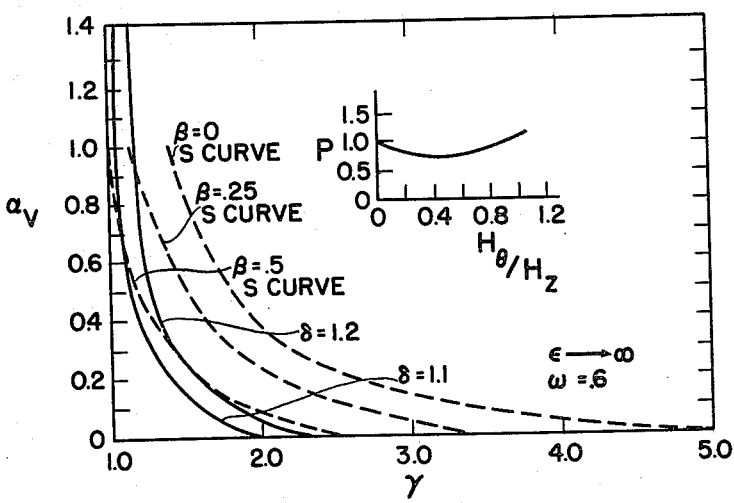
Figure 29:
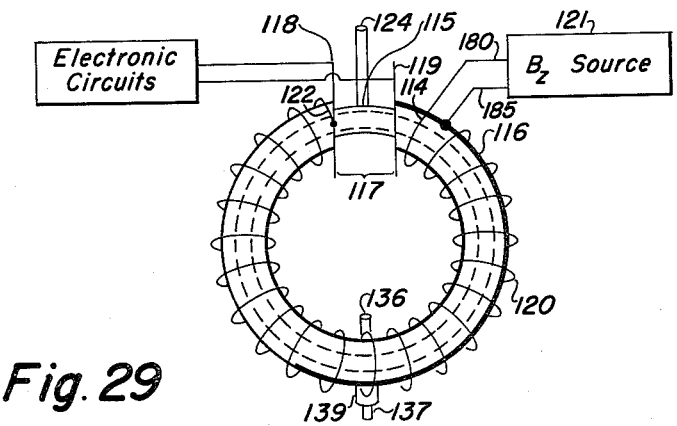
Figure 30:
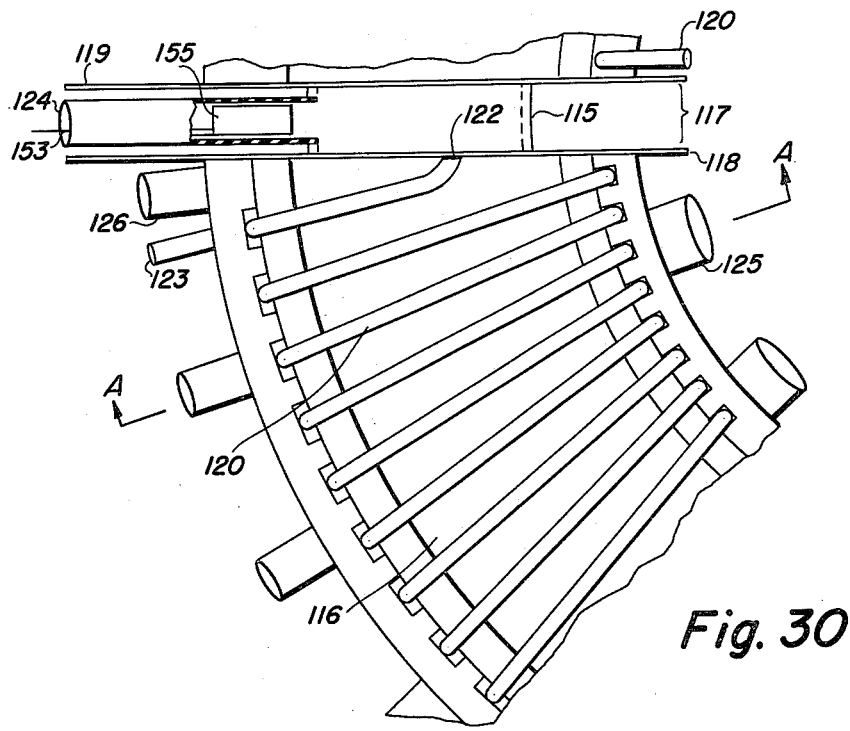
Figure 31:
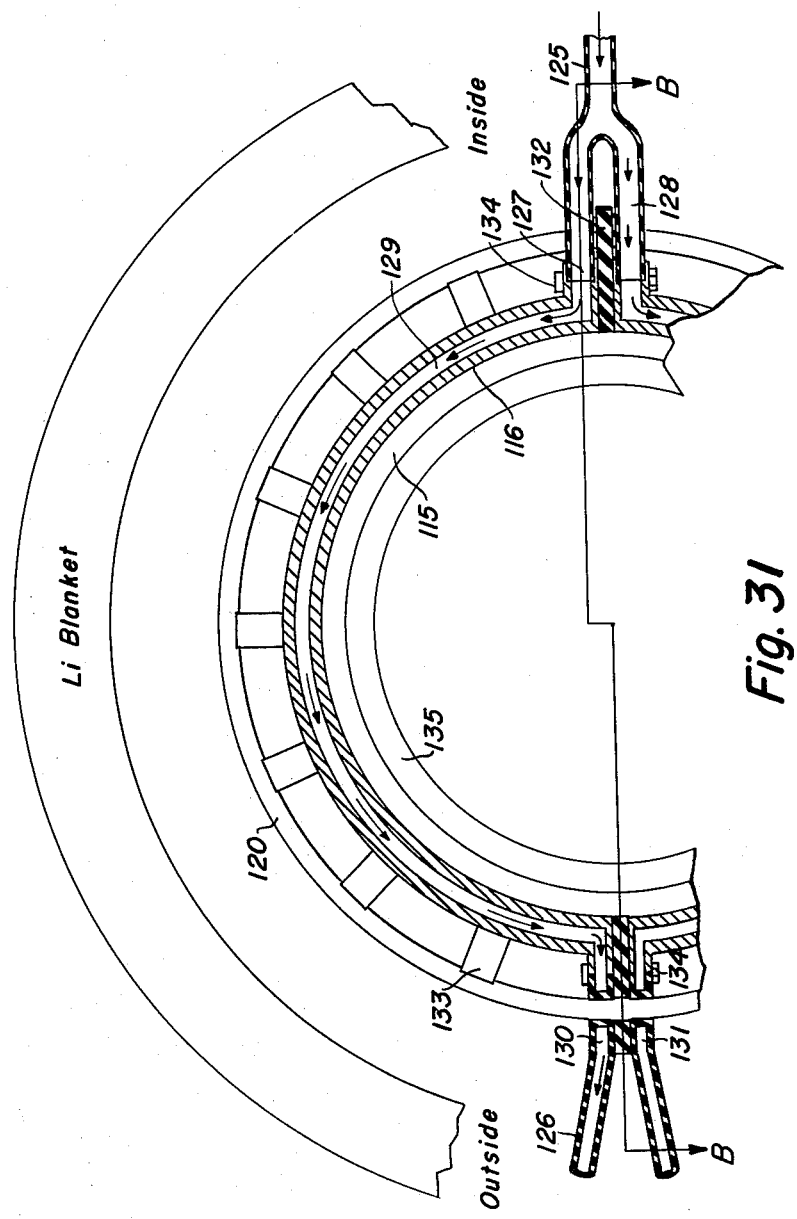
Figure 32:
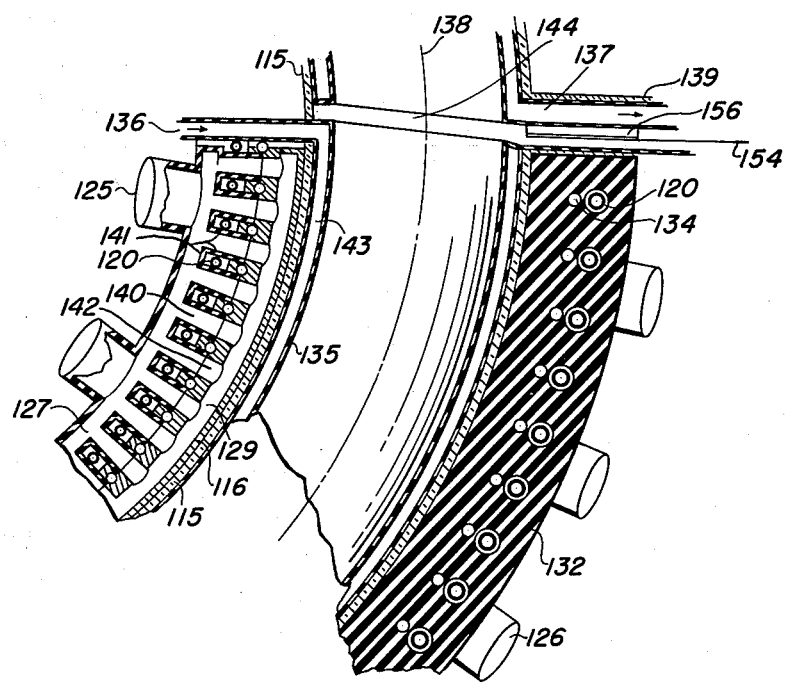
Figure 33:
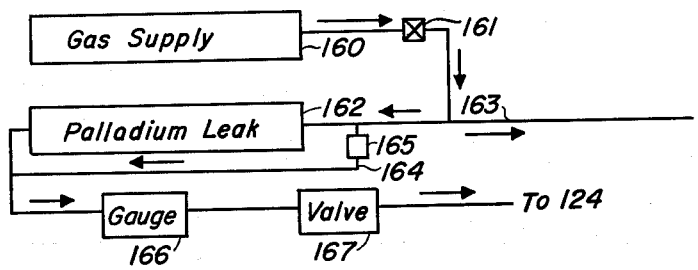
Figure 34:
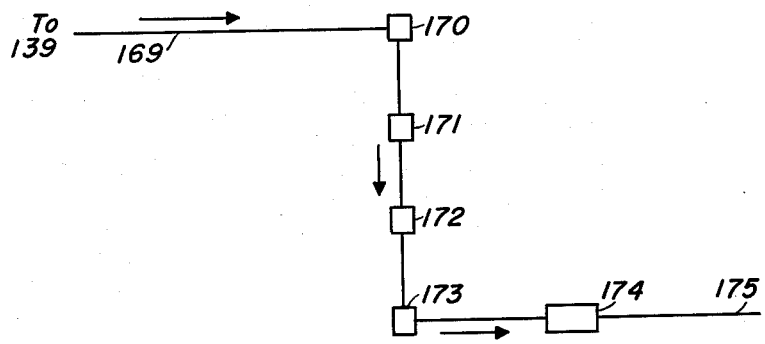
Figure 35:
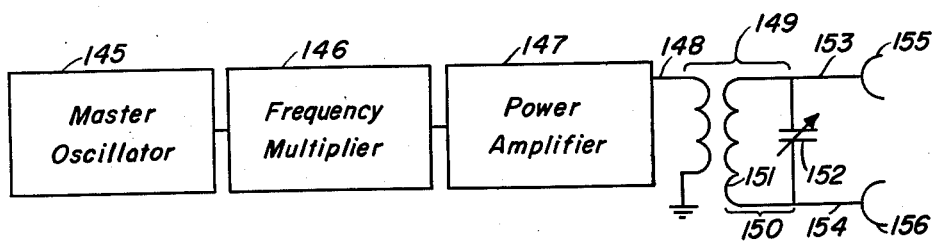
Figure 36:
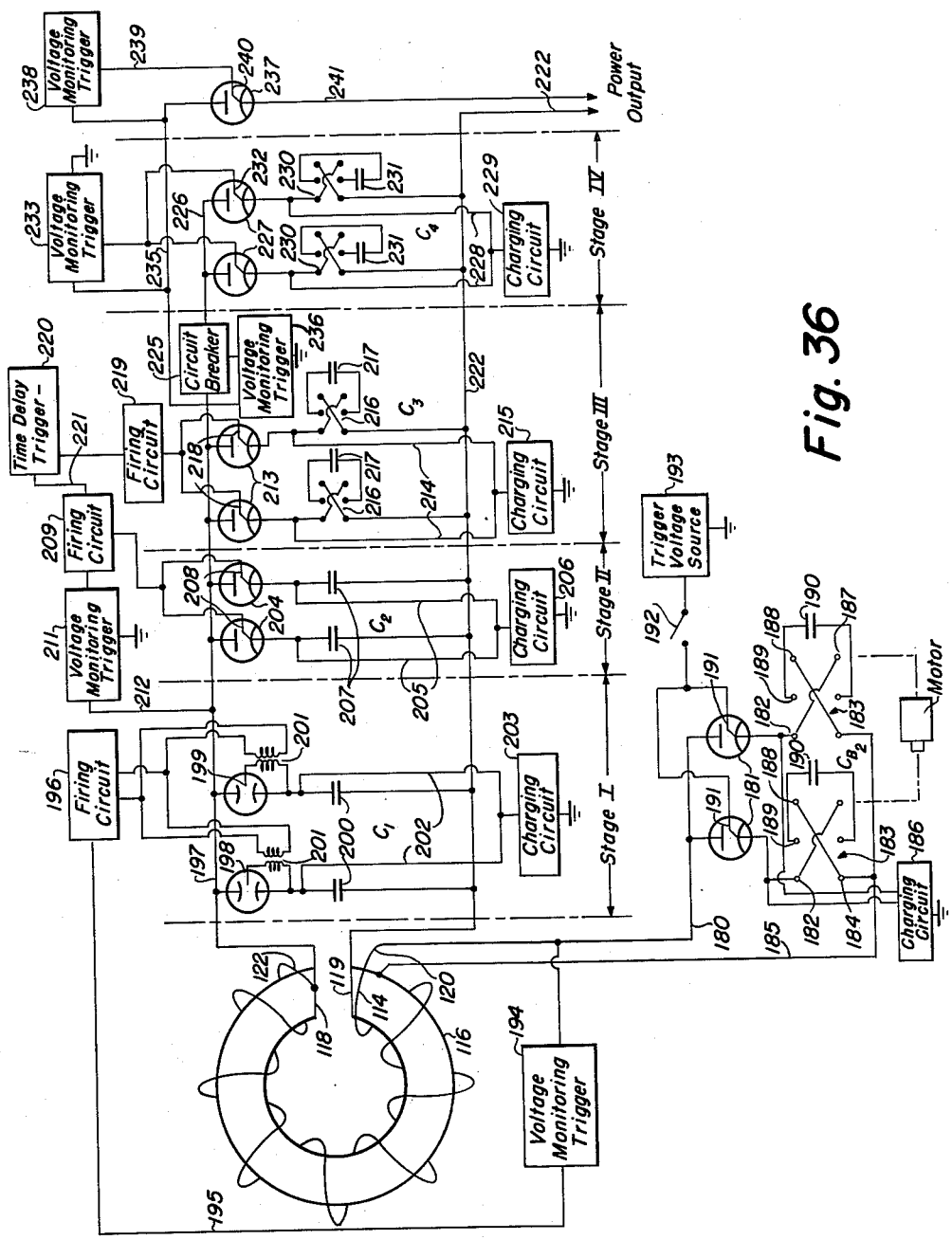
Figure 37:
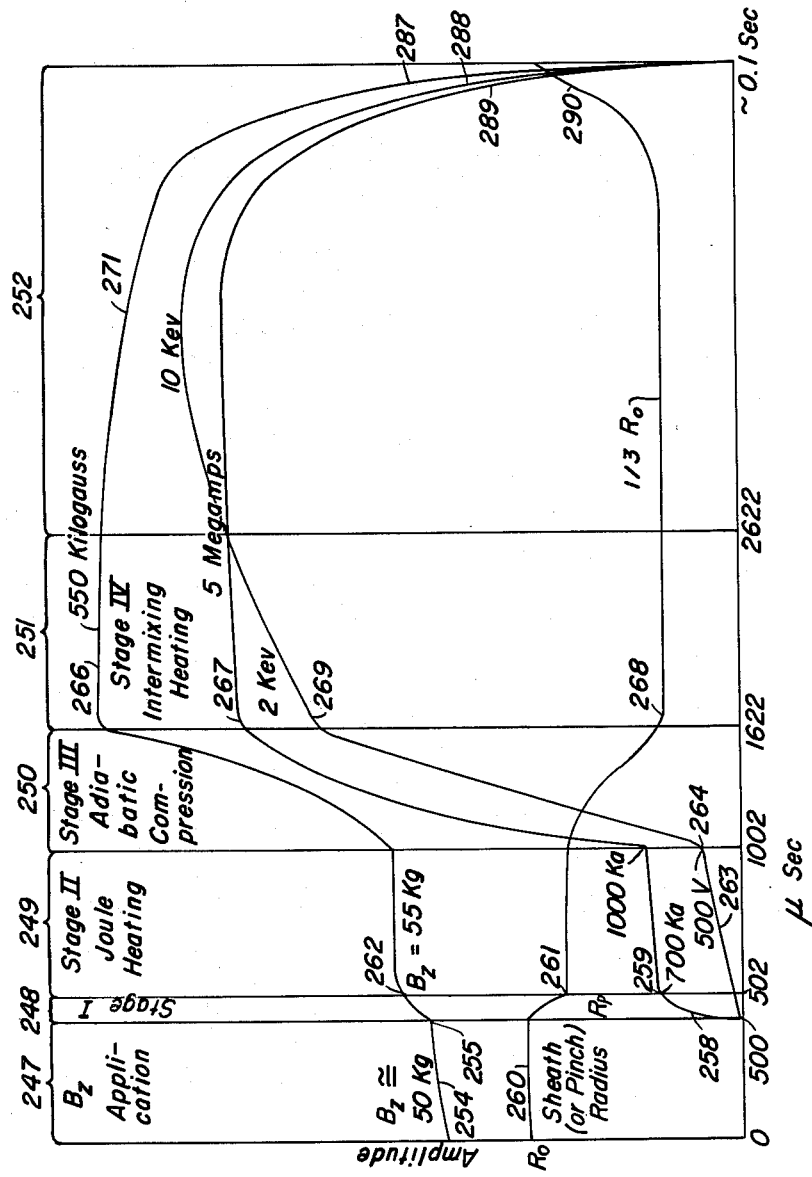
Figure 38:
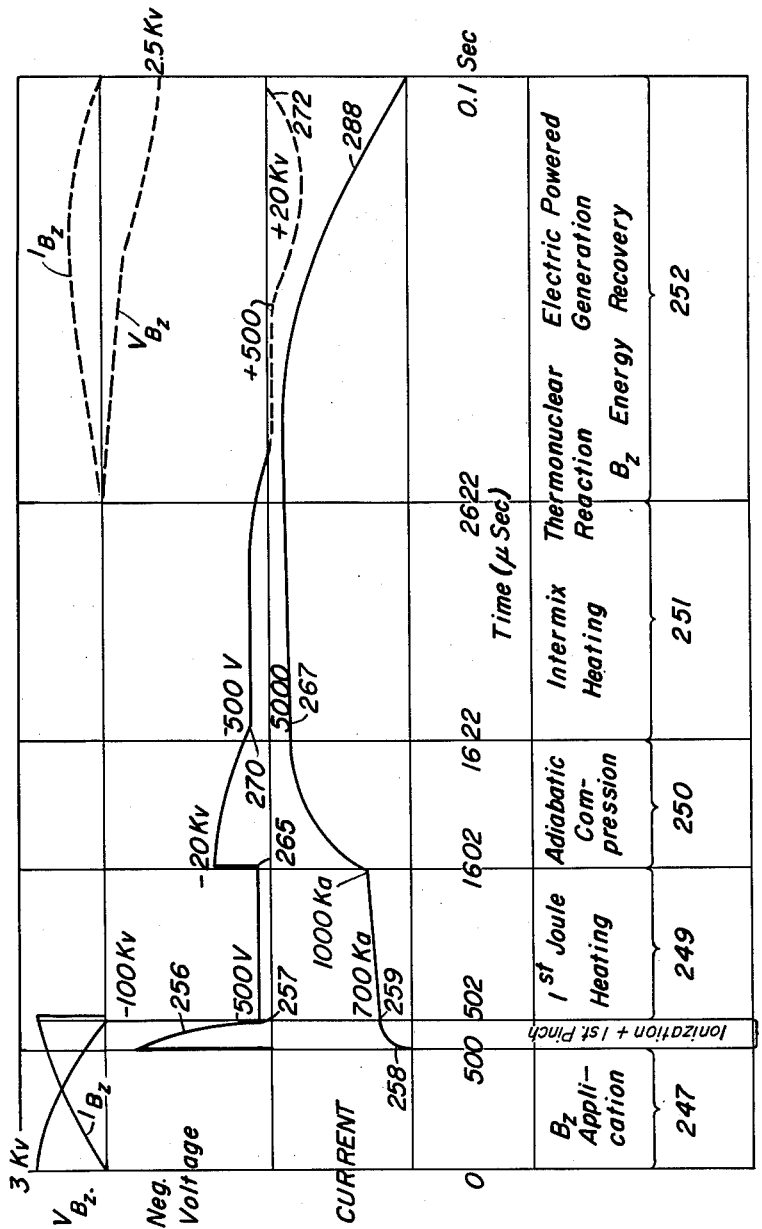
Figure 39:
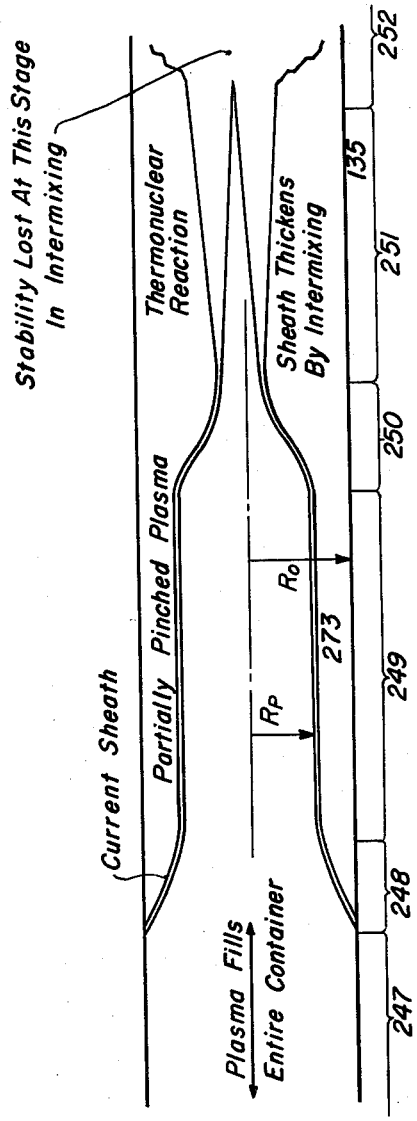

FIGURE 5 is a graph of the growth rate of the various instabilities as a function of wavelength, FIGURE 6 is a graph of the growth rate of the $m=0$ instability as a function of wavelength, FIGURE 7 is a graph of the growth rate of the $m=1$ instability as a function of wavelength, FIGURE 8 is a graph similar to FIGURE 7 treating the case where $k\alpha_V \leq 0$, FIGURE 9 is a schematic diagram showing the geometry considered in the theoretical treatment of the stabilized pinch, FIGURE 10 is a graph showing the stabilized pinch area for $\alpha_V = 0.1$, FIGURE 11 is a graph showing the stabilized pinch area for $\alpha_V = 0.25$, FIGURE 12 is a graph showing the stabilized pinch area for $\alpha_V = 0.5$, FIGURE 13 is a graph showing the stabilized pinch area for $\alpha_V = 1.0$, FIGURE 14 is a graph showing the stabilized pinch area for $\alpha_V = 0$, FIGURE 15 is a graph showing the variation of $\alpha_V$ as a function of $\beta$ for various $\delta$, FIGURE 16 is a graph of an operation curve for $\alpha_V = 0$, FIGURE 17 is a graph of an operation curve with $\alpha_V$ a variable for $K = 0.5$, FIGURE 18 is a graph of an operation curve with $\alpha_V$ a variable for $K = 1.0$, FIGURE 19 is a graph showing the relative variation of the reaction time as a function of stable pinch size, FIGURE 20 is a graph showing the ratio of axial to pinch field as a function of pinch radius for different insulator thicknesses for $\beta = 0$ and $\epsilon = 0$, FIGURE 21 is a graph showing the ratio of axial to pinch field as a function of pinch radius for different insulator thicknesses for $\beta = .25$ and $\epsilon = 0$, FIGURE 22 is a graph showing the ratio of axial to pinch field as a function of pinch radius for different insulator thicknesses for $\beta = 0.5$ and $\epsilon = 0$, FIGURE 23 is a graph showing the ratio of axial to pinch field versus pinch radius as a function of pinch radius for different insulator thicknesses and for different external inductive volume for $\beta = 0$ and for various $\epsilon$ values, FIGURE 24 is a graph showing the ratio of axial to pinch field as a function of pinch radius for different insulator thicknesses and for different external inductive volumes for $\beta = 0.25$ and for various $\epsilon$ values, FIGURE 25 is a graph showing the ratio of axial pinch field as a function of pinch radius for different insulator thicknesses and for different external inductive volumes for $\beta = 0.5$ with various $\epsilon$ values, FIGURE 26 is a graph showing the ratio of axial to pinch field as a function of pinch radius for a programmed $B_z$, twenty percent pinch field being subtracted from $B_zm$, for $\epsilon$ approaching infinity and $\omega = 0.2$, FIGURE 27 is a graph showing the ratio of axial to pinch field as a function of pinch radius for a programmed $B_z$, forty percent of the pinch field being subtracted from $B_z$, for $\epsilon$ approaching infinity and $\omega = 0.4$, FIGURE 28 is a graph showing the ratio of axial to pinch field as a function of pinch radius for a programmed $B_z$, sixty percent of the pinch field being subtracted from $B_z$, for $\epsilon$ approaching infinity and $\omega = 0.6$, FIGURE 29 is a schematic diagram of the reactor of the present invention, FIGURE 30 is a top view of a portion of the toroid showing the external components, FIGURE 31 is a section along line A—A of FIGURE 30, FIGURE 32 is a sectional view taken along the line B—B of FIGURE 31, FIGURE 33 is a schematic drawing of the gas supply, FIGURE 34 is a schematic drawing of the vacuum system, FIGURE 35 is a partially schematic drawing of the initial gas ionizing system, FIGURE 36 is a circuit diagram of the primary coil circuit and associated electrical energy drain-off system, FIGURE 37 is a graph showing the time relationship between the various voltages, currents and temperatures with respect to the pinch discharge, FIGURE 38 is a graph of the voltage and current during one cycle of operation, FIGURE 39 is a graph showing the pinched discharge as a function of time, FIGURE 40 is a schematic illustration showing the geometery of the plasma and the loctation of the various fields as a function of time, FIGURE 41 is a graph of the $B_\theta$ field, i.e., the self-constricting magnetic field as a function of time.

General considerations

In considering the nuclear interaction between atoms in a gas, the probability of such interaction taking place is determined by the coulomb barrier. This barrier is the electrostatic repulsion which an approaching particle experiences as it advances toward another particle of similar charge. In order to increase the number of nuclear interactions, the probability of a reaction occurring can be increased by raising the temperature of the nuclei and/or by increasing the number of collisions, i.e., by raising the density. If such a system is made large enough, so that a large fraction of the nuclear energy s ) produced is not lost but reprsents a gain to the system, it will heat itself.

Thus, there exists what may be considered a critical mass for deuterium, for example, which would start to heat itself up spontaneously from room temperature. However, in order to obtain a sustained reaction in deuterium the mass required would approximate the size of the moon.

In order, therefore, to obtain a system wherein the mass is of a more reasonable size, energy losses from penetrating radiations, escaping charged particles, neutrons, bremsstrahlung and conduction to the walls must be reduced. Energy must also be available to raise the temperature to the point where the nuclear energy gain is comparable with the energy losses.

To sustain such a reaction a local energy balance must be established, i.e., thermonuclear energy generated locally plus energy deposited from the outside locally, must be equal to or greater than the losses consisting of bremsstrahlung and transport to the outside. Furthermore, the system as a whole must generate an adequate margin of thermonuclear energy over the expenditure, since the gross thermonuclear output will appear partially as low grade heat, while the input energy is in the form of high grade electrical energy.

To attain the temperatures required to initiate as well as to sustain a thermonuclear reaction, the thermonuclear fuel, in the form of an ionized gas, must be insulated from the walls of the confining chamber, otherwise the heat losses to the walls will preclude the attainment of high temperatures. The confinement of the ionized gas column to a volume at or near the center of the confining chamber is accomplished in the present invention by an arrangement and association of components in such a manner that the advantages of a natural phenomenon may be utilized. This phenomenon is referred to as the pinch effect, and is described in detail hereinafter in the section entitled "Pinch Effect."

Utilizing the pinch effect to obtain a highly pinched discharge, i.e., the electrons as well as the positive ions constricted by means of the self-magnetic field to a small volume at the axis of a confining chamber, the current density will be high near the center and approach zero at the walls. Furthermore, the number of particles escaping to the walls from the constricted discharge will be small in number, since the energy required to attain this escape against the force of the constricting magnetic field will be improbably great. Also, since a highly ionized gas is being considered, the proportion of uncharged particles which can escape from the pinched discharge will result in no great loss of energy. If the temperature within the constricted discharge is of a very high value, for example $10^8$ degrees K., the energy loss to the walls in the form of escaping charged and uncharged particles is not serious. Therefore, the volume between the pinched discharge and the walls is a vacuum, and thus no transport losses of appreciable quantity will be present.

Under these considerations, any energy supplied from the outside, by means of electrical fields parallel to the electrons path for example, will be confined to the plasma and if sufficient time be available, become randomly distributed and increase the temperature of the gas. If the gas consists of a thermonuclear fuel, when the required temperatures are attained, a nuclear reaction will take place within the gas which will liberate neutrons, protons, tritons, alpha particles, He³ and bremsstrahlung.

The liberated energy of such a thermonuclear reactor is converted into useful power in a variety of ways. The electromagnetic radiation or bremsstrahlung will be absorbed by the apparatus and in so doing, heat the coolant. Further, such heating will take place in a thin surface layer and therefore provision must be made for the removal of this heat by use of a material with good heat conducting characteristics. Thus, the confining vessel contains a fluid coolant to absorb the heat so created, the fluid being circulated through a heat exchanger ultimately to produce power.

The neutrons liberated by the reaction taking place within the gas will have energies of from 2 to 14 m.e.v., and will penetrate the confining walls resulting in the creation of only a small amount of heat in this area. However, by placing a medium around the device which consists of a material having a large neutron capture cross-section, the absorption of these energized particles will result in the production of heat and/or useful by-products. For example, by capturing the neutrons in lithium, tritium can be produced.

The protons, tritons, He³, and alpha particles liberated by the thermonuclear reaction taking place within the constricted gas tend to do work against the constraining magnetic field. This work can appear as electrical energy in the external circuit as a source of useful energy.

*Thermonuclear fuels*

The fuels considered here for use in a controlled thermonuclear reaction are the isotopes of the light elements, for example deuterium, tritium, or a mixture of tritium and deuterium. The (T, D) reaction has approximately 150 times the cross-section of the (D, D) reaction, and will sustain a thermonuclear reaction at about one tenth the temperatures required for the (D, D) reactions.

The (D, D) reaction is $$_1H^2 + _1H^2 \rightarrow \begin{cases} _2He^3 + 0.8 \text{ m.e.v.} + _0n^1 + 2.5 \text{ m.e.v.} \\ _1H^3 + 1.0 \text{ m.e.v.} + _1H^1 + 3.0 \text{ m.e.v.} \end{cases} \quad (1)$$

the two branches proceeding in the ratio of $$\frac{\text{neutron branch}}{\text{proton branch}} = .94$$

at energies of 50 kev.

The (T, D) reaction is $$_1H^3 + _1H^2 \rightarrow _2He^4 + 3.5 \text{ m.e.v.} + _0n^1 + 14.1 \text{ m.e.v.} \quad (2)$$

and proceeds with a cross-section of about 150 times that of the (D, D) total reaction at energies less than 50 kev.

Another reaction of importance concerns the He³ produced in Equation 1 above, which is, $$_2He^3 + _0n^1 (\text{Thermal}) \rightarrow _1H^3 + 0.2 \text{ m.e.v.} + _1H^1 + 0.6 \text{ m.e.v.} \quad (3)$$

In the case of a thermonuclear reaction in deuterium, the tritium formed has a high probability of reacting with more deuterium. The He³ which has a small probability of reacting with deuterium directly can yield more tritium by capture of a thermal neutron, since it has a large capture cross-section.

Totaling the gross deuterium consumption in primary and secondary reactions we find, $$3_1H^2 \rightarrow _2He^4 + _1H^1 + _0n^1 + 21.7 \text{ m.e.v.} \quad (4)$$

if the He³ is consumed, or $$5_1H^2 \rightarrow _2He^4 + _2He^3 + _1H^1 + 2_0n^1 + 25 \text{ m.e.v.} \quad (5)$$

if the He³ is not consumed.

However, in considering the energy release of these reactions, care must be taken to distinguish the gross energy release given above, of which a large fraction is carried off by neutrons, and that energy carried by the charged particles. Only the latter energies have a chance of being deposited locally, i.e., within the confined gas, and therefore of helping to maintain the reaction by increasing the temperature.

Thus, by allowing for the energy lost by neutron escape, the local energies can be approximated as one $T+D$ reaction → 3 m.e.v. (charged particles only)
one $D+D$ reaction + side reactions (Eq. 3) → 7 m.e.v. (charged particles only).

*General theory of thermonuclear reaction*

The nuclear reaction in a heated mass is a binary process whose rate in reactions per cc. per sec. is given by $$\frac{1}{2}n^2\overline{(\sigma v)} \quad (6)$$

for a mass containing only one type of nucleus, and $$n_D n_T \overline{(\sigma v)} \quad (6a)$$

for a mass containing two types of nuclei D and T, where $n$ = number of nuclei per cc.
$\overline{\sigma v}$ = product of nuclear velocity at the temperature involved and the cross-section for the nuclear reaction at that temperature, averaged over the prevailing distribution.

For the (D, D) reaction, for example, it can readily be seen that every nuclei could react with every other nuclei. Thus, if there are $n$ nuclei, the reaction Equation 6 must include $n^2$. However, since two nuclei are reacting, only ½ are actually causing a reaction to take place. The rate at which $\frac{1}{2}n^2$ reactions takes place is a function of the energy of each nuclei and therefore the temperature T, and also a function of the probability of a collision between two particles taking place. This last factor is represented by $\overline{(\sigma v)}$. Since the cross-section $\sigma$, i.e., the effective area of cross-section of a single nucleus of a given species for a particular reaction, is a rapidly rising function of the colliding velocity of the particles, the greatest contribution to the reaction rate comes from the high velocity tail of the Maxwell distribution. The value $\overline{(\sigma v)}$ is, except at temperatures greater than 100 kev. in the (T, D) reactions, a steep function of temperature, for example $\overline{\sigma v}$ for (D, D) at 20 kev. is rising as $T^3$.

Figure 1:
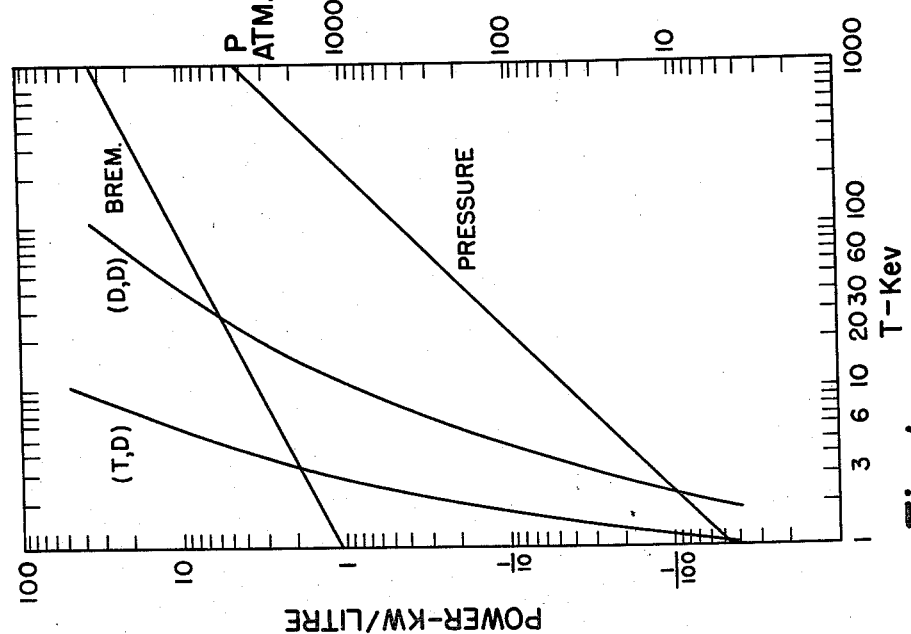
FIGURE 1 is a graph showing the ideal ignition temperatures for both the (T, D) and (D, D) reactions.

The graph in FIGURE 1 shows the relation of the temperature T in kev. and the nuclear power produced in kilowatts per liter (standard temperature and pressure) for the (D, D) and (T, D) reactions (the latter for a 50–50 mixture). It can be seen from FIGURE 1 that for the particular case of a self-sustaining reaction, the temperature must be about or above 3.4 kev. for (T, D), otherwise the energy loss through bremsstrahlung will prevent the reaction from sustaining itself. Similarly for the (D, D) reaction, the temperature must be above 27 kev. before the bremsstrahlung losses can be overcome.

Also shown in FIGURE 1 is the relation between gas pressures in atmospheres and temperatures in kev. Thus, it can be seen that at the ideal ignition temperature for the (T, D) reaction the gas will exert a pressure of about 15 atmospheres. This pressures is ultimately sustained by the gas chamber walls and the structure supporting such walls, which must be strong enough to hold it.

*Bremsstrahlung*

A free charge radiates energy only during an acceleration. A free electron in the electrostatic field of an ion is accelerated and may radiate. This radiation is commonly referred to as bremsstrahlung.

Thus, bremsstrahlung, which must necessarily be present in the highly ionized system under discussion, represents an unavoidable source of energy loss in our system. This loss is given in ergs per cc. per sec. by (C. F. Heitler, "Theory of Radiation," 2nd ed., page 172)

$$\frac{64}{3\sqrt{2\pi}} \cdot \frac{e^6 Z^3 n^2}{mc^3 \hbar} (kT^\circ/m)^{1/2} \qquad (7)$$

where
$T$=temperature in degrees Kelvin
$m$=electron mass
$n$=moles per cc.
$\hbar$=Planck constant/$2\pi$
$Z$=nuclear charge
$c$=velocity of light
$k$=Boltzman constant or in terms of the relation between the probability of bremsstrahlung and the temperature and number of particles by $$P_{\text{Brem.}} \text{ (erg/cc./sec.)} = 5.35 \cdot 10^{-24} n^2 T^{1/2} \qquad (8)$$

where $n$=particles per cc., and T is in kev. The $P_{\text{Brem.}}$ is plotted in FIGURE 1 for a particle density of $n=1.45 \times 10^{15}$ per cc., and it can be seen that $P_{\text{Brem.}}$ intersects the (T, D) and (D, D) energy production curves at 3.4 and 27 kev. respectively. These two temperatures, known as the ideal ignition temperatures, are the lowest possible temperature at which the thermonuclear reactions can sustain themselves, all conduction losses being zero.

Since both thermonuclear and bremsstrahlung reactions are binary processes, they are proportional to $n^2$ so that the ideal ignition temperature is independent of the density.

From FIGURE 1 the temperature region in which a thermonuclear reaction can be maintained is about 5 kev. for a (T, D) reaction, or 30 kev. for a (D, D) reaction. On this basis some general observations can be made:

(1) The temperatures required are of the order of $10^8$ degrees K., and are much higher than any known laboratory temperature.

(2) At these temperatures all matter is gaseous, and therefore no containers or conductors in the heated mass are possible.

(3) The light elements are completely ionized and any heavier nuclei are stripped of electrons down to about the L shell.

(4) The possibility of obtaining these extreme temperatures depends upon not being at equilibrium with radiation.

(5) The expression for the bremsstrahlung radiation losses contains the term $Z^3$. The radiation goes as $Z^2$ per nucleus, and there are Z electrons per nucleus. Therefore, under this analysis the bremsstrahlung losses would increase for higher Z reactants, so that considering the rapidly falling thermonuclear reaction rate caused by the presence of high Z reactants and the increased coulomb barrier height of the high Z reactants, hydrogen isotopes are virtually the only substances which are worthy of consideration as a primary fuel for a thermonuclear reactor.

(6) On this basis high Z impurities must also be strictly excluded from the reaction zone. Since the radiation is controlled by $Z^2$, to keep the bremsstrahlung low the tolerable concentration of the very high Z elements, such as mercury where Z is equal to 80, must be held to much lower tolerances as impurities than elements such as oxygen where Z is equal to 8.

(7) The gas densities must not be too high otherwise the pressures become too large to be held by known materials.

*Transport*

The rate of transport of heat in a one-dimensional system can be expressed by $$\frac{\delta Q}{\delta t} = K \frac{\delta \theta}{\delta X} \qquad (9)$$

where
$\theta$=the temperature in degrees K.
$Q$=quantity of heat
$X$=distance dimension
$K$=coefficient of heat conductivity Also, by diffusion theory, the heat flux in ergs per cm.$^2$ per sec. is equal to $$1/2 n v \lambda \cdot 10^{11} \cdot (e/c) dT/dX \qquad (10)$$

where
$v$=particle velocity
$n$=particle density
$\lambda$=transport mean free path
$e$=electronic charge
$T$=temperature in kev.

The transport mean free path is that path in a highly ionized gas at temperature T, and is equal to $$1/n\sigma_{\text{tr}} \qquad (11)$$

where $\sigma_{\text{tr}}$ is the transport cross-section for pure Rutherford scattering, i.e., $$\sigma_{\text{tr}} = \int_0^\infty (1 - \cos \theta) d\sigma \qquad (12)$$

This summation is biased against the numerous but ineffective small angle collisions. Also to be considered is the Rutherford scattering equation $$-d\sigma = \frac{1}{4} \left(\frac{e^2 Z z}{mv^2}\right)^2 \frac{d\omega}{\sin^2 \frac{\phi}{2}} \qquad (13)$$

$\sigma$=the cross section for Rutherford (coulomb) scattering
$e$=the value of the electronic charge
$Z$=the charge of the scattering nucleus
$z$=the charge of the scattered particle
$m$ and $v$=the mass and velocity of the scattered particle
$\phi$=the scattering angle, i.e., the angle between the directions of the scattered particle before and after the scattering event, and
$\omega$=the solid angle corresponding to the plane angle $\phi$ and equals $2\pi (1 - \cos \phi)$.

The integral is divergent for $\theta \to 0$. However, by integrating to the limit of the collision parameter corresponding to the radius at which the surrounding cloud of electrons neutralizes the coulomb force, the divergence is avoided. This radius is the Debye radius $a$, and is defined as equal to $$\frac{3 \cdot 10^{11} \cdot T}{ce(2n)^{1/3}} \qquad (14)$$

The transport cross-section, $\sigma_{\text{tr}}$, then becomes equal to $$4\pi (e^2/mv^2)^2 \cdot \log(1 + a^2) \qquad (15)$$

The log term varies slowly and can be taken to have the value 6. Therefore, the transport mean free path is defined by, $$\lambda = 1/n\sigma_{\text{tr}} \cdot E^2/6\pi e^4 n \cdot 1.85 \cdot 10^3 T^2_{\text{Kev.}} \qquad (16)$$

and the heat conduction equation becomes $$\frac{dQ}{dt} = n\lambda v/2 \frac{dT}{dX} \cdot 10^{11} \cdot e/c \qquad (17)$$

$$= \frac{5 \cdot 10^{37} \cdot \sqrt{10}}{2\pi} \cdot \frac{e^{5/2}}{c^{7/2}} \cdot T^{5/2} \frac{dT}{dX} \qquad (18)$$

It will be noted that this last expression is independent of the density, as noted above, and that the mean free path increases with temperature. λ has a value of $2 \times 10^3$, $2 \times 10^5$, and $2 \times 10^6$ cm. for temperatures of 1, 10 and 30 kev., respectively, in this calculation, and would only apply to reactor vessels of impractical size. A more meaningful physical picture is obtained by noting that at 10 kev. in the (D, T) reaction at $10^{15}$ particles per cc., $$\sigma = 2 \times 10^{-27} \text{ cm.}^2$$

or $$\lambda_{\text{disintegrations}} = \frac{1}{10^{15} \cdot 2 \cdot 10^{-27}}$$

or $$\sim 10^{12} \text{ cm.}$$

In a tube of diameter 100 cm. a deuteron collides with the wall $10^{10}$ times per disintegration. Each wall collision carries away $T_{\text{kev.}}$, and each nuclear disintegration yields $10^7$ ev., so that the ratio of wall power loss to nuclear power gain is $$10^4 \times 10^{10} / 10^7 \text{ or } \sim 10^7$$

Obviously such an unrestricted heat loss is impossibly large, and must be reduced by a factor of the order of $10^7$ before any self-sustaining reaction becomes possible.

The pinch effect

The means utilized in the present invention for reducing the above-mentioned heat loss to a value where a self-sustaining thermonuclear reaction is possible, is the pinch effect.

This pinch or constricting effect on the electron and ion stream is due to the effect of the magnetic attractions between the parts of the stream. How such a pinch effect may take place can be seen in the following manner. Consider a stream of high velocity electrons, i.e., an electric current within a gas, moving in a given direction, and positive ions moving in the opposite direction. If the charge density of the positive ions is everywhere equal to the charge density of the electron, the coulomb attractions and repulsions cancel. However, the magnetic forces created by the current flow will attract the charged particles toward the center of the current distribution. Thus, it is apparent that a stream of electrons will be magnetically self-pinching, provided the current is greater than a value which can be calculated from the initial stream conditions. The current magnitude required to obtain a pinch effect can be determined to a first approximation by the equation, $$I^2 = 3.2 \times 10^{-7} NT$$

where $I$ = current amperes
$N$ = total particles per unit length of stream, and
$T$ = temperature in kev.

See also Bennett, Phys. Rev. 45, 890 (1934).

In the present device a toroidal chamber provides the accelerated gas particles and electrons with an endless path. The low pressure gas is initially ionized, and is thereafter subjected to the action of electric and magnetic fields created in the gas by means hereinafter described. The effect of these fields is to accelerate the electrons around the toroid in one given direction, and the positive ions in the other, with the result that a current is created in the gas. This current increases and attains values of the order of from 100,000 to above about one million amperes. These high currents give rise to the phenomenon referred to above as the pinch effect. Thus, the electron currents, which up to the time the pinch effect became dominant had a cross-sectional area equivalent to the confining chamber, are concentrated along the axis of the chamber. Both the positive ions and the electrons are constricted. By this confinement the energy losses to the walls are drastically reduced and the current density along the axis is increased. As the current density is increased, the electrons, which along with the ionized gas particles are concentrated along the axis of the confining chamber and which have the greatest mobility, are accelerated by the electric field, and by means of collisions pass energy onto the heavier gas particles. These collisions will increase the random velocity of the gas particles, thereby increasing the temperature of the gas. As the temperature of the gas reaches the ideal ignition temperature indicated on the graph in FIGURE 1, the thermonuclear reaction will become self-sustaining. These reactions will liberate large quantities of bremmstrahlung, neutrons, protons, tritons, alpha particles, and $He^3$. It is the absorption, capture and confinement of these sources of energy in the present device which provides heat and electrical energy from which power may be produced.

It has been found both theoretically and practically that the pinch effect as described above is not stable against lateral displacement. This instability is commonly referred to in the art as "kink" or "Kruskal-Swartzchild" instability. This phenomenon, as presently understood from a physical standpoint, means that a pinched discharge, obtained as described above, can be maintained for only short periods (less than 10 μsec.) of time before this instability takes place and scatters the ionized gas against the confining chamber. However, if the pinched discharge is subjected to an externally produced longitudinal magnetic field the time during which the pinched discharge exists is lengthened considerably over the time it is stable without such a magnetic field. (See, for example, James L. Tuck, Thermonuclear Reactor, Ser. No. 490,705, filed February 25, 1955, the disclosure of which is incorporated herein by reference, which shows the apparatus and methods without using the longitudinal magnetic field.)

Longitudinal magnetic field stabilization

Denoting the material pressure, density and velocity of the plasma by $p$, $\rho$ and $\vec{v}$, the magnetic and electric fields $\vec{B}$ and $\vec{E}$, the current and charge densities of $\vec{j}$ and $\epsilon$, the permeability and dielectric constant of space by $\mu_0$ and $\kappa_0$, and the ratio of specific heats by $\gamma$, we use the following equations for the interior of the plasma in meter-kilogram-second (MKS) units:

$$\rho \frac{d\vec{v}}{dt} = \vec{j} \times \vec{B} + \epsilon \vec{E} - \vec{\nabla} p \qquad (19)$$

$$\vec{\Delta} \cdot (\rho \vec{v}) = -\frac{\partial \rho}{\partial t} \qquad (20)$$

$$\vec{E} + \vec{v} \times \vec{B} = 0 \qquad (21)$$

$$\vec{\nabla} \times \vec{B} = \mu_0 \vec{j} + \mu_0 \kappa_0 \frac{\partial \vec{E}}{\partial t} \qquad (22)$$

$$\vec{\nabla} \cdot \vec{B} = 0 \qquad (23)$$

$$\vec{\nabla} \times \vec{E} = -\frac{\partial \vec{B}}{\partial t} \qquad (24)$$

$$\vec{\nabla} \cdot \vec{E} = \frac{1}{\kappa_0} \epsilon \qquad (25)$$

$$\frac{1}{p} \frac{dp}{dt} = \frac{\gamma}{\rho} \frac{d\rho}{dt} \qquad (26)$$

As usual $$\frac{d\rho}{dt} = \frac{\partial}{\partial t} + \vec{v} \cdot \vec{\nabla}.$$

In the vacuum the four Maxwell equations (22), (23), (24), and (25) are obtained with $\vec{j}=0$ and $\epsilon=0$. On a surface separating the plasma from the vacuum we have, if $\vec{n}$ is a unit normal to the surface directed into the plasma and $u$ the normal velocity of the surface, $$u=\vec{n}\cdot\vec{v} \qquad (27a)$$

$$\frac{d\vec{n}}{dt}=\vec{n}\times[\vec{n}\times(\nabla\vec{v})\cdot\vec{n}] \qquad (27b)$$

$$\vec{n}\times[\vec{B}]=\mu_0\vec{j}^*-\mu_0\kappa_0 u[\vec{E}] \qquad (28)$$

$$\vec{n}\cdot[\vec{B}]=0 \qquad (29)$$

$$\vec{n}+[\vec{E}]=u[\vec{B}] \qquad (30)$$

$$\vec{n}\cdot[\vec{E}]=\frac{1}{\kappa_0}\epsilon^* \qquad (31)$$

$$\vec{j}^*\times\underline{\vec{B}}+\epsilon^*\underline{\vec{E}}-\vec{n}-\vec{n}p=0 \qquad (32)$$

Here $p$ and $\vec{v}$ are the pressure and velocity of the plasma at the surface (i.e., just inside), $\vec{j}^*$ and $\epsilon^*$ are the sheet current density and sheet charge density on the surface, the brackets denote the jump in the enclosed quantity upon crossing the surface from the vacuum into the plasma, and a bar under a quantity denotes the arithmetic mean of the values of that quantity just on each side of the surface.

These equations are now used to investigate the stability of the pinch effect in the presence of a longitudinal magnetic field. The equilibrium configuration whose stability is to be investigated is idealized in the following way. Cylindrical coordinates $r$, $\theta$, and $z$ are used and assuming a uniform, completely ionized plasma with pressure $p_0$ and density $\rho_0$ within the infinite cylinder $r=r_0$, while outside there is a vacuum. The plasma is at rest ($\vec{v}=0$) and $\vec{E}=0$ everywhere. In the vacuum, there is a magnetic field with no $r$ component, with $\theta$ component $B_0 r_0/r$, and with $z$ component $B_V$. In the plasma, the magnetic field has only a $z$ component $B_P$. In the plasma, $\vec{j}$ and $\epsilon$ vanish, while on the surface $\epsilon^*=0$ but $j_Z^*$ has a $\theta$ component $j_1^*$ and a $z$ component $j_0^*$. The quantities $p_0$, $\rho_0$, $r_0$, $B_0$, $B_P$, $B_V$, $j_0^*$ and $j_1^*$ are constants and satisfy the (not independent) relations $$\begin{aligned}B_0&=\mu_0 j_0^*,\ B_P-B_V=\mu_0 j_1^*\\ j_1^*(B_P+B_V)&-j_0^* B_0+2p_0=0 \qquad (33)\\ B_0^2+B_V^2&-B_P^2=2\mu_0 p_0\end{aligned}$$

The vector $\vec{n}$ is the negative of the unit vector in the $r$-direction.

Solutions to these equations are obtained which are close to the equilibrium solution just described. Assuming every physical quantity is equal to its equilibrium value plus a small perturbation term, the notation is changed and each symbol for a physical quantity now denotes only the perturbation of the quantity, i.e., its difference from the equilibrium value. Considering all our equations as equations for these perturbation quantities and linearize them in the usual way, a system of algebraic and differential equations, linear and homogeneous, with $r$, $\theta$, $z$, and $t$ as independent variables is obtained. The coefficients are obviously independent of $\theta$, $z$, and $t$. Any solution of the equations may therefore be obtained as a superposition of elementary solutions, an elementary solution being one in which each dependent variable is a function of $r$ only (or, in the case of sheet quantities, a constant) multiplied by $\exp(im\theta+ikz+\omega t)$, where $m$, $k$ and $\omega$ are constants, the characteristic constants of the elementary solution. Thus only elementary solutions need be found. To make physical sense $m$ must be an integer and $k$ must be real. Further without loss of generality it may be assumed that $m$ is non-negative. If the notation is again changed, i.e., if each symbol which originally denoted a physical quantity, and later denoted the perturbation of that quantity, now denotes the coefficient of the expoential in the representation of that perturbation, the equations become linear homogeneous algebraic and ordinary differential equations for these coefficients.

Denoting differentiation with respect to $r$ by a prime, the plasma equations become $$\rho_0\omega v_r=j_\theta B_P-p' \qquad (19'_r)$$

$$\rho_0\omega v_\theta=-j_r B_P-\frac{im}{r}p \qquad (19'_\theta)$$

$$\rho_0\omega v_z=-ikp \qquad (19'_z)$$

$$\frac{1}{r}(rv_r)'+\frac{im}{r}v_\theta+ikv_z=\frac{\omega}{\rho_0}\rho \qquad (20')$$

$$E_r+v_\theta B_P=0 \qquad (21'_r)$$

$$E_\theta-v_r B_P=0 \qquad (21'_\theta)$$

$$E_z=0 \qquad (21'_z)$$

$$\frac{im}{r}B_z-ikB_\theta=\mu_0 j_r+\mu_0\kappa_0\omega E_r \qquad (22'_r)$$

$$ikB_r-B'_z=\mu_0 j_\theta+\mu_0\kappa_0\omega E_\theta \qquad (22'_\theta)$$

$$\frac{1}{r}(rB_\theta)'-\frac{im}{r}B_r=\mu_0 j_z+\mu_0\kappa_0\omega E_z \qquad (22'_z)$$

$$\frac{1}{r}(rB_r)'+\frac{im}{r}B_\theta+ikB_z \qquad (23')$$

$$\frac{im}{r}E_z-ikE_\theta=-\omega B_r \qquad (24'_r)$$

$$ikE_r-E'_z=-\omega B_\theta \qquad (24')$$

$$\frac{1}{r}(rE_\theta)'-\frac{im}{r}E_r=-\omega B_z \qquad (24'_z)$$

$$\frac{1}{r}(rE_r)'+\frac{im}{r}E_\theta+ikE_z=\frac{1}{\kappa_0}\epsilon \qquad (25')$$

$$\frac{\omega}{p_0}p=\frac{\gamma\omega}{\rho_0}\rho \qquad (26')$$

The subscripts $r$, $\theta$, $z$ refer always to components. Ignoring special cases and divide freely by $\omega$, $k$, and more complicated expressions, then (23') follows from (24') and may be ignored. Eliminating $E_r$ by (21'$_r$), $E_\theta$ by (21'), $E_z$ by (21'$_z$), $j_z$ by (22'$_z$), $\rho$ by (26'), $v_z$ by (19'$_z$), $B_r$ by (24'$_r$), and $B_\theta$ by (24'), in that order and subtracting (20') from (24'$_z$) yields an algebraic equation by means of which we eliminate $B_z$. Eliminating $j_\theta$ by (19'$_r$), $j_r$ by (19'$_\theta$), $v_\theta$ by (22'$_r$) and $v_r$ by (22'$_\theta$), and introducing the constants, then $$c^2=\frac{1}{\mu_0\kappa_0},\ s^2=\frac{\gamma p_0}{\rho_0},\ h^2=\frac{B_P^2}{\mu_0\rho_0}$$

$$\xi^2=k^2+\frac{\omega^2}{s^2},\ \eta^2=k^2+\frac{\omega^2}{c^2}+\frac{\omega^2}{h^2} \qquad (34)$$

$$\zeta^2=k^2+\frac{\omega^2}{s^2}+\frac{\omega^2}{h^2},\ x=\frac{\xi\eta}{\zeta}r_0$$

which reduce finally down to the one equation $$\frac{1}{r}(rp')'-\frac{m^2}{r^2}p-\frac{\xi^2\eta^2}{\zeta^2}p=0 \qquad (35)$$

This is Bessel's equation of $m$th order and its only acceptable solution is $$J_m\left(i\frac{\xi\eta}{\zeta}r\right)$$

where $J_m$ is the $m$th order Bessel function of first kind, since any other independent solution becomes infinite at $r=0$. Denoting the derivative of $J_m$ by $J'_m$, and considering $J_m$ and $J'_m$ to be always evaluated for the argument $$i\frac{\xi\eta}{\zeta}r$$

the following solution within the plasma is obtained $p_1$ being an arbitrary constant:

$$p = p_1 J_m$$

$$\rho = \frac{\rho_0 p_1}{\gamma p_0} J_m$$

$$v_r = -i\frac{p_1}{\rho_0 \omega}\frac{\xi\zeta}{\eta}J'_m$$

$$v_\theta = -\frac{im}{r}\frac{p_1}{\rho_0\omega}\frac{\zeta^2}{\eta^2}J_m$$

$$v_z = -ik\frac{p_1}{\rho_0\omega}J_m$$

$$B_r = k\frac{B_P p_1}{\rho_0\omega^2}\frac{\xi\zeta}{\eta}J'_m \qquad (36)$$

$$B_\theta = \frac{km}{r}\frac{B_P p_1}{\rho_0\omega^2}\frac{\zeta^2}{\eta^2}J_m$$

$$B_z = \frac{B_P p_1}{\rho_0\omega^2}\xi^2 J_m$$

$$E_r = \frac{im}{r}\frac{B_P p_1}{\rho_0\omega}\frac{\zeta^2}{\eta^2}J_m$$

$$E_\theta = -i\frac{B_P p_1}{\rho_0\omega}\frac{\xi\zeta}{\eta}$$

$$E_z = 0$$

$$j_r = -\frac{im}{r}\frac{p_1}{B_P}\left(1 - \frac{\zeta^2}{\eta^2}\right)J_m$$

$$j_\theta = i\frac{p_1}{B_P}\left(1 - \frac{\zeta^2}{\eta^2}\right)\frac{\xi\eta}{\zeta}J'_m$$

$$j_z = 0$$

$$\epsilon = 0$$

In the vacuum the equations for the coefficients are just (22′), (23′), (24′), and (25′) as above but with $j=0$ and $\epsilon=0$. (23′) and (25′) follow from (24′) and (22′) respectively and may be ignored. Eliminating $E_r$ by (22′$_r$) and $B_r$ by (24′$_r$) and introducing the constants $$\psi^2 = k^2 + \frac{\omega^2}{c^2}, \quad y = |k|r_0 \qquad (37)$$

then multiplying (22′) by $r$, differentiating, and eliminating $E'_z$ in it by (24′) and $(rE_\theta)'$ in it by (24′$_z$), an equation is obtained which reduces to $$\frac{1}{r}(rB'_z)' - \frac{m^2}{r^2}B_z - \psi^2 B_z = 0 \qquad (38)$$

Similarly, multiplying (24′) by $r$, differentiating, and eliminating $B'_z$ in it by (22′) and $(rB_\theta)'$ in it by (22′$_z$), an equation is obtained which reduces to $$\frac{1}{r}(rE'_z)' - \frac{m^2}{r^2}E_z - \psi^2 E_z = 0 \qquad (39)$$

Equations 38 and 39 are Bessel's equations of $m$th order. The only acceptable solution of either is $H_m(i\psi r)$, where $H_m$ is the $m$th order Hankel function of first kind, since any other independent solution becomes infinite at $r=\infty$. Denoting the derivative of $H_m$ by $H'_m$, and considering $H_m$ and $H'_m$ to be always evaluated for the argument $i\psi r$, we obtain the following solution within the vacuum, $B_1$ and $E_1$ being arbitrary constants:

$$B_r = \frac{k}{\psi}B_1 H'_m - \frac{im}{r}\frac{\mu_0\kappa_0\omega}{\psi^2}E_1 H_m$$

$$B_\theta = \frac{km}{\psi^2 r}B_1 H_m + i\frac{\mu_0\kappa_0\omega}{\psi}E_1 H'_m$$

$$B_z = B_1 H_m \qquad (40)$$

$$E_r = \frac{im}{r}\frac{\omega}{\psi^2}B_1 H_m + \frac{k}{\psi}E_1 H'_m$$

$$E_\theta = -i\frac{\omega}{\psi}B_1 H'_m + \frac{km}{\psi^2 r}E_1 H_m$$

$$E_z = E_1 H_m$$

Considering the surface Equations 27–32, the perturbation of the boundary surface is denoted by $R$, so that the position of the surface is $r=r_0+R$. In the new notation, however, $R$ denotes only the coefficient of the exponential representing the old $R$, since $u=-\omega R$. In the following equations all plasma and vacuum quantities are to be evaluated at $r=r_0$. The superscripts P and V distinguish plasma and vacuum quantities when necessary (which is just for $\overline{B}$ and $\overline{E}$). It should be observed that the first order expression for the $\theta$ component of $\overline{B}$ in the vacuum evaluated at the surface contains, in addition to the ordinary first order term $B_\theta^V$ evaluated at $r=r_0$ such as all other quantities consist of, also the term $(B_0 r_0/r)'|_{r=r_0}R = -B_0 R/r_0$, since the $\theta$ component of $\overline{B}$ in the vacuum is not constant in the equilibrium and therefore gives a first order contribution just from the displacement of the surface.

$$u = -v_r \qquad (27a')$$
$$\omega n_r = 0 \qquad (27b'_r)$$
$$\omega n_\theta = \frac{im}{r_0}u \qquad (27b'_\theta)$$
$$\omega n_z = -iku \qquad (27b'_z)$$
$$n_\theta(B_P - B_V) - n_z(-B_0) = \mu_0 j_r^* \qquad (28'_r)$$
$$B_z^P - B_z^V - n_r(B_P - B_V) = \mu_0 j_\theta^* \qquad (28'\theta)$$
$$-B_\theta^P + B_\theta^V - B_0\frac{R}{r_0} + n_r(-B_0) = \mu_0 j_z^* \qquad (28'_z)$$
$$-B_r^P + B_r^V + n_\theta(-B_0) + n_z(B_P - B_V) = 0 \qquad (29')$$
$$0 = 0 \qquad (30'_r)$$
$$E_z^P - E_z^V = u(-B_0) \qquad (30'\theta)$$
$$-E_\theta^P + E_\theta^V = u(B_P - B_V) \qquad (30'_z)$$
$$-E_r^P + E_r^V = \frac{1}{\kappa_0}\epsilon^* \qquad (31')$$

$$j_1^*\frac{1}{2}(B_z^P + B_z^V) + j_\theta^*\frac{1}{2}(B_P + B_V)$$
$$-j_\theta^*\frac{1}{2}\left(B_\theta^P + B_\theta^V - B_0\frac{R}{r_0}\right) - j_z^*\frac{1}{2}B_0 + p - n_r p_0 = 0$$
$$\qquad (32'_r)$$

$$j_\theta^*\frac{1}{2}(B_r^P + B_r^V) - j_r^*\frac{1}{2}(B_P + B_V) - n_\theta p_0 = 0 \qquad (32'\theta)$$

$$j_r^*\frac{1}{2}B_0 - j_1^*\frac{1}{2}(B_r^P + B_r^V) - n_z p_0 = 0 \qquad (32'_z)$$

Eliminate $$R = \frac{u}{\omega}$$

$u$ by (27a′), $n_r$ by (27b′$_r$), $n_\theta$ by (27′$_b$), $n_z$ by (27b′$_z$), $j_r^*$ by $(28'_r)$, $j_\theta^*$ by $(28'_\theta)$, $j_z^*$ by $(28'_z)$, and $\epsilon^*$ by $(31')$. Utilizing relations (33), it is apparent that $(32'_z)$ is equivalent to $(32'_\theta)$ and may be dropped. Further, using $(29')$ to eliminate $B_r^V$ in $(32'_\theta)$, a relation between $B_r^P$ and $v_r$ is obtained which is automatically satisfied by the solution of Equation 36, hence $(32'_\theta)$ may also be dropped. In the remaining four equations the plasma and vacuum solutions (36) and (40) are substituted and four equations $(29'')$, $(30''_\theta)$, $(30''_z)$, and $32''_r)$ are obtained. From $(30''_\theta)$ an expression for $E_1$ can be obtained $$E_1 = i \frac{B_0 p_1}{\rho_0 \omega} \frac{\xi \zeta}{\eta} \frac{J'_m}{H_m} \quad (41)$$

Using this equation to eliminate $E_1$ in $(29'')$ and $(30''_z)$, it is apparent that these two latter equations are equivalent and yield $$B_1 = \left( B_V + \frac{kmB_0}{\psi^2 r_0} \right) \frac{p_1 \psi}{\rho_0 \omega^2} \frac{\xi \zeta}{\eta} \frac{J'_m}{H'_m} \quad (42)$$

Finally, using (41) and (42) to eliminate $E_1$ and $B_1$ in $(32''_r)$ a single linear homogeneous algebraic equation in $p_1$ is obtained. Since $p_1$ must not vanish if a nontrivial solution is to be obtained, its coefficient in this equation must vanish. This gives a condition which may be written $$\frac{B_P^2}{B_0^2} \eta^2 r_0^2 K_m(x) = 1 + \left( \frac{B_V}{B_0} \psi r_0 + \frac{km}{\psi} \right)^2 L_m(\psi r_0) + \frac{\mu_0 \kappa_0 \omega^2}{\psi^2 L_m(\psi r_0)} \quad (43)$$

where the functions $$K_m(x) = \frac{J_m(ix)}{ixJ'_m(ix)}, \quad L_m(y) = \frac{H_m(iy)}{iyH'_m(iy)} \quad (44)$$

have been introduced. Equation 43 is the so-called characteristic equation, since it is a condition which must be satisfied by the characteristic constants $m$, $k$, and $\omega$ of any elementary solution.

Considering the approximation of infinite light velocity, so that $$c = \infty, \quad \mu_0 \kappa_0 = 0, \quad \eta^2 = k^2 + \frac{\omega^2}{h^2}, \quad \psi = |k| \quad (45)$$

and introducing the dimensionless constants $$w = \frac{r_0 \omega}{s}, \quad \alpha_P = \frac{B_P}{B_0}, \quad \alpha_V = \frac{B_V}{B_0} \quad (46)$$

the characteristic Equation 43 becomes $$\alpha_P^2 \left( y^2 + \frac{\gamma}{2} \frac{1 + \alpha_V^2 - \alpha_P^2}{\alpha_P^2} w^2 \right) K_m(x) = 1 + (\alpha_V y \pm m)^2 L_m(y) \quad (47)$$

in which the plus or minus sign is to be chosen according to whether $k$ is positive or negative. Thus $$x^2 = (y^2 + w^2) \left( y^2 + \frac{\gamma}{2} \frac{1 + \alpha_V^2 - \alpha_P^2}{\alpha_P^2} w^2 \right) \left( y^2 + w^2 + \frac{\gamma}{2} \frac{1 + \alpha_V^2 - \alpha_P^2}{\alpha_P^2} w^2 \right) \quad (48)$$

Before discussing characteristic Equation 47 the properties of the functions $K_m(y)$ and $L_m(y)$ should be investigated. These functions satisfy the differential equations $$K'_m(y) = \frac{1}{y} [1 - (m^2 + y^2) K_m(y)^2],$$

$$L'_m(y) = \frac{1}{y} [1 - (m^2 + y^2) L_m(y)^2] \quad (49)$$

$K_m$ is a positive monotonically decreasing function, $L_m$ is a negative monotonically increasing function, and they satisfy the inequalities $$K_m(y) > \frac{1}{\sqrt{m^2 + y^2}}, \quad L_m(y) > \frac{-1}{\sqrt{m^2 + y^2}} \quad (50)$$

Let $$\nu = \log_e \frac{2}{\Gamma y} \quad (51)$$

where $\log_e \Gamma = 0.5772 \ldots$ is Euler's constant. Since $\Gamma = 1.781 \ldots$ then $$\log_e \frac{2}{\Gamma} = 0.1159 \ldots$$

Then for $y \to 0$, we have $$K_0(y) = 2y^{-2} + \frac{1}{4} - \frac{1}{32} y^2 + \ldots$$

$$K_m(y) = \frac{1}{m} - \frac{1}{2m^2(m+1)} y^2 + \ldots \text{ for } m \geq 1$$

$$L_0(y) = -\nu - \left( \frac{1}{2} \nu^2 - \frac{1}{2} \nu - \frac{1}{4} \right) y^2 + \ldots \quad (52)$$

$$L_1(y) = -1 + (\nu + 1) y^2 - \left( \frac{1}{2} \nu^2 + \nu + \frac{3}{8} \right) y^4 + \ldots$$

$$L_m(y) = -\frac{1}{m} + \frac{1}{2m^2(m-1)} y^2 + \ldots \text{ for } m \geq 2$$

while for $y \to \infty$ we have asymptotically $$K_m(y) = y^{-1} + \frac{1}{2} y^{-2} + \left( \frac{3}{8} - \frac{1}{2} m^2 \right) y^{-3} + \ldots$$

$$\quad (53)$$

$$L_m(y) = y^{-1} + \frac{1}{2} y^{-2} - \left( \frac{3}{8} - \frac{1}{2} m^2 \right) y^{-3} + \ldots$$

Figure 2:
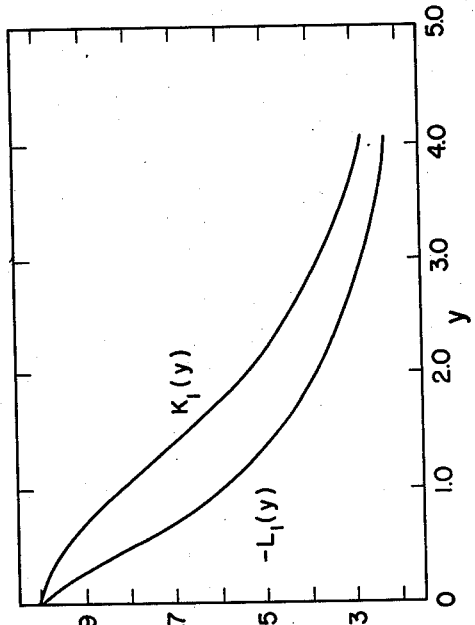
FIGURE 2 is a graph of the functions $K_1(y)$ and $-L_1(y)$.

Graphs of the functions $K_1(y)$ and $-L_1(y)$ are shown in FIGURE 2, and values of these two functions for a number of arguments are listed in Table 1.

TABLE 1

| $y$ | $K_1(y)$ | $-L_1(y)$ |
|---|---|---|
| 0 | 1 | 1 |
| 0.4 | 0.96154 | 0.83055 |
| 0.5 | 0.94174 | 0.78184 |
| 0.6 | 0.91852 | 0.73633 |
| 0.7 | 0.89279 | 0.69432 |
| 0.8 | 0.86528 | 0.65582 |
| 0.9 | 0.83613 | 0.62059 |
| 1.0 | 0.80639 | 0.58845 |
| 1.2 | 0.74624 | 0.53206 |
| 1.4 | 0.68761 | 0.48473 |
| 1.6 | 0.63246 | 0.44449 |
| 1.8 | 0.58176 | 0.41012 |
| 2.0 | 0.53581 | 0.38042 |
| 2.5 | 0.44092 | 0.32161 |
| 3.0 | 0.36986 | 0.27807 |
| 4.0 | 0.27532 | 0.21852 |
| 5.0 | 0.21755 | 0.17976 |

Returning to characteristic Equation 47, $y$ and $w$ are dimensionless forms of the characteristic constants $k$ and $\omega$. If $y$ and $m$ are prescribed, then (47) determines the possible values of the frequency or growth constant $$w = \frac{r_0 \omega}{s}$$

for elementary perturbations which have period or wavelength $$\lambda = \frac{2\pi}{|k|} = \frac{2\pi r_0}{y}$$

in the $z$-direction and have $m$ periods in one turn around the cylinder from $\theta = 0$ to $\theta = 2\pi$. For each $y$ and $m$ there will be an infinite number of values of $w$, almost all of which are purely imaginary and have $|w| \to \infty$, corresponding to stable oscillations of higher and higher frequency. However, only unstable perturbations are of interest, i.e., those in which $w$ has positive real part. The investigations are restricted to instabilities with $w$ real. It can be proved that, since the system is conservative and at rest in equilibrium, there exist no solutions with $w^2$ complex. (These would have represented oscillations with exponentially varying amplitude.)

The expression on the right-hand side of (47) is independent of $w$. The expression on the left-hand side can be proved to be a monotonically increasing function of $w$ in at least one rather special but important case, namely when $\alpha_P = \alpha_V = 0$ and $m=1$. However, for $w$ very small and for $w$ very large, an interpretation can be made.

Denote the expression on the left-hand side of (47) by $L$. By (33) we have $1 + \alpha_V^2 - \alpha_P^2 = 2\mu_0 p_0 / B_0^2 > 0$. From (48) it is apparent that if $x^2$ is expanded in powers of $w^2$ for $w^2$ small, the coefficient of the $w^2$ term is zero, so that $$\frac{\partial (x^2)}{\partial (w^2)}\bigg|_{w^2=0} = 0$$

It follows that $$\frac{\partial L}{\partial (w^2)}\bigg|_{w^2=0} = \frac{\partial}{2}(1+\alpha_V^2 - \alpha_P^2) K_m(y) > 0$$

For $w$ very large we have asymptotically $x \sim w$ ($x$ proportional to $w$), $$K_m(x) = \frac{1}{x} + \ldots \sim \frac{1}{w}$$

and therefore $L \sim w$.

Thus $L$ increases monotonically with $w$ for $w$ very small and $w$ very large and approaches $\infty$ with $w$. It follows that (47) can certainly be satisfied by a positive value of $w$ only if $L|_{w=0}$ is less than the right-hand side of (47), i.e., if $$\alpha_P^2 y^2 K_m(y) < 1 + (\alpha_V y \pm m)^2 L_m(y) \quad (54)$$

This is the condition that there be an unstable perturbation with characteristic constants $y$ and $m$. Taken with an equality sign, it may be construed as determining the values of $y$ which separate regions of instability from regions of stability.

If $\alpha_P = \alpha_V = 0$, (54) becomes $0 < 1 + m^2 L_m(y)$. For $m=0$ or 1 this is satisfied for all values of $y$ and hence all wavelengths are unstable. For $m \geq 2$ it is satisfied only for sufficiently large values of $y$, and only wavelengths smaller than a certain critical one (depending on $m$) are unstable.

Equation 54 may also of course be used to determine conditions on $\alpha_P$ and $\alpha_V$ that a given wavelength be stable. If $y$ is large, (54) becomes (to dominant terms) $\alpha_P^2 y < 1 - \alpha_V^2 y$ in view of (53), so that small wavelengths are stabilized if $$\alpha_P^2 + \alpha_V^2 \geq \frac{1}{y}$$

For $y$ small we use (52) and separate into cases:

(a) If $m=0$, we have stability of $2\alpha_P^2 + y^2 \nu \alpha_V^2 \geq 1$, so that purely radial long wavelength perturbations are easily stabilized by an internal longitudinal magnetic field $$\left(|\alpha_P| \geq \frac{1}{2}\sqrt{2}\right)$$

but only with difficulty by a purely external one $$\left(\alpha_P = 0, \ |\alpha_V| > \frac{1}{y\sqrt{\nu}}\right)$$

(b) If $m=1$, we have stability for $$\alpha_P^2 + \alpha_V^2 \pm \frac{2}{y}\alpha_V \geq +1$$

(c) If $m \geq 2$, we have stability for $$\alpha_P^2 + \alpha_V^2 \pm \frac{2m}{y}\alpha_V \geq -\frac{m(m-1)}{y^2}$$

Figure 3:
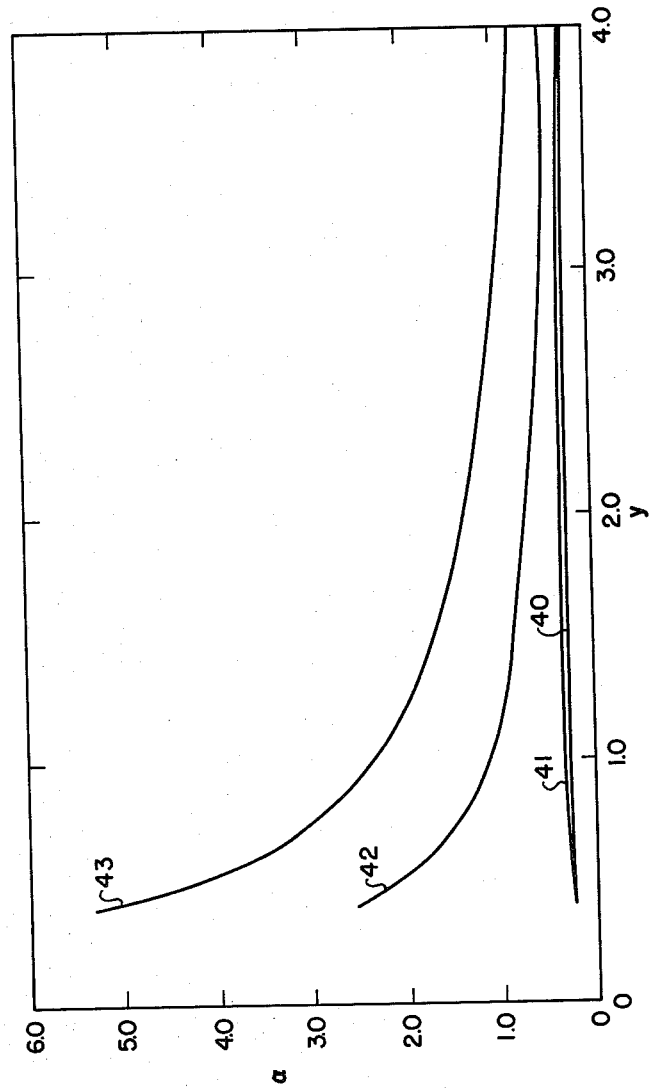
FIGURE 3 is a graph of the values of $\alpha_V$ required to stabilize all wavelengths less than $\lambda_c$ where the abscissa is $$y = \frac{2\pi r_0}{\lambda_c}$$

In general, given $\alpha_V$, there are two cases of particular interest for $\alpha_P$. One is the uniform case, $\alpha_P = \alpha_V$, and the other is the purely external case, $\alpha_P = 0$. The words "uniform" and "purely external" refer of course of the $z$-component of the magnetic field in the equilibrium. In each of these two cases the critical positive value of $\alpha_V$ which makes the two sides of (54) equal (taking $m=1$) has been computed for various values of $y$ and is given in Table 2. This has been done with the $+$ sign taken in (54) and also with the $-$sign. The results are graphed in FIGURE 3. In FIGURE 3, curve 40 is a plot of the variation of $y$ as a function of $\alpha$ for the uniform case considering $k\alpha_V + ve$. Curve 42 is for the uniform case and is similar to curve 40 except that that the minus sign is taken, i.e., $k\alpha_V - ve$ is the condition. Curve 43 is for the external case and is similar to curve 41 except that the minus sign is taken, i.e., $k\alpha_V - ve$ is the condition. One is thereby enabled to see how large $\alpha_V$ must be taken in each case to stabilize any given wavelength. Since both signs must be allowed for in (54), one must choose the larger numerical value of $\alpha_V$ in the uniform case and

TABLE 2

| $y_0$ | uniform case, plus sign (Curve 40) | uniform case, minus sign (Curve 41) | purely external case, plus sign (Curve 42) | purely external case, minus sign (Curve 43) |
|---|---|---|---|---|
| 0.4 | 0.23182 | 2.54908 | 0.24320 | 5.24320 |
| 0.5 | 0.24574 | 2.06020 | 0.26190 | 4.26190 |
| 0.6 | 0.25468 | 1.73785 | 0.27562 | 3.60895 |
| 0.7 | 0.26027 | 1.51020 | 0.28686 | 3.14300 |
| 0.8 | 0.26456 | 1.34143 | 0.29355 | 2.79355 |
| 0.9 | 0.26531 | 1.21201 | 0.29933 | 2.52156 |
| 1.0 | 0.26589 | 1.10965 | 0.30360 | 2.30360 |
| 1.2 | 0.26512 | 0.95883 | 0.30912 | 1.97579 |
| 1.4 | 0.26276 | 0.85343 | 0.31165 | 1.74022 |
| 1.6 | 0.25976 | 0.77567 | 0.31246 | 1.56246 |
| 1.8 | 0.25642 | 0.71583 | 0.31196 | 1.42307 |
| 2.0 | 0.25300 | 0.66821 | 0.31066 | 1.31066 |
| 2.5 | 0.24458 | 0.58200 | 0.30534 | 1.10534 |
| 3.0 | 0.23677 | 0.52288 | 0.29879 | 0.96546 |
| 4.0 | 0.22275 | 0.44400 | 0.28480 | 0.78480 |
| 5.0 | 0.21079 | 0.39176 | 0.27172 | 0.67172 | likewise in the purely external case. Since $\alpha_V$ has been taken positive, it is when the minus sign is chosen in (54) that one gets the larger value of $\alpha_V$ in each case. It is apparent that over the range of values of $y$ computed, it requires roughly twice as large a value of $\alpha_V$ to stabilize a given wavelength in the purely external case as it does in the uniform case.

The above discussion is with respect to the condition for instability (54) but nothing has been considered about the speed of instability given by $\omega$ or $w$. For this Equation 47 must be considered. First let us look at the special case $\alpha_P = \alpha_V = 0$. Then (47) reduces to $$\frac{\gamma}{2} w^2 K_m(\sqrt{y^2 + w^2}) = 1 + m^2 L_m(y) \quad (55)$$

For $y$ large this has asymptotically the solution $$w^2 = \frac{2}{\gamma} y + \left(\frac{1}{2} - \frac{2m^2+1}{\gamma}\right) + \ldots$$

Thus an arbitrarily great rate of growth is achieved for sufficiently small wavelengths. For a given small wavelength the dependence of $w$ on $m$ is slight, but $w$ is larger for smaller $m$, being greatest for the purely radial perturbation $m=0$.

For $y$ small separate cases are considered:

(a) If $m=0$, (55) has the asymptotic solution $$w^2 = \frac{1}{\gamma - 1} y^2 + \ldots$$

(b) If $m=1$, it has the solution $$w^2 = \frac{2}{\gamma}(\nu+1)y^2 + \ldots$$

(c) If $m=2$, (55) has no solution by $y$ smaller than that value which satisfies $$L_m(y) = -\frac{1}{m^2}$$

Therefore long wavelengths are only slowly unstable at all for perturbations which are purely radial ($m=0$) or lateral ($m=1$), the latter being slightly more rapid.

Suppose now that for $\alpha_P = \alpha_V = 0$ a solution $w$ of (47) for given $y$ and $m$ is obtained. How $w$ is affected when a small non-zero value of $\alpha_V$ is now introduced. To lowest order the right-hand side of (47) varies linearly with $\alpha_V$ if $m \geq 1$. The left-hand side, however, varies like a constant plus $\alpha_V^2$ for fixed $w$. L. the left-hand side of (47), is a monotonically increasing function of $w$. In any case, if (47), for the values of $y$ and $m$ under consideration, has a unique solution $w$, then L is certainly monotonically increasing in the neighborhood of that value of $w$. And even if (47) had more than one solution $w$, L would have to be monotonically increasing in the neighborhood of the largest solution (unless that solution were a double root), which would be the most pertinent one since it would give the fastest instability. Therefore, the dominant effect of a small non-zero value of $\alpha_V$ is to increase the right-hand side of (47) by $\pm 2m\alpha_V y L_m(y)$ and to increase or decrease the solution $w$ according to whether this expression is positive or negative. Since the plus or minus sign must be chosen in accordance with the sign of $k$, and since $2myL_m(y)<0$, it is seen that $w$ is increased or decreased according to whether $k\alpha_V$ is negative or positive. Now the sign of $k$ determines the direction of spiral of the perturbation (which has constant phase for $m\theta + kz$ constant), while the sign of $\alpha_V$ determines the direction of spiral of the equilibrium magnetic field in the vacuum. When these two spirals twist in the same direction $k\alpha_V$ is negative and $w$ is increased; when they twist oppositely $k\alpha_V$ is positive and $w$ is decreased. This effect is not hard to understand physically: Let the perturbation be given (i.e., $k$ and $m$). When $\alpha_V = 0$ the equilibrium magnetic lines of force in the vacuum are circles, whereas for small non-zero $\alpha_V$ they are tight spirals. If these spirals twist in the same direction as the perturbation then the lines of force are less bent by the perturbation (i.e., have successive crests further apart) than when $\alpha_V = 0$; if they twist in the opposite direction then the lines are more bent (i.e., have successive crests closer together) than when $\alpha_V = 0$ (see FIGURE 3). Naturally, if they are less bent they provide less restoring force and allow the instability to go faster, whereas if they are more bent they provide more restoring force and slow down the rate of growth of the perturbation. These conclusions all apply even if $\alpha_P$ is allowed to have a small non-zero value as well as $\alpha_V$, so long as $\alpha_P^2$ is small compared to $|\alpha_V|$ (which is so, for example, in the uniform case $\alpha_P = \alpha_V$).

In the previous paragraph the effect of a small non-zero value of $\alpha_V$ for $m \geq 1$ was considered. What happens when $m=0$? Assume that a solution of (47) for $$\alpha_P = \alpha_V = 0$$

is obtained; i.e., a value of $w$ satisfying $$\frac{\gamma}{2} w^2 K_0(\sqrt{y^2+w^2}) = 1$$

When $\alpha_P$ and $\alpha_V$ are allowed to take non-zero values let the new solution of (47) be $w + \delta w$. Then for $\alpha_P$ and $\alpha_V$ small it is found that (to dominant terms)

$$\frac{4(\gamma-1)(y^2+w^2)+\gamma^2 w^4}{2\gamma w(y^2+w^2)} \delta w + (1-y^2 L_0(y))\alpha_V^2$$

$$+ \left(\frac{2\gamma y^2 + 4(y^2+w^2)}{\gamma^2 w^2} - 1 - w^2\right)\alpha_P^2 = 0$$

The coefficient $\delta w$ is positive (since $\gamma > 1$) and also of course that $\alpha_V^2$. It can also be proved that the coefficient of $\alpha_P^2$ is positive. Therefore, the introduction of any small $\alpha_P$ and $\alpha_V$ has the effect of making $\delta w$ negative and diminishing the solution $w$ of (47). In other words, the introduction of a small $z$-component to the equilibrium magnetic field slows down the rate of growth of the purely radial perturbation of any given wavelength. This is of course physically understandable on the same basis as before.

The above discussion has generally kept $y$ (and therefore the wavelength of the perturbation) constant, and we have seen that a small $\alpha_V$ of sign opposite to $k$ has the effect, when $m \geq 1$, of making $w$ larger than its value for $\alpha_P = \alpha_V = 0$. From this it must not be supposed that $w$ is increased simultaneously for all values of $y$. Quite the contrary is the case. No matter how small $\alpha_V$ is, there are values of $y$ so large that $w$ is decreased. Indeed, to restate an earlier conclusion, perturbations with $$y > \frac{1}{\alpha_P^2 + \alpha_V^2}$$

are completely stabilized. Of course, a small $\alpha_V$ of the same sign as $k$ does increase $w$ simultaneously for all values of $y$, but here again the effect is vastly greater when $y$ is large, the wavelengths which originally (for $$\alpha_P = \alpha_V = 0$$

had arbitrarily large $w$ now becoming completely stabilized. Mathematically, the situation may be described as non-uniform convergence of $w$ with respect to $y$ as $\alpha_V$ approaches zero.

Characteristic Equation 47 may be considered to determine $w$ as a function of $y$ for $\alpha_P$ and $\alpha_V$ given. In other words, the rate of growth of a perturbation is considered as a function of its wavelength. From this point of view, the most pertinent question physically would seem to be, what is the maximum value of $w$ and for what $y$ is it achieved? For $\alpha_P = \alpha_V = 0$, $w$ approaches infinity with $y$ and has therefore no maximum. In this case the equilibrium would in principle presumably "blow up" instantaneously. This conclusion must be modified because of the neglect of the finiteness of light velocity. A much more serious limitation of this conclusion in physical applications is that plasma Equations 19 through 32 cannot be expected to apply to perturbations whose wavelengths are too small. The limiting wavelength is likely to be the Larmor radius of the plasma ions in a magnetic field of the order of $B_0$.

The next consideration is to find, for given $\alpha_P$ and $\alpha_V$, the maximum value of $w$ and the value of $y$ for which it is attained. First of all, these values of $w$ and $y$ must of course satisfy (47). (Note that $x$ is given by (48).) Further, $w$ as a function of $y$ (defined implicitly by (47)) must have a vanishing derivative at the maximum, so $w$ and $y$ must satisfy the equation obtained from (47) by taking the partial derivative with respect to $y$ throughout. Thus two equations are obtained to determine $w$ and $y$.

Taking $\alpha_P$ and $\alpha_V$ very small then $w$ and $y$ may be expected to be very large and one can examine the asymptotic behavior of these two equations. Their asymptotic solutions turn out to be $$w^2 = \frac{2}{\gamma}\frac{\sqrt{m^2+1/2}}{\alpha_V}, \quad y = \frac{\sqrt{m^2+1/2}}{\alpha_V}$$

both in the uniform case ($\alpha_P = \alpha_V$) and in the purely external case ($\alpha_P=0$). It is interesting to notice that the value of $y$ for which $w=0$, as found before, is $$\frac{1}{\alpha_P^2+\alpha_V^2}$$

and therefore much larger than the value of $y$ for maximum $w$. Even more interesting is that the maximum $w$ increases with $m$, whereas it was previously found that when $\alpha_P=\alpha_V=0$ (in which the case there is no maximum) the value of $w$ for any fixed large value of $y$ decreases with increasing $m$.

The next consideration is what happens to the curve $w$ as a function of $y$ when $\alpha_V$ is made very large. Since the dependence on $\alpha_P$ seems to involve additional complications we shall restrict ourselves to the uniform and the purely external cases. First we see that for any given $y$ the right-hand side of (47) becomes negative for sufficiently large $\alpha_V$, so that there can be no solution $w$. Indeed, this is true uniformly in $y$ for all $y$ larger than any given value, since over such a range $y^2 L_m(y)$ remains below a negative constant. It follows that as $\alpha_V$ gets larger and larger and approaches infinity, the entire $w$, $y$-curve (always for $w$ real and positive) lies between zero and a value of $y$ which gets smaller and smaller and approaches zero. In other words, if the $z$ component of the equilibrium magnetic field is very large, only very long wavelengths can be unstable.

First take $m=0$. Since $y$ is small, according to a previous conclusion instability results if and only if $$2\alpha_P^2+y^2\nu\alpha_V^2<1$$

(asymptotically). In the uniform case, this means the curve entirely disappears for large $\alpha_V$, in fact for $\alpha_V$ numerically greater than $$\frac{1}{2}\sqrt{2}$$

In the purely external case, however, not matter how large $\alpha_V$ is, there is instability for sufficiently small $y$. In this case an asymptotic analysis leads to the conclusion that the maximizing $y$ satisfies $$\alpha_V^2 y^2\left(2\nu+\frac{1}{2}\right)=1$$

and that the maximum $w$ is given by $$w^2=\frac{1}{\gamma}\left(\nu+\frac{1}{2}\right)y^4$$

Note that $w=0$ for $y$ satisfying $\alpha_V^2 y^2 \nu = 1$, which in the limit is $\sqrt{2}$ times the maximizing $y$.

Next take $m=1$. The conditions for stability when $y$ is small was given before as $$\alpha_P^2+\alpha_V^2\pm\frac{2}{y}\alpha_V\geq\nu+1$$

Suppose first that $\pm\alpha_V>0$, so that the spirals have opposite directions of twist. Then in both the uniform and the purely external cases a given $y$ is stable as soon as $\pm\alpha_V$ exceeds the small value $$\frac{1}{2}(\nu+1)y$$

In fact, from Table 2 it can be seen that all values of $y$ are stable for $\pm\alpha_V$ greater than or equal to about 0.266 in the uniform case and 0.312 in the purely external case, the values of $y$ which last become stabilized being about 1.0 and 1.6 in the two cases respectively. Suppose next that $\pm\alpha_V<0$, so that the spirals have the same direction of twist. Then instability results for $$y<\pm\frac{1}{\alpha_V}$$

in the uniform case and for $$y=\pm\frac{1}{2\alpha_V}$$

in the purely external case. (This is of course for $\alpha_V$ large.) By an asymptotic analysis for $\alpha_V$ large it is found that in the uniform case the maximum $w$ is achieved for $$y=\pm\frac{1}{2\alpha_V}$$

(which is half the value of $y$ for which $w=0$) and approaches $$\frac{1}{\sqrt{\gamma}}$$

The maximum $w$ does not vanish in the limit. This means that no matter how large a uniform $z$-component the equilibrium magnetic field may have, there are always some perturbations of long wavelength whose rate of growth is not arbitrarily small. This limiting rate of growth is characterized by an $e$-folding time equal to $\sqrt{\gamma}$ times the time it takes a sound wave to traverse the radius of the cylinder of plasma. In the purely external case we find that asymptotically the maximum $w$ is achieved for $$y=\pm\frac{1}{\alpha_V}\left(1+\frac{1}{4\alpha_V^2}+\cdots\right)$$

(again half the value of $y$ for which $w=0$) and is given by $$w^2=\frac{2}{\gamma\alpha_V^2}+\cdots$$

This rate of growth approaches zero and is therefore much less than the rate in the uniform case, whereas for $m=0$ it was found that the purely external case is unstable (though much more slowly than for $m=1$) and the uniform case completely stable.

Finally let $m\geq 2$. The condition for stability when $y$ is small was given before as $$\alpha_P^2+\alpha_V^2\pm\frac{2m}{y}\alpha_V\geq\frac{m(m-1)}{y^2}$$

If $\pm\alpha_V>0$ all wavelengths are stable as soon as $\alpha_V$ exceeds some definite value (depending on $\alpha_P$), just like when $m=1$, so suppose that $\pm\alpha_V<0$. Even here all wavelengths are stable in the uniform case, although for $m=2$ the uniform case is marginal in this respect, some unstable wavelengths appearing if $\alpha_P=\phi\alpha_V$, where $\phi$ is any constant numerically less than unity. For general $m\geq 2$, in fact, there are unstable wavelengths if and only if $$\phi^2<\frac{1}{m-1}$$

In the purely external case (which presumably gives the fastest instability) we find by an asymptotic analysis that the maximum $w$ is achieved for $$y=\neq\frac{m}{\alpha_V}$$

and is given by $$w^2=\frac{2}{\gamma}\frac{m}{\alpha_V^2}$$

There is instability only for $y$ between $$\pm\frac{m-\sqrt{m}}{\alpha_V}$$

and $$\pm\frac{m+\sqrt{m}}{\alpha_V}$$

the maximizing $y$ being the arithmetic mean of these two values for which $w=0$. It should be noted that as far as the purely external case goes, the results for $m=1$ are also correctly given by these formulas.

In accordance with all the foregoing analysis the $w$, $y$- curves are shown qualitatively in FIGURES 5, 6, 7, and 8 remembering that $$w = \sqrt{\frac{\rho_0}{\gamma p_0}} r_0 \omega$$

and that $$y = |k| r_0 = 2\pi \frac{r_0}{\lambda}$$

For $\alpha_P = \alpha_V = 0$ and $m=0$ and $m=1$ the curves start at the origin where they behave like $$w^2 = \frac{1}{\gamma - 1} y^2$$

and $$w^2 = \frac{2}{\gamma}(\nu + 1) y^2$$

respectively, while for $m \geq 2$ they start with $w = 0$ at the value of $y$ satisfying $$L_m(y) = -\frac{1}{m^2}$$

For $y$ large the curves are all mutually asymptotic, behaving like $$w^2 = \frac{2}{\gamma} y + \left(\frac{1}{2} - \frac{2m^2 + 1}{\gamma}\right) + \ldots$$

Presumably there are no intersections except one between the curves $m=0$ and $m=1$ at $y=.429$, $w=.494$.

If now $\alpha_V$ is given a very small value the curves are little affected except that when $y$ gets very large they turn downward and eventually end at the $y$-axis. For $m=0$ or for $m \geq 1$ and $k\alpha_V > 0$ the curves are decreased everywhere, while for $m \geq 1$ and $k\alpha_V < 0$ they are increased except for large $y$.

As $\alpha_V$ is increased (numerically) the $m=0$ curve shrinks toward the origin, disappearing there for $$|\alpha_V| = \frac{1}{2}\sqrt{2}$$

in the uniform case but never quite disappearing in the purely external case. For $m \geq 1$ and $k\alpha_V > 0$ curves shrink toward points on the $y$-axis where they disappear for finite values of $\alpha_V$ (which of course depend on $\alpha_P$). For $m=1$ and $k\alpha_V < 0$ the curve starts always at the origin but ends at a point of the $w$-axis which approaches the origin as $\alpha_V$ becomes infinite. In the uniform case the maximum of the curve approaches the point $$w = \frac{1}{\sqrt{\gamma}}$$

on the $\omega$-axis while in the purely external case the whole curve shrinks to the origin. For $m \geq 2$ and $k\alpha_V < 0$ the curves in the uniform case shrink toward points on the $y$-axis where they disappear for finite values of $\alpha_V$ (except possibly the curve $m=2$ for which the uniform case is critical and which may therefore shrink toward the origin but never quite disappear), while in the purely external case they shrink toward (but never start quite at) the origin as $\alpha_V$ becomes infinite.

Before considering FIGURES 5 through 8 in detail it is necessary to understand the nature of the instabilities of the pinch. In general instabilities in the pinch are described in mathematical terms as follows:

$$r = r_0 \exp(im\theta + ikz + \omega t)$$

where $m$ describes the configuration of the instability, $k$ describes the nature of the wavelength of the instability, and $\omega$ describes the growth rate of the instability.

$$k = \frac{2\pi}{\lambda}$$

and $\lambda$ is the wavelength. $m$ takes on various integer values greater than zero, the value of the integer determining the nature of the instability. In FIGURE 4 the various types of primary instabilities of a pinched plasma are shown. The pinched plasma 44 is originally symmetrical with respect to the center line 46 and is a cylindrically shaped confined plasma. It is apparent from the above equation that for $m=0$ the instability will be independent of $\theta$ so that the pinch will be either constricted over a short length 48 or expanded over a short length 49 symmetrical with the initial axis of the pinched plasma. This instability is referred to as sausage type instability. When $m=1$ the instability is generally referred to as kink instability and, as is apparent from FIGURE 4, the plasma is displaced 50 from the initial axis over a length $\lambda$ which is referred to as the wavelength of the instability. It should be noted that for $m=1$ the displacement of the pinch is in one direction. When $m=2$ the pinched plasma is displaced on both sides of the initial axis, each displacement having a wavelength $\lambda$. For values of $m$ greater than two the instabilities are merely combinations of the illustrated primary instabilities and thus any method which will stabilize the three primary instabilities will stabilize combinations of these instabilities.

FIGURE 5 illustrates the case where no longitudinal magnetic field is present, i.e., the case where $\alpha_P = \alpha_V = 0$. In this figure the abscissa $y$ is defined by Equation 37 and is directly proportional to $k$, where $$k = \frac{2\pi}{\lambda}$$

Thus the abscissa is proportional to the reciprocal of the wavelength. Thus, short wavelengths appear on the right of the abscissa of FIGURE 5, while long wavelengths appear on the left of the abscissa of FIGURE 5. It is apparent from FIGURE 5 that the growth rate of all the instabilities increases with decreasing wavelength in the case where no longitudinal magnetic field is present. The vertical axis $w$ is the growth rate of the instability. Curves 52 through 56 represent instabilities $m=0$ through $m=4$, respectively. Point 58 is the intersection of the curves $m=0$ and $m=1$ at $y=.429$ and $w=.494$ as pointed out above. This point establishes the linear scale relation between $w$ and $y$ for FIGURES 5 through 8.

FIGURE 6 shows the effect on the instability $m=0$ of increasing absolute value of $\alpha_V$ where $\alpha_V$ is defined in Equation 46. For $\alpha_P = \alpha_V = 0$, the growth rate is the same as is shown in FIGURE 5. This condition is plotted in each of the FIGURES 5 through 8 to establish their relation to the scale of FIGURE 1. For an absolute value of $\alpha_V = 0.1$, two cases are shown; curve 60 representing the purely external case, i.e., $\alpha_P = 0$, and curve 61 representing the uniform case where $\alpha_P = \alpha_V$. Further, it is apparent from curve 62 where the absolute value of $\alpha_P$ is 0.7, the growth rate of the $m=0$ instability is significantly reduced. Thus, in general the curves for $m=0$ shrink towards the origin when the absolute value of $\alpha_V$ increases, disappearing when the absolute value of $$\alpha_V = \frac{1}{2}\sqrt{2}$$

in the uniform case but never quite disappearing in the purely external case.

FIGURE 7 is similar to FIGURE 6, and curve 64 represents the uniform case and curve 65 represents the purely external case where the absolute value of $\alpha_V$ is 0.1. When the absolute value of $\alpha_V$ is further reduced to 0.25, shown by curves 66 and 67 for the uniform and the external case, respectively, the growth rates are materially reduced. Thus the curves $m=1$ of FIGURE 7, where $k\alpha_V \geq 0$ (so that the perturbation spirals opposite to the magnetic field) shrink towards the points on the $y$ axis with 1.0 in the uniform case and 1.6 in the purely external case, disappearing there at $\alpha_V = 0.266$ and $\alpha_V = 0.312$ respectively.

FIGURE 8 is similar to FIGURE 7 and treats the perturbation $m=1$ where $k\alpha_V \leq 0$ so that the perturbation spirals in the same direction as the magnetic field. Curves 70 and 71 show the external and uniform case for an absolute value of $\alpha_V=0.2$. Curves 72 and 73 show the external and uniform case for an absolute value of $\alpha_V=10$. It is apparent from FIGURE 8 that the curves shrink towards the $w$ axis in the uniform case as $\alpha_V$ becomes infinite. The maximum growth rate $\omega$ approaches $$\frac{1}{\sqrt{\gamma}}$$

as shown by curve 74. In the purely external case they shrink toward the origin.

Thus, it is apparent that a longitudinal magnetic field has the effect of stabilizing short wavelength perturbations but that at least some of the long wavelengths remain unstable no matter how large the externally imposed longitudinal magnetic field might be. Therefore, additional means must be provided before a completely stabilized pinched plasma can be obtained. The present invention discloses that by utilizing a conducting shell around the containing device together with a longitudinal magnetic field confined to the interior of the pinch long wavelength as well as short wavelength perturbations can be stabilized.

*Complete stabilization of a pinched plasma*

The geometry considered (see FIG. 9) is that of an infinitely long non-conducting cylinder 76 of negligible thickness along the z-axis. The inside radius $r_0$ is the radius of the confined plasma 44 at uniform pressure and density and containing uniform longitudinal field of magnitude $\alpha_p B_0$. Outside the plasma is a region of vacuum 77 extending to the cylinder 76, which is surrounded by an external conductor 78 at radius $\beta r_0$. In the vacuum is a magnetic field with azimuthal component $B_0 r_0/r$ and longitudinal component $\alpha_V B_0$. Perturbations which vary like $[e^{i(kz \pm m\varphi)}]$ are considered. The object is to show for what values of the parameters $\alpha_p$, $\alpha_V$, and $\beta$ the pinch is stable for all $m$ and $k$.

The method used to calculate the stability is to make the relevant virtual displacement and note whether the resulting pressure distribution at the plasma surface is such as to cause the displacement to grow. This is equivalent to calculating the change of energy of the system. For a given set of parameters, $\alpha_p$, $\alpha_V$, $\beta$, $m$, $Y=kr_0$, the pinch is stable if:

$$\alpha_p^2 Y^2 K_m(Y) + (m \pm \alpha_V Y)^2 \frac{G_{\beta,m}(Y) K_m(Y) - L_m(Y)}{1 - G_{\beta,m}(Y)} > 1 \quad (119)$$

where $K_m$, $L_m$, and $G_{\beta,m}$ are defined in terms of Bessel functions as $$K_m(Y) = \frac{J_m(iY)}{iY J'_m(iY)}, \quad L_m(Y) = \frac{H_m(iY)}{iY H'_m(iY)} \quad (119')$$

$$G_{\beta,m}(Y) = \frac{H'_m(i\beta Y)}{H'_m(iY)} \frac{J'_m(iY)}{J'_m(i\beta Y)}$$

The particle picture leads to a slightly different form $$\left(1 + \frac{4\pi(p_1 - p_3)}{\alpha_p^2 B_0^2}\right) \alpha_p^2 Y^2 K_m(\gamma Y)$$

$$+ (m \pm \alpha_V Y)^2 \frac{G_{\beta,m}(Y) K_m(Y) - L_m(Y)}{1 - G_{\beta,m}(Y)} > 1 \quad (120)$$

Here $p_1$ and $p_3$ are components of the pressure tensor along and perpendicular to the field respectively and $$\gamma = \sqrt{\frac{(\alpha_p^2 B_0^2/4\pi) + p_1 - p_3}{(\alpha_p^2 B_0^2/4\pi) + S p_3}}$$

$$S = \frac{1}{2} \frac{\int_0^1 \partial f/\partial \mu [(1-\mu^2)^2/\mu] d\mu}{\int_0^1 f(\mu)(1-\mu^2) d\mu} \quad (121)$$

where $f(\mu)$ represents the initial angular distribution of particle velocity relative to the z-axis. For an initially isotropic distribution $S = p_1 - p_3 = 0$ and Equation 120 becomes identical with Equation 119. In practice, it is likely that $p_3 > p_1$ and Equation 120 is then somewhat less favorable than Equation 119.

The equation governing the field change is $$\frac{1}{C} \frac{\partial \vec{B}}{\partial t} = -\nabla \times E = +\nabla \times \left(\frac{\vec{v}}{C} \times \vec{B}\right) \quad (122)$$

The second equation in the plasma is the equation expressing the fact that particles are tied to field lines and move with the $E \times B$ drift. Thus $\vec{\xi}$ is defined as, $$\vec{\xi} = \int \vec{v} dt \quad (123)$$

Then integrating Equation 122 an equation is obtained for the change in field, $$\vec{\delta B} = \nabla \times (\vec{\xi} \times \vec{B_i}) \quad (124)$$

where $B_i$ is the unperturbed field. Only terms linear in the displacement, $\vec{\xi}$, are of interest.

The present method is to make a virtual displacement which, within each medium, preserves the equilibrium condition. Thus in the vacuum $$\vec{j} = \frac{\nabla \times \vec{\delta B}}{4\pi} = 0 \quad (125)$$

and in the plasma $$\left(\frac{\nabla \times \vec{\delta B}}{4\pi}\right) \times \vec{B_i} - \nabla \cdot p = 0 \quad (126)$$

where $p$ is the pressure tensor of the plasma.

In the magnetohydrodynamic approximation, Equation 126 becomes $$\left(\frac{\nabla \times \vec{\delta B}}{4\pi}\right) \times \vec{B_i} - \nabla p = 0 \quad (127)$$

When we consider non-scalar effects Equation 126 becomes $$\left(\frac{\nabla \times \vec{\delta B}}{4\pi}\right) \times \vec{B_i} - \nabla p_3 + (p_1 - p_3)\frac{\partial \hat{e}_1}{\partial x_1}$$

$$+ \hat{e}_1 \left\{ \frac{\partial (p_1 - p_3)}{\partial x_1} - \frac{p_1 - p_3}{b} \frac{\partial b}{\partial x_1} \right\} \quad (128)$$

Here $\hat{e}_1$ is a unit vector along the field lines and $b$ the magnitude of the field. The pressure tensor is of the well-known form $$p = \begin{pmatrix} p_1 & 0 & 0 \\ 0 & p_3 & 0 \\ 0 & 0 & p_3 \end{pmatrix} \quad (129)$$

From Equation 125, $$\vec{\delta B} = \nabla \psi$$

$$\nabla \cdot \vec{\delta B} = \nabla^2 \psi = 0 \quad (130)$$

The solution with the desired $z$ and $\theta$ dependence is $$\psi = [A J_m(ikr) + B H_m(ikr)] e^{i[kz \pm m\theta]} \quad (131)$$

A and B are to be determined from the boundary condition at the external conductor and displaced plasma interface $$\delta \vec{B} \cdot \vec{n} = 0 \quad (132)$$

or $$\delta B_r(\beta r_0) = 0$$
$$\delta B_r(r_0) + B_0 \delta[-ik\alpha_V r_0 \mp im] = 0 \quad (132')$$

where it has been assumed that displaced plasma interface is given by $$r = r_0[1 + \delta e^{i(kz \pm m\theta)}] \quad (133)$$

Use Equation 132' to determine the coefficients A and B in Equation 131, and it is determined that $$B = -A \frac{J'_m(ik\beta r_0)}{H'_m(ik\beta r_0)}$$

and $$A = \frac{B_r \delta/k[k\alpha_V r_0 \pm m]}{J'_m(ikr_0) - [J'_m(ik\beta r_0)/H'_m(ik\beta r_0)]H'_m(ikr_0)} \quad (134)$$

Finally, the change in pressure on the plasma surface resulting from the displacement is calculated as $$\delta P_0 = \delta \frac{B^2}{8\pi} = \frac{B_0^2}{4\pi}[\delta B_\theta + \alpha_V \delta B_z] - \frac{B_0^2 \delta}{4\pi} e^{i(kz \pm m\theta)} \quad (135)$$

The last term in Equation 135 results from the evaluation of $B_0 r_0/r$ at the displaced radius.

Using Equations 119', 130, 131 and 134 a new equation for the change in pressure is obtained.

$$\delta P_0 = \frac{B_0^2}{4\pi} e^{i(kz \pm m\theta)}$$
$$\left\{ -1 + (m \pm \alpha_V Y)^2 \frac{G_{\beta,m}(Y) K_m(Y) - L_m(Y)}{1 - G_{\beta,m}(Y)} \right\} \quad (136)$$

It should be noted that the minus one in Equation 136 tends to give $\delta P_0$ the opposite sign for the displacement. In other words, the pressure is smaller where the surface is bulged out, thus lending to instability. $\delta P_i$, the resultant pressure inside must, however, be calculated in order to obtain the net restoring force.

The equation of equilibrium in the plasma is given by Equations 124 and 127 as $$\{\nabla \times \nabla \times (\vec{\xi} \times \vec{B_i})\} \times \vec{B_i} - \nabla \delta p = 0 \quad (137)$$

To evaluate $\delta p$, it is noted that $$\frac{d\rho}{dt} = -\rho_i \nabla \cdot \vec{v}$$

and $$\frac{d}{dt}(\rho p^{-\gamma}) = 0 \quad (138)$$

so that $$\delta p = -\gamma p_i \nabla \cdot \vec{\xi} \quad (139)$$

Multiplying Equation 137 by $\vec{B_i}$, we obtain $$\vec{B_i} \cdot \nabla \nabla \cdot \vec{\xi} = 0$$

Since $\vec{B_i}$ in the plasma is in the z direction and $\nabla \cdot \vec{\xi}$ for the perturbation varies as $e^{kz}$, then $$\delta p = \nabla \cdot \vec{\xi} = 0 \quad (140)$$

In considering the components of Equation 137 normal to $\vec{B}$, it is useful to use the vector identity $$\nabla \times (\vec{\xi} \times \vec{B_i}) = +(\vec{B_i} \cdot \nabla)\vec{\xi} - (\vec{\xi} \cdot \nabla)\vec{B_i} \nabla \cdot \vec{\xi} - \vec{\xi} \nabla \cdot \vec{B_i}$$

In the case considered, this simplifies to $$\delta \vec{B} = \nabla \times (\vec{\xi} \times \vec{B_i}) = +(\vec{B_i} \cdot \Delta)\vec{\xi} \quad (141)$$

and Equation 137 becomes $$(\vec{B_i} \cdot \nabla)(\nabla \times \vec{\xi}) = 0$$

since $B \cdot \nabla$ commutes with $\nabla \times$ and the other terms vanish.

As before, this implies $$\nabla \times \vec{\xi} = 0 \quad (142)$$

Finally, Equations 140 and 142 imply $$\vec{\xi} = C \nabla [J_m(ikr) e^{i(kz \pm m\theta)}]$$

The boundary condition on $\xi_r$ is given by Equation 133 so that $$\vec{\xi} = \frac{r_0 \delta}{ik J'_m(ikr)} \nabla [J_m(ikr) e^{i(kz \pm m\theta)}] \quad (143)$$

From Equations 141 and 143.

$$\delta B_z = B_i \left[ \frac{-kr_0 \delta}{iJ'_m(ikr)} \right] J_m(ikr) e^{i(kz \pm m\theta)}$$

Finally, we compute $$\delta P_i = \frac{B_i}{4\pi} \delta B_z \text{ at } r = r_0$$

and recall that $B_i = \alpha_p B_0$ to obtain $$\delta P_i = -\frac{\alpha_p^2 B_0^2 \delta}{4\pi} Y^2 K_m(Y) e^{i(kz \pm m\theta)} \quad (144)$$

Therefore, the stability condition requires that $$\frac{\delta P_0 - \delta P_i}{r - r_0} > 0$$

and by using Equation 136, we obtain Equation 119

$$\alpha_p^2 Y^2 K_m(Y) + (m \pm \alpha_V Y)^2 \frac{G_{\beta,m}(Y) K_m(Y) - L_m(Y)}{1 - G_{\beta,m}(Y)} > 1$$

In applying Equation 128, the principal problem is the evaluation of the changes in the pressure tensor brought about by the deformation. These will be calculated by considering the effect of the displacement on the orbit of a single particle and then summing over all orbits.

Before the deformation, the number of particles per cubic centimeter per unit energy and solid angle is given by $g(E_0) f(\mu) dE_0 d\mu$.

Here $E_0$ and $\mu$ are the energy of the particles and the direction cosine of its velocity vector with the z-axis before the displacement.

The adiabatic invariants of the motion are the magnetic moment and the action integral, $$\frac{E_\perp}{B_i + \delta b(l)} = \text{const} = \frac{E_0(1 - \mu^2)}{B_i} \quad (145)$$

$$\int \sqrt{E_\parallel} dl = \int \sqrt{E_0 + \delta E - [B_i + \delta b(l)][E_0(1-\mu^2)/B_i]} dl$$
$$= |\mu| \sqrt{E_0} \int dl \quad (146)$$

Here $\delta E_0$ and $\delta b(l)$ are the changes induced in E and B by the displacement. $E_\perp$ and $E_\parallel$ are the orbital energies perpendicular and parallel to the field lines and $dl$ is the element of length along the line.

Relations (145) and (146) are related to conservation of angular momentum about the field direction, and conservation of linear momentum along the field lines. The integral on the left of Equation 146 is to be extended over a complete period of the perturbation, unless $E_\parallel$ goes to zero in which case the integral is to be extended between the turning points of the orbit.

Now the variation in field strength is given by $$\delta b = \epsilon(r) B_i \cos(kz \pm m\theta)$$

Along a given field, line $r$ and $\theta$ are constant while $z$ varies. Hence, in Equation 146, we may use $l = (kz \pm m\theta)$ and
$$\delta b(l) = \epsilon B_i \cos l$$

so that Equation 146 becomes $$2\pi \text{ or } 2\pi - \cos^{-1}\left[\frac{1+(\delta E/\mu^2 E_0)}{[(1-\mu^2)/\mu^2]\epsilon}\right]$$

$$\int \sqrt{[1+(\delta E/\mu^2 E_0)] - [(1-\mu^2)/\mu^2]\epsilon \cos l}\, dl = 2\pi \quad (147)$$

$$0 \text{ or } \cos^{-1}\left[\frac{1+(\delta E/\mu^2 E_0)}{[(1-\mu^2)/\mu^2]\epsilon}\right]$$

Equation 147 is the determining equation for $\delta E$. The alternative limits on the integral are to be used if the square root quantity would be negative at 0 or $2\pi$.

Next the expression for the pressure as a sum over particles is obtained. The equilibrium equation in the direction $\hat{e}_1$, along the lines, is automatically satisfied by this approach, since it only means that the particles are moving in orbits consistent with the magnetic field. By definition, $p_3$ is the energy density per cubic centimeter in the plane perpendicular to the field. The contribution of the particles in the range $dE_0 d\mu_0$ will be just the density of such particles times their perpendicular energy, given by Equation 145. The density of such particles is $$\rho(E_0, \mu) = g(E_0) f(\mu)(1+\epsilon \cos l)\frac{(1/v_{\parallel})\int dl}{\int (dl/v_{\parallel})} \quad (148)$$

where $$v_{\parallel} = \sqrt{1 + \frac{\delta E}{\mu^2 E_0} - \frac{(1-\mu^2)}{\mu^2}\epsilon \cos l}$$

and the limits on the integral are the same as those in Equation 147.

The factor $(1+\epsilon \cos l)$, the ratio of magnetic field to initial field, arises from the fact that particles are attached to field lines so that their density is proportional to the density of field lines, i.e., B. The last term in Equation 148 is the fraction of its time which the particle spends at a given position of its orbit. Combining Equations 145 and 148, we get $$p_3 = 2\int_0^{\infty} E_0 g(E_0) dE_0 \int_{\mu}^1 d\mu f(\mu)(1-\mu^2)(1+\epsilon \cos l)^2 \frac{2\pi}{v_{\parallel}\int dl/v_{\parallel}} \quad (149)$$

In writing Equation 149, we have assumed $f(\mu)$ to be even. $\bar{\mu}$ is the angle at which $v_{\parallel}$ parallel vanishes.

Next, introducing $$\tau = \frac{1+(\delta E)/(\mu^2 E_0)}{[(1-\mu^2)/(\mu^2)]\epsilon}$$

a new expression for $p_3$ is obtained $$p_3 = 4\pi \int_0^{\infty} E_0 g(E_0) dE_0 \int_{\cos l}^{\infty} d\tau f(\mu)(1-\mu^2)(1+\epsilon \cos l)^2$$

$$\frac{1}{\sqrt{1-\cos l/\tau}}\frac{d\mu}{d\tau}\frac{1}{\int dl'/\sqrt{1-(\cos l'/\tau)}}$$

$$0 \text{ or } \cos^{-1} \tau \quad (150)$$

and Equation 147 becomes $$2\pi, 2\pi - \cos^{-1} \tau$$

$$I(\tau) = \frac{1}{2\pi}\int \sqrt{\tau - \cos l'}\, dl' = \frac{1}{\sqrt{[(1-\mu^2)/\mu^2]\epsilon}}$$

$$0, \cos^{-1}\tau \quad (151)$$

From Equation 151, we obtain $$\frac{d\mu}{d\tau} = \frac{1}{4\pi}(1-\mu^2)^{3/2}\frac{\sqrt{\epsilon}}{\sqrt{\tau}}\int_{0,\cos^{-1}\tau}^{2\pi, 2\pi-\cos^{-1}\tau}\frac{dl}{\sqrt{1-(\cos l')/\tau)}}$$

Substituting in Equation 150, we obtain $$p_3 = \int_0^{\infty} g(E_0) E_0 dE_0 \int_{\cos l}^{\infty} \frac{d\tau f(\mu)}{\sqrt{\tau - \cos l}}(1-\mu^2)^{5/2}\sqrt{\epsilon}(1+\epsilon \cos l)^2 \quad (152)$$

Equation 152 is evaluated up to terms linear in $\epsilon$, since higher order terms are not needed for the linearized equations.

Solving Equation 151 for $(1-\mu^2)$, it is found that $$(1-\mu^2) = \frac{1}{1+\epsilon I^2(\tau)}$$

However, $I^2(\tau) \to \tau - a/\tau + \ldots$ as $\tau \to \infty$ and goes to zero at $\tau = -1$ and is finite at all points between. Expanding, $$f(\mu) = \sum_{n=0}^{\infty} a_n (1-\mu^2)^n$$

Then, $$p_3 = \sum_n a_n \int_0^{\infty} g(E_0) E_0 dE_0 \int_{\cos l}^{\infty} \frac{d\tau}{\sqrt{\tau - \cos l}}$$

$$\sqrt{\epsilon}(1+\epsilon \cos l)^2 \frac{1}{(1+\epsilon \tau)^{n+5/2}}\frac{1}{[1+\epsilon(\tau-I^2(\tau))/(1-\epsilon\tau)]^{n+5/2}} \quad (153)$$

It is then clear that, aside from the 1, the other terms contribute to order $\epsilon^{3/2}$, hence may be neglected.

Reintroducing $\mu$ by $$\epsilon(\tau - \cos l) = (1+\epsilon \cos l)\frac{\mu^2}{1-\mu^2} \quad (154)$$

and expanding in powers of $\epsilon$, we get $$p_3 = 2\int_0^{\infty} g(E_0) E_0 dE_0 \left[\sum_n a_n \int_0^1 (1-\mu^2)^{n+1} d\mu - \epsilon \cos l \right.$$

$$\left. \cdot \sum_n n a_n \int_0^1 (1-\mu^2)^{n+1} d\mu \right] \quad (155)$$

The first term is clearly just $p_{3i}$, the initial pressure. The perturbation term may be written, remembering $\delta b = B_i \epsilon \cos$ $$\delta p_3 = \frac{p_3}{2}\frac{\delta b}{B_i}\frac{\int_0^1 [(\partial f)/(\partial \mu)][(1-\mu^2)^2/(\mu)] d\mu}{\int_0^1 f(\mu)(1-\mu^2) d\mu} = p_3 \frac{\delta b}{B_i} s \quad (156)$$

where $s$ is a shape factor, dependent on the initial plasma angular distribution. $s$ vanishes for an initially isotropic distribution and is positive for a distribution with motion predominantly along the field lines.

Using Equations 124, 128, 156, and the fact that $\vec{\xi} \approx e^{i(kz \pm m\theta)}$, we may write for the equations of equilibrium in the directions perpendicular to the field $$\frac{[\vec{\nabla} \times \vec{\nabla} \times (\vec{\xi} \times \vec{B}_i)]}{4\pi} \times \vec{B}_i - s\frac{p_{3i}}{B_i}\vec{\nabla}\delta b$$

$$-k^2(p_{1i} - p_{3i})\frac{(\vec{B}_i \times [\vec{\xi} \times \vec{B}_i])}{B_i^2} = 0 \quad (157)$$

Here $$\delta b = \frac{\vec{B}_i \cdot \vec{\nabla} \times (\vec{\xi} \times \vec{B}_i)}{B_i}$$

We also note that $\xi_z$ does not occur in these equations so it may be chosen arbitrarily so that $$\vec{\nabla} \cdot \vec{\xi} = ik\xi_z + \nabla_2 \cdot \vec{\xi} = 0 \quad (158)$$

where $\nabla_2$ is the two-dimensional operator on $r$ and $\theta$.

We also note that $$\vec{\nabla} \times (\vec{\xi} \times B_i) = (B_i \cdot \vec{\nabla})\vec{\xi} = B_i ik \vec{\xi}$$

The first term in Equation 157 becomes, on use of vector identities (See, for example, Margenau and Murphy, "Mathematics of Physics and Chemistry," p. 148), $$\frac{[\nabla \times \nabla \times (\vec{\xi} \times \vec{B}_i)] \times \vec{B}_i}{4\pi} = \frac{ikB_i}{4\pi}(\nabla \times \vec{\xi}) \times \vec{B}_i$$

$$= \frac{ikB_i}{4\pi}[(\vec{B}_i \cdot \nabla)\vec{\xi} - \nabla(\vec{B}_i \cdot \vec{\xi})] = -\frac{k^2 B_i^2}{4\pi}\vec{\xi} + \frac{B_i^2}{4\pi}\nabla\nabla_2 \cdot \vec{\xi}$$

Doing the same sort of manipulations on the rest of the equation and throwing away components in the $z$ direction, we get $$\left(\frac{B_i^2}{4\pi} + sp_3\right)\nabla\nabla_2 \cdot \vec{\xi} - k^2\vec{\xi}\left[\frac{B^2}{4\pi} + p_1 - p_3\right] = 0 \quad (159)$$

The solution of Equation 159 is $$\vec{\xi}_2 = A\nabla[J_m(ik\gamma r)e^{i(kz \pm m\phi)}] \quad (160)$$

with $$\gamma = \sqrt{\frac{B_i^2/4\pi + p_1 - p_3}{B_i^2/4\pi + sp_3}}$$

Again the determination of $A$ comes from Equation 133, with the condition that $\xi_r = \delta r_0 e^{(kz \pm m\phi)}$, and $$A = \frac{\delta r_0}{ik\gamma J'_m(ik\gamma r_0)}$$

Finally, we must determine $$\delta P_i = \frac{B_i \delta b}{4\pi} + \delta p_3 = \delta b\left(\frac{B_i}{4\pi} + \frac{p_3 s}{B_i}\right)$$

$$\delta P_i = -\left(\frac{B_i^2}{4\pi} + p_3 s\right)\frac{k\delta r_0 \gamma^2 J_m(ik\gamma r_0)}{i\gamma J'_m(ik\gamma r_0)}e^{i(kz \pm m\phi)}$$

$$\delta P_i = -\left(\frac{B_i^2}{4\pi} + p_3 s\right)\delta(\gamma Y)^2 K_m(\gamma Y) \quad (161)$$

Using Equation 136, we finally obtain the stability criterion $$\left(1 + \frac{4\pi(p_1 - p_3)}{\alpha_p^2 B_0^2}\right)\alpha_p^2 Y^2 K_m(\gamma Y)$$

$$+ (m \pm \alpha_V Y)^2 \frac{G_{\beta,m}(Y)K_m(Y) - L_m(Y)}{1 - G_{\beta,m}(Y)} > 1$$

As noted above, Equation 161 reduces to the magnetohydrodynamic result, Equation 119, for an isotropic distribution. In practice, with heating by sidewise compression, the distribution is likely to be peaked toward $\mu = 0$. In general, this appears harmful to stability.

The unfavorable results occurring from having $p_3$ large can be understood physically, since particles with $\mu$ close to zero are restricted by the mirror effect to the region of weak field and thus are reduced in energy by the perturbation.

The calculations made refer to both ions and electrons. If they have the same initial angular distribution, then they will have the same density along the lines after the deformation, and no space charge will be developed. If their angular distribution is different, it would be necessary to modify the adiabatic invariants to include space charge forces.

First we consider briefly the nature of the functions appearing in Equation 119, $$K_m(Y) > 0 \quad -L_m(Y) > 0$$

$$1 > G_{\beta,m}(Y) > 0; \quad \frac{\partial G}{\partial \beta} = \frac{\partial G}{\partial Y} < 0 \quad (162)$$

Also, as may be verified by substitution, $K$ and $L$ both satisfy the differential equation $$\frac{\partial f}{\partial Y} = \frac{1}{Y}[1 - (m^2 + Y^2)f^2] \quad (163)$$

As $$Y \to \infty \quad K_m = -L_m \to \frac{1}{Y}$$

Also, as a rough indication of behavior, one may consider $$K_m(Y) \approx -L_m(Y) \approx \frac{1}{\sqrt{m^2 + Y^2}} \quad (164)$$

This is quite good for $m \gg$, fair for $m = 1$ and poor for $m = 0$.

We now break up the discussion and consider cases of different $m$ separately.

A. $m = 0$

Here the equation becomes $$\alpha_p^2 Y^2 K_0(Y) + (\alpha_V Y)^2 \frac{G_{\beta,0}(Y)K_0(Y) - L_0(Y)}{1 - G_{\beta,0}(Y)} > 1 \quad (165)$$

It is easy to show $$\frac{d}{dY}(Y^2 K_0) > 0$$

We have also shown that the whole expression on the left of Equation 165 has positive derivative at $Y = 0$ and $Y = \infty$ for all $\beta$. Substituting $Y = 0$ in Equation 165, we find, using the limiting forms of the Bessel functions, $$\alpha_p^2 + \alpha_V^2/(\beta^2 - 1) > \frac{1}{2} \quad (166)$$

We may also, at this point, write down the trivial equation for the existence of an equilibrium $$\alpha_p^2 - \alpha_V^2 < 1 \quad (167)$$

B. $m \geq 2$

Let us denote the left hand side of Equation 119 as $F(\alpha_p, \alpha_V, m, Y, \beta)$. Then we note that $$F(\alpha_p, \alpha_V, m, Y, \beta) \geq F(\alpha_p, \alpha_V, m, Y, \infty)$$

Hence, if the pinch is stable for $\beta = \infty$, it is certainly stable for all finite $\beta$. For $\beta = \infty$ the stability condition, Equation 119, becomes $$\alpha_p^2 Y^2 K_m(Y) - (m - \alpha_V Y)^2 L_m(Y) > 1 \quad (168)$$

Since we are looking for the most unfavorable situation, it is sufficient to consider the $-$ sign in $(m \pm \alpha_V Y)^2$. At $Y = 0$, $$L_m(Y) = -\frac{1}{m}$$

so Equation 168 is certainly satisfied. At $Y = \infty$, since $$-L_m = K_m = \frac{1}{Y}$$

it is also satisfied. Hence, it is clear that for a given $m$ and $\alpha_V$, it is possible to find an $\alpha_{p_0}$ such that Equation 168 is satisfied for all $Y$ if $\alpha_p \geq \alpha_{p_0}$. Let us suppose we have done this for $m = 2$, i.e., we have found $\alpha_{p_0}$ such that $$F_2, \alpha_V, \alpha_{p_0}(Y) > 1 \quad (169)$$

for all $Y$.

We will now show that Equation 168 must also be satisfied for all $m > 2$.

First we introduce $$Y = \frac{mY'}{2}$$

and rewrite Equation 168 as $$F_m, \alpha_V, \alpha_p = \alpha_p^2 Y'^2 \left(\frac{m}{2}\right)^2 K_m\left(m\frac{Y'}{2}\right)$$

$$- (2 - \alpha_V Y')^2 \left(\frac{m}{2}\right)^2 L_m\left(\frac{m}{2}Y'\right)$$

Hence, if we can show $$\left(\frac{m}{2}\right)^2 K_m\left(\frac{m}{2}Y'\right) > K_2(Y')$$

and $$-\left(\frac{m}{2}\right)^2 L_m\left(\frac{m}{2}Y'\right) > -L_2(Y') \quad (170)$$

then Equation 168 must be satisfied from all $m$, $Y$ in virtue of the fact it is satisfied for $m=2$. Let $$\left(\frac{m}{2}\right)^2 K_m\left(\frac{m}{2}Y\right) = k_m(Y)$$

From Equation 163, we have $$\frac{\partial k_m}{\partial Y} = \frac{1}{Y}\left[\left(\frac{m}{2}\right)^2 - (4+Y^2)k_m^2\right]; \frac{\partial K_2}{\partial Y} = \frac{1}{Y}\left[1 - (4+Y^2)K_2^2\right] \quad (171)$$

At $Y=0$ $$K_2 = \frac{1}{2} \quad k_m = \frac{m}{4}$$

Solving Equation 171, we may write $$k_m - K_2 = e^{-\int_0^Y (k+K)\frac{(4+Y^2)}{Y}dY}\left[\int_0^Y dY''\left\{\left(\frac{m}{2}\right)^2 - 1\right\}\frac{1}{Y''}\cdot e^{\int_0^{Y''}(k+K)\frac{(4+Y'^2)}{Y'}dY'} + \frac{m}{4} - \frac{1}{2}\right] > 0 \quad (172)$$

A similar procedure may be applied to the consideration of $L_m$.

Thus we have proved Equation 170 and hence need only satisfy Equation 168 for $m=2$ and $\beta=\infty$ to get a sufficient condition for stability of all higher $m$. The procedure used to do this is the same as that to be described for $m=1$.

The results are shown in Table 3.

TABLE 3—Sufficient Condition for $m \geq 2$ Stability

| $\alpha_V$ | 0 | .1 | .25 | .5 | 1 |
|---|---|---|---|---|---|
| $\alpha_P^2$ | .067 | .122 | .222 | .462 | 1.260 |

By comparison with the FIGS. 10 through 14 of stability regions, it may be seen that any system stable against $m=0$, is stable for the higher modes.

C. $m=1$

For $m=1$, our Equation 119 becomes $$\alpha_P^2 Y^2 K_1(Y^2) + (1-\alpha_V Y)^2 \frac{G_{\beta,1}(Y)K_1(Y) - L_1(Y)}{1 - G_{\beta,1}(Y)} > 1 \quad (173)$$

Again it may be easily seen by looking at the asymptotic forms that for any $\alpha_P$, $\alpha_V$, $\beta$, Equation 173 must be satisfied at $Y=0$ and $\infty$. At $Y=0$, it is the effect of $G_{\beta,1}$, the external conductor, which makes for stability. At $Y=\infty$, it is the longitudinal fields. Due to the appearance of the factor $(1-\alpha_V Y)^2$, there is a region of wavelength where the perturbation just fits the corkscrew of the external field tending to make for poor stability.

It is also easily seen from Equation 173 that for a given $\alpha_V$ and $\beta$, one can find an $\alpha_{p0}$ such that all greater values of $\alpha_p$ satisfy Equation 173 for all $Y$. The method of calculation used was to fix $\alpha_V$ and $\beta$, then solve Equation 173 for $\alpha_p^2$ as a function of $Y$. The resulting curve gives $\alpha_p^2 = -\infty$ at $Y=0$ and $\alpha_p^2 = -\alpha_V^2$ at $Y=\infty$, with a maximum in between. The value of this maximum is then $\alpha_{p0}$, since for this value of $\alpha_p$, there is only one wavelength which is neutrally stable.

In practice, a torus is used rather than an infinite cylinder to eliminate end losses, however, it is clear that for tori with large major to minor radius ratios, i.e., factors of four or greater, the above results would apply.

FIGURE 10 shows the area of stability for an $\alpha_V=0.1$. It is apparent that for equilibrium of the pinch to exist the field inside the pinch and the field outside the pinch must be equal. Thus $$B_1^2 = B_\theta^2 + B_V^2$$

Thus, for $\alpha_V=0.1$ the maximum value attainable for $\alpha_P^2$ will be 1.01. Curve 80 is a plot representing the maximum value of $\alpha_P^2$ attainable. Curve 81 is the curve for the $m=0$ type instability. Thus, any ratio of $\alpha_P^2$ to $\beta$ which is above curve 81 is stable with respect to $m=0$ or sausage type instability. Curve 82 is the curve for $m \geq 1$ type instabilities and any ratio of $\alpha_P^2$ to $\beta$ which is above curve 82 is stable with respect to kink instability. Thus, for an $\alpha_V=0.1$, the only area in which a stable pinch can be obtained is the area below curve 80 and above curve 81. This area is labeled "stable area" in FIGURE 10.

FIGURE 11 shows the area of stability for $\alpha_V=0.25$. Curve 84 defines the maximum value which $\alpha_P^2$ can have with the given $\alpha_V$ value. Curve 85 shows the lower limit for stabilizing sausage type instability, while curve 86 shows the lower limit for stabilizing kink instabilities. Thus, the stable pinch area is defined as the area below curve 84, to the left of curve 86, and above curve 85.

FIGURE 12 shows the area of stability for $\alpha_V=0.5$. Curve 88 is the maximum value attainable by $\alpha_P^2$ for the given $\alpha_V$. Curve 89 shows the lower limit for stabilizing sausage type instabilities while curve 90 shows the lower limit for stabilizing the kink instabilities and higher order instabilities. It should be noted that in this case any ratio of $\alpha_P^2$ to $\beta$ which is stabilized for kink instability is also stabilized for sausage instability.

FIGURE 13 is similar to FIG. 12 except the $\alpha_V$ value considered is $\alpha_V=1$. The stable area is considerably reduced over the previously considered cases. In FIG. 13, curve 92, shows the maximum $\alpha_P^2$ attainable while curves 93 and 94 show the lower limits for stabilizing sausage and kink (and higher order) instabilities respectively.

FIGURE 14 shows the stable area for $\alpha_V=0$, that is, the case when the $B_z$ field outside the pinch is zero. Curve 96 shows the maximum value attainable by $\alpha_P^2$, that is, one. Curve 97 shows the lower limit for stabilizing sausage type instabilities. Curve 98 shows the lower limit for stabilizing kink and higher order instabilities. Thus, the stable area is considerably larger than in the previous cases. It is immediately apparent from FIGURES 10 through 14 that the lower the value of $\alpha_V$ the larger the area of stability.

The highly conducting current sheath develops at the tube wall immediately upon breakdown, therefore we have $$B_{ze} = B_{z0}\frac{r_c^2 - r_g^2}{r_c^2 - r_0^2} = B_{zc}\frac{1 - 1/\rho^2}{1 - 1/\beta^2} \quad (174)$$

$$B_{zi} = B_{z0}(r_g/r_0)^2 = B_{z0}(\beta/\rho)^2 \quad (175)$$

$$\therefore \alpha_p = B_{z0}(\beta/\rho)^2 \cdot 1/B_\theta = B_{z0}(\beta/\rho)^2 \cdot 5r_0/I = \frac{5r_c B_{z0}}{I\rho^2} \quad (176)$$

and $$\alpha_v = B_{z0}\frac{1 - 1/\rho^2}{1 - 1/\beta^2} \cdot 5r_0/I\beta = \frac{5r_c B_{z0}}{I}\left(\frac{\rho^2 - 1}{\rho^2}\right) \cdot \frac{\beta}{\beta^2 - 1} \quad (177)$$

where $I$ is in amperes, $r$ in cm.; and $B$ in gauss. An expression for $\beta$ in terms of $I$, $\rho$, $B_{z0}$, and $nkT$ is obtained by writing the pressure balance equation:

$$B_{ze}^2/8\pi + B_\theta^2/8\pi = B_{zi}^2/8\pi + nkT$$

or $$1 + \alpha_v^2 = \alpha_p^2 + \frac{8\pi nkT}{B_\theta^2} \quad (178)$$

If we assume that preionization gives us an initial ion density $n_0$, and that $n=\beta^2 n_0$, we obtain, after substituting Equations 176 and 177

$$1+\left[\frac{5r_cB_{z0}}{I}\left(\frac{\rho^2-1}{\rho^2}\right)\right]^2\frac{\beta^2}{(\beta^2-1)^2}$$
$$=\left[\frac{5r_cB_{z0}}{I\rho^2}\right]^2\beta^2+\frac{200\pi r_c^2 n_0 kT}{I^2} \quad (179)$$

While Equation 179 can be solved directly for $\beta$, certain approximations which have been experimentally shown, enable us to simplify it considerably. For example, if one restricts $\beta$ and $\rho$ such that $\beta \geqq 2$ and $\rho \leqq 1.2$, an error of less than 10 percent in $\beta$ results from neglecting the second left-hand term, which is the $\alpha_V$ contribution. Then, $$\beta^2=\left[\frac{I\rho^2}{5r_cB_{z0}}\right]^2\left[1-\frac{200\pi r_c^2 n_0 kT}{I^2}\right] \quad (180)$$

Again, if $nkT \ll B_{z1}^2/8\pi$, which is the only case currently realized when values of $B_z$ sufficient for stability are used, Equation 180 reduces to $$\beta=\frac{I\rho^2}{5r_cB_{z0}} \quad (\text{or, } \alpha_p=1) \quad (181)$$

In this approximation, the gas serves only to supply a tight, flexible conducting boundary between the regions containing $B_z$ and $B_\theta$.

The theory of stability of the pinch as presented above requires that the equilibrium pinch configuration be characterized by certain combinations of $\alpha_p$, $\beta$, and $\alpha_V$ in order to be stable against breakup from various modes of deformation. In particular, the requirement for stability against "sausage," or radially symmetrical breakup is that $\alpha_p^2 > 0.5$, or that more than half of the internal pressure of the pinch be due to the included $B_z$ field. Stability against more complicated deformations is predicted when $\beta$ is held below certain critical values which depend on both $\alpha_p$ and $\alpha_V$.

One result of the theory is that for this case of zero internal plasma pressure, an upper limit on $\beta$ can be found for each value of $\alpha_V$ one may select. These values define a boundary between regions of stability and instability on an $\alpha_V$–$\beta$ plane. However, in an actual pinch apparatus, $\alpha_V$ changes continually with $\beta$, the variation depending solely on the parameter $\rho$, a constant characterizing the particular machine.

Rewriting Equation 178 for $nkT=0$, $$1+\alpha_V^2=\alpha_p^2 \quad (182)$$

Substituting in Equations 176 and 177, and eliminating $\alpha_p$, we obtain $$\alpha_V^2=\frac{1}{\left(\frac{\beta^2-1}{\rho^2-1}\right)^2-1} \quad (183)$$

This also gives a curve on the $\alpha_V$–$\beta$ plane, and tells immediately whether the given machine is capable of stable operation.

If the plasma is pre-heated to a temperature such that its pressure is not negligible, and that it is then adiabatically compressed in a time slow compared to a relaxation time, one can obtain a curve for $\alpha_p^2$ in terms of $\beta$ as follows:

Writing Equation 178 for $\alpha_V=0$, and substituting $\beta^2 B_{z0}/\alpha_p$ for $B\theta$ we get $$\alpha_p^2=\frac{1}{1+\frac{8\pi nkT}{\beta^4 B_{z0}^2}} \quad (184)$$

The assumption of slow adiabatic compression leads to:

$$nkT=n_0kT_0\beta^{2\gamma}=n_0kT_0\beta^{10/3}$$

where $$\gamma=5/3$$

Hence, $$\alpha_p^2=\frac{1}{1+K\beta^{-2/3}}$$

$$K=\frac{8\pi n_0 kT_0}{B_{z0}^2}$$

When $\delta$ is greater than one, i.e., when the radius of the conducting shell 78 is greater than the radius of the insulating container 76, which is generally the case except as provided hereinafter, $\alpha_V$ is a variable and therefore several of the FIGURES 10–13 may apply at different times, thus $\alpha_p$ and $\alpha_V$ must be determined as functions of $\beta$. Since $$\frac{\alpha_p}{\alpha_V}=\frac{\beta^2-1}{\delta^2-1}$$

then $$\alpha_p^2=\frac{1+\alpha_V^2}{1+K\beta^{-2/3}}$$

where $$K=\frac{8\pi n_0 kT_0}{B_V^2}$$

Thus, $$\alpha_V^2=\frac{1}{(1+K\beta^{-2/3})\times\left(\frac{\delta^2-1}{\beta^2-1}\right)^2-1} \quad (186)$$

$$\alpha_p^2=\frac{1}{(1+K\beta^{-2/3})-\left(\frac{\delta^2-1}{\beta^2-1}\right)^2}$$

FIGURE 15 shows the stable region for $\alpha_V$ as a function of $\beta$. Curve 101 shows the dividing line for stability against all types of pinch instabilities, the area below curve 101 being the stable area. Curve 102 is the operating curve for the case where $\delta=1.4$, i.e., where the ratio of the radius of the conductor to the radius of the insulating container is 1.4. It should be noted that the radius of the conductor can be considered the radius of the conducting wall, i.e., the external conductor 78, or in the preferred embodiment the radius of the wall protecting coolant chamber as explained in detail hereinafter. Curve 103 is the operating curve for the case where $\delta=1.2$. Thus it is apparent that for operation in the stable region it is necessary to have the ratio of the radius of the external conductor to the radius of the initial volume of gas (radius of insulating wall, generally) as small as possible. It should be noted that as $\alpha_V \to 0$ the operating curves pass into the unstable region, thus actual operation under the conditions so far outlined requires that the $B_z$ field in the vacuum, i.e., between the confining wall and the pinch above some value greater than zero otherwise actual operation in the stable region is not possible FIGURE 15 is based upon the assumption that $$nkT \ll B_{z1}^2/8\pi$$

which has been verified by experiment.

FIGURE 16 is a plot of $\alpha_p^2$ as a function of $\beta$ and is similar to FIGURE 14 where curves 96, 97, and 98 are the same as previously explained. Curve 105 shows the operating curve for the case where $\delta=1.0$ and $K=0.5$, where K is the ratio of the initial plasma pressure to the initial $B_z$ pressure as defined above. As is apparent from FIG. 16, the operating curve remains in the stable area until a value of $\beta \cong 4$ is exceeded. Thus in actual operation under these conditions sixteen-fold compression is stable.

In the present case $\delta$ would necessarily be greater than one and a more meaningful picture is required since $\alpha_V$ is a continuously changing function of $\beta$ as shown in Equations 186 and 187.

FIGURE 17 shows the stable operating region under the condition that $\alpha_V$ is a variable which is a more realistic condition. Curve 107 is the dividing line between the stable and unstable regions on a plot of $\alpha_p^2$ as a function of $\beta$, the area above curve 107 being the stable pinch area. Curve 108 is an operating curve for a $\delta=1.2$, a $K=0.5$, and an adiabatic compression of 5/2. It is apparent that actual operation is restricted to the area below $\beta$ approximately equal to 3.3.

FIGURE 18 is similar to FIG. 17. The only change is the value of K being increased to 1.0. Thus increasing K reduces the length of the stable operating line 110 above the stable curve 111.

It is clear from the foregoing and the figures that in utilizing included $B_z$ for pinch stabilization, one must strive to keep the parameter $\delta$ as near to unity as technically possible, particularly if the internal plasma pressure is to be appreciable.

*Containment*

The features desired of a magnetic field configuration for the containment of a hot plasma are:

(1) Containment
(2) Stability
(3) Minimization of magnetic field energy compared to particle thermal energy
(4) A high value of magnetic field If the pinch is wrapped around in a torus so that there are no end electrodes and if it is stable then the containment time is determined by particle diffusion across the magnetic field. The parameters of this diffusion are characterized by the ion Larmor radius and the radial dimension measured in terms of the ion Larmor radius. If the pinch radius $r$ is smaller than the return conductor radius R, then the magnetic field at the surface of the pinch $B_\theta(r)$ is greater by the ratio $R/r$ than the magnetic field at the outer conductor. This property of the pinch field, that the field is greater at the pinched plasma than at the wall, implies both a minimization of the containing field energy and also the possibility of reaching very high fields at the plasma. The minimization of total magnetic field energy makes easier the desired goal of recreating the magnetic energy by thermonuclear reactions. The high value of magnetic field at the plasma gives rise to the following advantages:

(1) Short absolute reaction time
(2) High initial density
(3) Small ion Larmor radius The advantages in turn of each of these are:

(1) The short absolute time implies:
   a. Less time available for impurity regeneration processes; e.g., sputtering and charge-exchange.
   b. Small magnetic energy dissipation in conductors.
(2) High initial density:
   a. Removes the requirements of initial high vacuum design.
   b. Empirically facilitates the problem of initial ionization and heating.
(3) The small ion Larmor radius implies smaller physical dimensions to the apparatus, and in addition smaller energy for a given containment.

As pointed out above a measure of containment is the dimensions of the system measured in terms of an ion Larmor radius. If $R=n\rho_i$ where $\rho_i$=ion Larmor radius then the containment time measured in terms of the number of particle collisions available becomes proportional to $n^2$. (This is proportional to the fractional number of thermonuclear reactions which are needed for energy regeneration.) However, at an optimum temperature T, $B\rho_i$ is a constant. The total magnetic energy $E_M$ in the system is proportional to $$E_M \sim R^3 B^2 = \frac{n^3}{B}$$

Therefore for a given containment factor $n$, less magnetic energy is needed as the value of the field B is increased.

The highest values of magnetic field can obviously be obtained pulsewise; in addition the configuration of an axial field inside of a theta- or pinch-field represents a nonequilibrium state which can only be reached by pulsed or dynamic operation. In addition it is necessary that the plasma be heated pulse-wise. The design at this stage consists of a toroidal pinch with an included axial magnetic field. The absolute value of the external field must be as great as possible, but the peak field at the pinch will be determined by the ratio of the tube radius R to pinch radius $r$. This ratio is dependent upon the conditions imposed by stabilization. In order to specify the torus size necessary for a given containment factor, it is necessary to understand the limitations of the stabilized region of the parameters of pinch radius, internal field, and particle pressure.

With a knowledge of these limitations in mind, a minimum size toroidal pinch may be designed to meet the criterion of energy regeneration. The minimum size may not necessarily be the optimum one, but it will define the numbers involved and permit an easy scaling to different size machines. The final size will be determined largely by the limitations of condensers, switch gear, energy storage, and strength of materials.

The pinch can be stabilized by the combination of an internal axial magnetic field $B_z$ and the presence of an external conductor surrounding the pinch. The internal $B_z$ stabilizes perturbation wavelengths several times the diameter of the pinch and smaller whereas the external conductor stabilized perturbations of wavelengths equal to or larger than the diameter of the external conductor. The combined effects produce a region of stability for a pinch radius greater than 1/5 the external conductor radius (for negligible internal particle pressure)—scaling to a minimum stable pinch radius of 1/2.5 the external tube radius for $$NKT = \frac{B_z^2}{8\pi}$$

The expression NKT expresses the kinetic pressure of the gas, N being the particle density and K Boltzman's constant.

The criterion for choosing the optimum stabilized pinch conditions is assumed to be those conditions which give the minimum time to regenerate the energy content of the containing magnetic fields. The total elapsed time of containment is assumed to be of prime importance because of impurity regeneration and because of field penetration of coil conductors.

For a given optimum temperature, the energy regeneration time is proportional to the total energy divided by the reaction rate.

$$\tau \sim E / \int N^2 dV$$

E is the total magnetic plus kinetic energy in the system per unit length.

The integral is over the volume of the plasma (per unit length)

If $R$=the external conductor radius
$r$=pinch radius
$B_\theta$=pinch field at radius R then $$E = \frac{B_\theta^2}{8\pi} R^2 \left( 2\pi ln\frac{R}{r} + \pi \right)$$

The first term is the magnetic energy in the external pinch field; the second term is the energy internal to the pinch. A limit is set on $B_\theta$ due to the maximum strength of the coil system.

The criterion for stability (no external $B_z$) is that $$r \geq \frac{R}{5(1-\beta)} \qquad \beta = \frac{NKT}{B_\theta^2/8\pi \frac{R^2}{r^2}} = \frac{NKT}{\gamma^2 B_\theta^2/8\pi} \text{ where}$$

$$\gamma = \frac{R}{r} \qquad B_r = B_\theta \frac{R}{r}$$

$$\tau \sim \frac{B_\theta^2 R^2 \left(2ln\frac{R}{r}+1\right)}{N^2 dV}$$

$$N^2 dV = \pi r^2 N^2 = \pi r^2 \left(\beta \frac{B_\theta^2 R^2}{8\pi r^2}\right)^2$$

therefore $$\tau \sim \frac{B_\theta^2 R^2 \left(2ln\frac{R}{r}+1\right)}{r^2 \beta^2 \frac{R^4}{r^4} B_\theta^4}$$

therefore $$\tau \sim \frac{1}{B_\theta^2} \frac{r^2}{R^2} \frac{2ln\frac{R}{r}+1}{\beta^2}$$

From the stability condition $\gamma \equiv R/r \leq 5(1-\beta)$ $$\tau \sim \frac{2ln 5(1-\beta)+1}{\beta^2(1-\beta)^2}$$

FIGURE 19 shows a plot of $\tau$ versus $\gamma$ which shows that the minimum energy regeneration time corresponds to a $\beta > 0.5$ or $\gamma \leq 2.5$. However an instability of a different kind ($m=0$ occurs for $\beta \geq 0.5$ so that the optimum $\beta$ for minimum energy regeneration time is 50% corresponding to $\gamma = R/r = 2.5$.

The ratio of the major to minor radius of the torus should be large in order for the pinch to be more perfectly centered, whereas a minimum available energy would dictate a small ratio of major to minor radii. A ratio of 5:1 is preferred on the basis of which:

(1) The collapse heating shock is off-center by 0.2 R. The heating cycle has not yet been mentioned, but the ratio of $B_z$ field on each side of the torus bore determines the centering during the heating cycle.

(2) The pinch equilibrium is off-center by less than .1 R.

(3) The inductance of the external torus loop is approximately equal to the inductance of the pinch circuit at $R/r=3.5$. The inductance of the external circuit of the torus is approximately the self-inductance of a loop or wire of loop radius $b$ and cross-section radius $a$. The loop inductance $$L_l = \mu b \left[ ln\frac{8b}{a} - 1.75 \right]$$

The inductance of the internal pinch circuit is that of a coaxial line of radii ratio $R/r$ and length equal to the mean circumference around the torus $= 2\pi(b)$. Therefore the pinch inductance $$L_p = 2\pi(b) \frac{\mu}{2\pi} ln\frac{R}{r} = \mu b ln\frac{R}{r}$$

If the torus has thick metal walls equal to the minor radius R in order to withstand the high magnetic fields, then $b/a$ becomes 2.5 instead of 5.

$$L_l = 1.25 \mu b$$

Therefore the loop inductance of the current path on the outside torus surface becomes equal to the internal pinch circuit when $$L_p = L_l$$

or $$ln\frac{R}{r} = 1.25$$

or $$\frac{R}{r} = 3.5$$

The total energy in the pinch current becomes $$E_p = (2\pi \times 5R) \frac{B_\theta^2}{8\pi} \pi R^2 \left(2ln\frac{R}{r}+1\right)$$

$$B_\theta = 250,000 \text{ gauss}$$

Choose $$\frac{R}{r} = 2.5$$

therefore $$E_p = 6.95 \times 10^4 R^3 \text{ joules}$$

Approximately 40% of the current will be flowing in the external torus circuit so that the total energy in the system becomes $$E_t = 1.15 \times 10^5 R^3 \text{ joules}$$

The criterion for choosing R, the minor torus radius is dependent upon the containment time required.

The containment time required is that time necessary to regenerate the magnetic and kinetic energy content of the system. For the optimum parameters $B_\theta = 250,000$ gauss at the wall, $R/r = 2.5$ (pinch ratio), $R_t/R = 5$ (torus ratio), we have already calculated the energy content.

The energy per linear centimeter is $$E_t = \frac{1.05 \times 10^5 R^3}{10\pi R} = 3.33 \times 10^3 R^2 \text{ joules/cm.}$$

The rate of power generated is dependent upon the temperature, density and reaction rate. If we assume TD at the optimum temperature such that the reaction rate divided by the energy content is a maximum, then the optimum temperature becomes 10 kev.

The power generated per cubic centimeter of $N_D = N_T$ plasma (temperature = 10 kev.) including neutron kinetic energy and capture energy in lithium is $$P = N_D^2 \sigma \overline{V} \times 2 \times 10^7 \times 1.6 \times 10^{-13} \text{ watts/cc.}$$

$$\sigma \overline{V}_{10 \text{ kev.}} = 1 \times 10^{-16} \text{ cm.}^3/\text{sec.}$$

therefore $$P = N_D^2 \, 3.2 \times 10^{-28} \text{ watts/cc.}$$

The power generated per centimeter length is $$P_l = P\pi r^2 = P\pi R^2 \frac{r^2}{R^2} \text{ watts/cm.}$$

For the condition $R/r = 2.5$ $$P_l = N_D^2 \times 3.2 \times 10^{-28} R^2 \frac{\pi}{(2.5)^2}$$

$$= N_D^2 R^2 \times 1.61 \times 10^{-28} \text{ watts/cm.}$$

The density $N_D$ is determined by the magnetic field at the pinch and $\beta$.

$$\frac{B_\theta^2}{8\pi} \frac{R^2}{r^2} = \frac{NKT}{\beta} = \frac{4 N_D \times 10^4 \times 1.6 \times 10^{-12}}{.5}$$

or $$N_D = 1.25 \times 10^{17}$$

then $$P_l = (1.25 \times 10^{17})^2 \times 1.6 \times 10^{-28} = 2.5 \times 10^6 \text{ watts/cm.}$$

The containment time must therefore be the total energy divided by the power production rate $$\tau_c = \frac{3.35 \times 10^3}{2.5 \times 10^6} = 1.3 \text{ millisec.}$$

If the fractional skin depth penetration of the magnetic fields into the conductors is small within the time $\tau_c$, then all the external field and half the internal field (the $B_\theta$ in vacuum) is reversible. That is, ¾ of the field energy can be returned to the external circuit, so that the D-T reaction need create only ¼ the total field energy. For this condition $$\tau_c = 330 \ \mu sec.$$

The dimensions of the system should be based on a particle diffusion time of $10^{-3}$ sec. to diffuse a distance $r$ in radius, i.e., for the pinch to diffuse to twice its original radius.

The diffusion velocity is $$v_{drift} = 3.5 \times 10^{-2} \frac{\nabla N}{T^{1/2} B^2}$$

$$\nabla N = \frac{N}{r}$$

$T = 1.2 \times 10^8$ degrees K.

$$B = 250,000 \frac{R}{r}$$

$\tau_c \cong 10^{-3}$ sec.
therefore $$v_{drift} = \frac{r}{\tau_c} = \frac{3.5 \times 10^{-2} 2.5 \times 10^{17}}{r \times 1.1 \times 10^4 \times (6.25 \times 10^5)^2}$$

or $$r^2 = 2 \times 10^{-3}$$

or $$R = 12 \text{ cm.}$$

This is such a small dimension that a number of other limitations determine the minimum size. These are (1) The pinch must be large enough to contain the reaction products within its own magnetic field.

(2) The fractional skin depth penetration of the magnetic fields into the metal walls must be small so that the condition of field reversibility is met.

(3) The resistive component of the pinch induced current circuit permits an analogous skin depth mixing of $B_\theta$ and $B_z$ fields such that $B_z$ diffuses out of the pinch with resulting instability.

The magnetic stiffness of a 3.5 m.e.v. α particle reaction product is $2.5 \times 10^5$ gauss cm. Therefore the radius of curvature in the pinch field at R of $2.5 \times 10^5$ gauss is 1 cm. The field increases towards the center so that a radius R of one centimeter or greater would contain all the reaction products.

The skin depth penetration of $B_\theta^2$ into the copper walls for a pulse time $\tau$ seconds is $$\partial = 4.5 \sqrt{\tau} \text{ cm.} \qquad \tau = 10^{-3} \text{ sec.}$$

therefore $$\partial = .142 \text{ cm.}$$

If we assume a small fractional change in inductance, then the fractional loss of $B_\theta$ energy becomes $$loss \simeq 1 - \frac{R^2}{(R+\partial)^2}$$

If we desire this to be small ~25%, then R=1 cm., the same as the requirement on reaction product containment.

The resistive mixing of the $B_z$ and $B_\theta$ fields by energy exchange collisions in the plasma can be considered as a skin depth problem. The resistance of a plasma normal to a strong magnetic field is:

$$\eta = 1.29 \times 10 \frac{4 ln\Lambda}{T^{3/2}} \text{ ohm cm.}$$

where $ln\Lambda = 15$, the cutoff parameter
$T = 1.2 \times 10^8$ degrees K.

Therefore $$\eta = 1.46 \times 10^{-7} \text{ ohm cm.}$$

The skin depth factor for $B^2$ becomes $$\partial = 1.2 \sqrt{\tau} \text{ cm.}$$

if $\tau = 10^{-3}$ sec.

$$\partial = .038 \text{ cm.}$$

In order that the mixing of the fields be small during the reaction time, $\partial$ should be small compared to $r$. If $$\frac{\partial}{r} = 10\%$$

then $r = .4$ cm., or again $R = 1$ cm. This resistive mixing is similar to the particle diffusion across the field. In the one case there is a gradient in particle density; in the other, there is a gradient in field energy, and so it is not surprising that they should both give the same final dimension. The resistive diffusion could be less if the electric field gradients were large—as would be expected in a charge separation boundary layer; this would only tend to lengthen the time scale to instabilities.

*The heating cycle*

So far only a containment configuration for a hot plasma has been discussed. This consists of a stabilized pinch wraped in a torus of major radius 5 cm., minor radius 1 cm. and pinch radius .4 cm. Inside the pinch one-half the energy is particle energy (NKT) and the other half is axial magnetic field $$\frac{B_z^2}{8\pi}$$

The final consideration is the method of obtaining the field configuration and heating the plasma within it.

Experimentally it has been found that starting from a cold deuterium gas in an insulating tube the passage of a sufficiently rapidly rising current will ionize the gas and cause a pinch to form. If an axial magnetic field is present, all the field within the insulator becomes trapped within the pinch as if the pinch became conducting at its outside surface before any radial motion takes place. This is as expected and forms the basis of the desired configuration of $B_z$ inside the pinch and $B_\theta$ outside. In this process the plasma is not heated very much ($KT \sim 1$ to 10 ev.) because in general the rate of rise of magnetic field is not high enough to give a high temperature shock. If the initial rate of rise were high enough to form a high temperature shock, then there is not enough time for the initial ionization to go to completion so that either the discharge never pulls away from the insulating walls, or, if it does, it leaves a large amount of neutral gas behind. Therefore the initial ionization and boundary layer formation must be done slowly to allow a quasithermalization. However, as soon as the boundary layer moves away from the wall, the trapped $B_z$ field inside is compressed because in first approximation flux is preserved inside the plasma. The compression of $B_z$ internally represents a higher energy state than if it were external to the pinch, and so, as discussed before, there is a tendency for it to diffuse outside the pinch. Now because the plasma is relatively cold, less than 10 ev., this takes place much more rapidly than it would if the plasma were hot. The time-scale for the diffusion is the time available during which additional heating must take place if diffusion with subsequent instability is to be prevented.

The resistivity at 10 ev. is $$\eta = 1.29 \times 10^4 \frac{ln\Lambda}{T^{3/2}} \text{ ohm cm.}$$

$ln\Lambda = 7$
$T = 1.2 \times 10^5$ degrees K.

$$\eta = 4.65 \ 10^{-3} \text{ ohm cm.}$$

The skin depth $\partial$ for a diffusion of the magnetic field $B_z^2$ for a time $t$ seconds is $$\partial = 220\sqrt{t} \text{ cm.}$$

The fractional volume of $$\frac{B_z^2}{8\pi}$$

that is lost must be small (e.g. 30%) in order to maintain stability so that $$\frac{(r+\partial)^2}{r^2} - 1 = .3$$

$r$ = pinch radius

If the heating is started when $r$ is close to the tube radius $R=1$ cm., then $\partial = .15$ cm. Therefore $$.15 = 220\sqrt{t}$$

The time available before additional heating is $t=.45$ $\mu$sec.

This very short time indicates that the heating cycle must be very rapid. The only possibility that is apparent is shock heating.

It is therefore proposed to shock heat the plasma as soon as it pulls away from the insulator walls by the sudden application of additional magnetic field. This additional magnetic field can be either $B_\theta$ or $B_z$. Before discussing the difficulty of making the shock with either the pinch ($B_\theta$) or collapse ($B_z$) field it is necessary to consider the subsequent heating that can occur during the later stages of pinch.

If the plasma is first shock heated to 2.2 kev. with a change in radius from $$r_0 = R \text{ to } r_1 = \frac{R}{4\sqrt{2}}$$

then the subsequent compression of the pinch will adiabatically compress and heat the plasma further. The amount of this subsequent compression is $$\frac{r_1^2}{r_2^2} = \frac{R^2}{\sqrt{2}} \times \frac{(2.5)^2}{R^2} = 4.5$$

so that the temperature of the plasma will increase according to the appropriate adiabate. If there is a thermalization time available within the doubling time of the pinch magnetic field pressure, then the effective gamma of the plasma is 5/3 and the temperature increases by the 2/3 power of the containment. Or $$T_t = 2.2 \times (4.5)^{2/3} = 6 \text{ kev.}$$

If a thermalizing time is not available during the compression, the plasma will compress with a gamma=2, so that $$T_t = 2.2 \times (4.5)^1 = 10 \text{ kev.}$$

The thermalizing time for the ions before compression at 2.2 kev. is:

$$\tau_t = \frac{11.4\sqrt{2.5}\, T^{3/2}}{N \ln \Lambda}$$

$T=2.2$ kev.$=2.64 \times 10^7$ degrees
$\ln \Lambda = 13$
$N = 4 \times 10^{16}$ $D+T$/cc.

Therefore $$\tau_t = 4.7 \times 10^{-6} \text{ sec.}$$

The thermalizing time at the end of compression assuming $\gamma=2$, is $$\tau_t = 10 \text{ } \mu\text{sec.}$$

The electron thermalizing time will be 60 times faster, so that if the pinch compression takes a total of 10 $\mu$sec. during which time the pressure increases by $(4.5)^2$ then the ions will compress as if $\gamma=2$, and the electrons will remain colder by a factor of 0.6.

The shock heating, therefore, must be designed to give a temperature of 2.2 kev. at a compression of essentially unity. If the shock is considered completely irreversible, then the energy in the shock field must be equal to the energy needed to heat the plasma plus the reversible work done on the magnetic fields. Since it is required to reach a $$\beta = \frac{NKT}{B_z^2/8\pi + NKT} = 0.5$$

it means that there will be an equal energy in particles and internal magnetic field. This implies a shock pressure twice the original $B_z^2/8\pi$, which implies twice the original energy. Now the shock will certainly not be completely irreversible so that more energy than the factor of two will be needed.

The original $B_{z_0}$ can be calculated from the final $B_\theta$ and pinch ratio $$\frac{B_\theta^2}{8\pi} \frac{R^2}{r^2} = \frac{B_{z_f}^2}{8\pi(1-\beta)}$$

$B_{z_f}$ = final $B_z$ inside pinch
$\beta = 0.5$
$B_\theta = 250{,}000$ gauss
$R/r = 2.5$
Therefore $$B_{z_f} = 1.77 B_\theta$$

Since flux is preserved inside the pinch, $$B_{z_f} = \frac{R^2}{r^2} B_{z_0}$$

The original bias field becomes:

$$B_{z_0} = \frac{1.77 B_\theta}{(2.5)^2} = .283 B_\theta = 70{,}000 \text{ gauss}$$

Assume a shock strength of 4 times the pressure, namely 140,00 gauss. The total energy if the shock is in $B_z$ is $$E_s = (B_z^2/8\pi) 10\pi^2 R^3 = 8 \times 10^3 \text{ joules}$$

If the shock is in $B_\theta$ outside and $B_z$ inside such that $B_z$ inside is 140,000 gauss, then $B_\theta$ at the wall becomes $B_z/\sqrt{2} = 100{,}000$ gauss.

$$E_s = 10\pi^2 R^3 \frac{B_\theta^2}{8\pi}(2\ln\sqrt{2} + 1) = 6.7 \times 10^3 \text{ joules}$$

Therefore if the shock is made with pinch field it requires 15% less energy.

In order to calculate the voltage needed for applying the magnetic field of either shock, it is necessary to define the time in which the field must rise. In general the time to raise the pressure must be equal to or less than sound speed across the diameter of the tube. Sound speed in this case is the velocity of a 2.2 kev. ion = $4.3 \times 10^7$ cm./sec.
Therefore $$t = \frac{2 \text{ cm.}}{4.3 \times 10^7} = 4.5 \times 10^{-8} \text{ sec.}$$

The flux added is $\pi R^2 (140{,}000 - 70{,}000)$. Therefore $$V = \frac{\Phi}{\Delta t} \times \frac{\pi}{2} \times 10^{-8} = 75{,}000 \text{ volts}$$

for a collapse shock four times as strong as the original bias field pressure.

If the shock is created by a sudden pinch field, the voltage is:

$$V = L \frac{I}{\Delta t} \frac{\pi}{2}$$

$L = 2 \times 10^{-9} \times 10\pi R \ln R/r_1$
$R/r_1 = \sqrt{2}$
$I = 5R(\Delta B_\theta) = 500{,}000$ amps Therefore $$V = 380{,}000 \text{ volts}$$

The factor of 5 in voltage is roughly the ratio of width of conductors that bring in the current. The collapse current width is the major circumference of the torus whereas the pinch current width is the minor circumference of the torus tube.

The collapse shock magnetic field should last for a time corresponding to a few times sound speed across the minor diameter of the torus. The instability on the other hand is the $m=1$ mode which will require a time to grow like several times sound speed around the major circumference of the torus. Therefore the collapse field can have decayed away long before the instability could grow.

For a machine able to recreate the energy content of the containing magnetic fields, a given fractional number of reactions must be available; equivalently a certain number of coulomb collisions must be available before diffusion out of the fields; which in turn implies a given number $n$ of Larmor radii within the radius of the machine. This was the origin of the scaling law $n \sim RB$.

First we consider how the collapse shock voltage scales with size R for constant $n$. The collapse field is a constant fraction of the final field. The flux is proportional to the cross-section area of the tube. The voltage scales as $$V = \frac{\Delta \phi}{\Delta t} \sim \frac{BR^2}{\Delta t}$$

$\Delta \phi$ = flux
$\Delta t$ = time

The time for changing the flux—raising the shock pressure—depends upon sound speed across the diameter. Since the temperature to be reached in the shock is independent of size, the shock velocity is the same, but the distance goes as R. Therefore $$\Delta t \sim R t_0$$

so that the voltage becomes $$V \sim \frac{BR^2}{R t_0} \sim \frac{BR}{t_0} \sim \frac{n}{t_0}$$

This implies that the collapse shock voltage is independent of size for the conditions imposed. Similarly the pinch shock voltage is independent of size.

$$V = L \frac{\Delta I}{\Delta t}$$

$\Delta I \sim BR$
$\Delta t \sim R t_0$
$L \sim 2\pi R' \ln R/r$

The pinch ration $R/r$ remains constant. The torus circumference $2\pi R' \sim R$.
Therefore $$V \sim \frac{R \ln R/r \, BR}{R t_0} \sim \frac{n}{t_0}$$

V is constant for a given $n$.

The 1 cm. pinch parameters have been derived. The 4 cm. radius one will have an energy larger by 4; a peak pinch field smaller by 4; a required containment time 16 times larger and shock energy 4 times greater.

If additional axial magnetic field $B_z$ is added external to a stabilized pinch ($B_z$ inside, $B_\theta$ outside), the effect is to make the system more unstable to the long wavelength $m=1$ mode. This can be understood qualitatively by noting the fact that it is the compression of the $B_\theta$ flux between the pinch and the wall that stabilizes the long wavelength $m=1$ mode. Therefore, if a given radius pinch is in pressure equilibrium with $B_\theta$ outside, then, adding $B_z$ to $B_\theta$ outside, implies that $B_\theta$ must decrease in order to maintain the same equilibrium position. Less $B_\theta$ will tend to make a given radius pinch more unstable. Since the minimum radius stable pinch is limited by the growth of the long wavelength, $m=1$ mode instability, it is understandable that the fractional external $B_z$, $$\alpha_v = \frac{B_z \text{ external}}{B_\theta}$$

is an important parameter limiting the stabilized region. The stability curves show various fractions of external magnetic field. As this fraction, $\alpha_v$, is increased, the minimum stable radius decreases for a given $$\beta = \frac{NKT}{B^2/8\pi}$$

$(B^2 = B_z^2 + B_\theta^2.)$

It is therefore important to understand the behavior of the external magnetic field in the configurations to be used.

The simplest configuration to start with is a uniform axial field inside a cylindrical conductor of radius R with an insulating tube inside radius $\rho$. It is assumed that the pinch traps and compresses all the flux inside the radius $\rho$, as in FIG. 20. The external axial field will then be a function of the pinch radius depending upon the insulator size and particle pressure inside the pinch.

$$\alpha_v = \frac{B_z \text{ external}}{B_\theta \text{ external}}$$

$r$ = pinch radius
$R$ = inside radius of cylindrical conductor
$\rho$ = insulator inside radius
$B_z$ = external axial field
$B'_z$ = initial uniform axial field
$B_\theta$ = pinch field at $r$ $$B_z = B'_z \frac{R^2 - \rho^2}{R^2 - r^2}$$

let
$\gamma = R/r$
$\partial = R/\rho$ $$= B'_z \frac{\gamma^2}{\partial^2} \frac{\partial^2 - 1}{\gamma^2 - 1}$$

$$B_\theta^2 + B_z^2 = B^2 = NKT + B_{zi}^2$$

$B_{zi}$ = inside field
$\beta = NKT$ $$B_\theta^2 + B_z^2 = \frac{B_{zi}^2}{1-\beta} = \frac{(B'_z)^2}{1-\beta}\left(\frac{\rho}{r}\right)^4 = \frac{(B'_z)^2}{1-\beta} \frac{\gamma^4}{\partial^4}$$

Therefore $$B_\theta = \sqrt{\frac{\gamma^4}{\partial^4} \frac{(B'_z)^2}{1-\beta} - {B'_z}^2 \left(\frac{\gamma}{\partial}\right)^4 \left(\frac{\partial^2-1}{\gamma^2-1}\right)^2}$$

Therefore $$\alpha_v = \frac{B_z}{B_\theta} = \frac{\dfrac{\partial^2 - 1}{\gamma^2 - 1}}{\sqrt{\dfrac{1}{1-\beta} - \left(\dfrac{\partial^2-1}{\gamma^2-1}\right)^2}}$$

FIGURES 20 through 22 illustrate the behavior of $\alpha_v$, the external field versus the pinch radius parameter $\gamma$ for various size insulators $\partial$. The stability curve S for the pinch is drawn on in addition. Below the stability curve represents less $B_z$ and so defines stability. Therefore when the $\alpha_v$ curve is below the S curve, the pinch should be stable. It is evident that to obtain a stable pinch, the insulator must be close to the tube dimension. In practice and for long containment times this is difficult. There is always an external circuit driving the $B_z$ field and if the tube is split to allow the $B_z$ field to enter rapidly $\alpha_v$ will be even larger. Even if the tube is not split, the skin depth factor will allow additional $B_z$ field to diffuse out of the wall during long containment times. The connected volume or inductance is characterized by the parameter $\epsilon$, where the total flux area is $\pi R^2 \epsilon^2$. The external field then becomes:

$$B_z = B'_z \frac{R^2 \epsilon^2 - \rho^2}{R^2 \epsilon^2 - r^2}$$

so that $$\alpha_v = \frac{\frac{\partial^2 \epsilon^2 - 1}{\gamma^2 \epsilon^2 - 1}}{\sqrt{\frac{1}{1-\beta} - \left(\frac{\partial^2 \epsilon^2 - 1}{\gamma^2 \epsilon^2 - 1}\right)^2}}$$

FIGURES 23 through 25 show the strong destabilizing effect of an external inductance attached to the axial field circuit. In practice, if collapse heating is used, the external inductance will have to be considerably larger (2 to 4 times) than the primary pinch tube inductance, so that the effect is serious.

The obvious way to control the external $B_z$ is to program it to zero when the pinch is forming. If a fraction of the primary pinch current is fed back into the axial field circuit, the $B_\theta$ can be made to "buck out" or program the $B_z$ to zero. When the $B_z$ equals zero, the axial circuit is crow-barred (shorted) to maintain zero $B_z$.

To calculate the stability behavior of such a programmed $B_z$, a comparison must be made between $\alpha_v$ for various programs versus the stability curve. Let $$B_z = B'_z - \omega B_\theta$$

where $B_\theta$ has been redefined to be measured at the tube wall. Also let $\epsilon \to \infty$ because coupling to the pinch current will require a relatively large inductance. $\omega$ is the fraction of $B_\theta$ that is used to buck out the original axial field $B'_z$. Therefore, $$\alpha_v = \frac{B_z}{\gamma B_\theta}$$

For the phase of the cycle where $B_z$ is programmed $\beta$ will be small — assumed zero. The pressure equilibrium then becomes:

$$\gamma^2 B_\theta^2 + B_z^2 = (B'_z)^2 \left(\frac{\gamma}{\delta}\right)^4$$

or $$\gamma^2 B_\theta^2 = -B_z^2 + \frac{\gamma^4}{\delta^4}(B_z + \omega B_\theta)^2$$

Therefore $$\frac{1}{\alpha_v^2} = \frac{\gamma^4}{\delta^4}\left(1 + \frac{\omega}{\gamma}\frac{1}{\alpha_v}\right)^2 - 1$$

or $$\frac{1}{\alpha_v^2}\left(1 - \frac{\gamma^2 \omega^2}{\delta^4}\right) - 2\frac{\gamma^3 \omega}{\delta^4}\frac{1}{\alpha_v} + \left(1 - \frac{\gamma^4}{\delta^4}\right) = 0$$

solving for $\alpha_v$ $$\alpha_v = \frac{1 - \frac{\gamma^2 \omega^2}{\delta^4}}{\frac{\gamma^3 \omega}{\delta^4} \pm \sqrt{\left(\frac{\gamma^3 \omega}{\delta^4}\right)^2 - \left(1 - \frac{\gamma^2 \omega^2}{\delta^4}\right)\left(1 - \frac{\gamma^4}{\delta^4}\right)}}$$

$$= \frac{\delta^4 - \gamma^2 \omega^2}{\gamma^3 \omega \pm \delta^2 \sqrt{\gamma^2 \omega^2 + \gamma^4 - \delta^4}}$$

FIGURES 26 through 28 show the behavior of $\alpha_v$ for various programmes $\omega$.

In general when the $B_z$ is programmed out, the $\alpha_v$ lies below the S curves (stable region). This is even so for the high $\beta$ case, which implies that the pinch can be well within the stable region during this phase of the cycle.

The insert curves in FIGURES 26 through 28 show the pressure on the pinch during the course of programming the $B_z$ to zero. The pressure drops below the internal pressure of the pinch during a small part of the program, but if the process is done rapidly, the expansion into the insulating walls should be small. A program $\omega$ of about .5 will be about optimum.

*Summary symbols in theory of stabilized pinch*

$p$ = material pressure at the plasma surface
$\rho$ = density
$\vec{v}$ = velocity of plasma
$\vec{B}$ = magnetic field
$\vec{E}$ = electric field
$\vec{j}$ = current density
$\vec{j}^*$ = sheet current density on surface of plasma
$\epsilon$ = charge density
$\epsilon^*$ = sheet charge density on surface of plasma
$\mu_0$ = permeability constant of space
$\kappa_0$ = dielectric constant of space
$\vec{\nabla}$ = vector operator
$t$ = time
$m$, $k$, and $w$ = characteristics constants
$\vec{n}$ = unit normal to the surface directed into plasma
$u$ = normal velocity of the plasma surface
$r$, $\theta$, $z$ = cylindrical coordinates
$p_0$ = initial plasma pressure
$\rho_0$ = initial plasma density
$c$, $s$, $h$, $\xi$, $\eta$, $\delta$, $S$, $x$, $\psi$, $y$, $\gamma$, $\alpha$ are constants
$H$ = Hankel function
$J$ = Bessel function
$R$ = perturbation of boundary surface or the coefficient of the exponential representing the perturbation
Subscript and superscript P refers to the space within the plasma
Subscript and superscript V refers to the space outside the plasma, i.e., in vacuum
Subscript $i$ refers to the volume within the pinch
Subscript $o$ refers to the volume outside the pinch
$y = Y = kr_0$
$\vec{e}_1$ = unit vector along field lines
$b$ = magnitude of the field
$\mathbb{P}$ = pressure tensor of the plasma
$\vec{\xi}$ = displacement of plasma
$P_i$ = pressure inside plasma
$E_0$ = energy of the particles in plasma
$\mu$ = direction cosine of velocity vector of particles with z-axis before displacement
$E_\perp$ = orbital energies perpendicular to field lines
$E_\parallel$ = orbital energies parallel to the field lines
$dl$ = element of length
$p_3$ = energy density per cubic centimeter in the plane perpendicular to the field
$\beta$ = the ratio of radius of the conductor to the radius of the pinch = $r_c/r_0$
$\alpha_v^2 = B_z^2$ (outside pinch)/$B_\theta^2$ (outside pinch)
$\alpha_p^2 = B_z^2$ (inside pinch)/$B_\theta^2$ (outside pinch) = $B_i^2/B_\theta^2 = B_p^2/B_\theta^2$
$B_\theta$ = self-constricting magnetic field due to longitudinal pinch current
$B_z$ = longitudinal magnetic field
$r_0$ = pinch radius at equilibrium
$r_c$ = radius of outer conductor
$r_g$ = inner radius of insulating container
$B_0$ = initial applied longitudinal field
$B_1 = B_p$ = longitudinal field inside pinch
$B_e = B_v$ = longitudinal field outside pinch
$\delta = r_c/r_g$

*Apparatus*

FIGURE 29 is a schematic drawing of the nuclear fusion reactor of the present invention wherein the details of the cooling apparatus are omitted in order to more clearly show the fundamental apparatus of the invention. The reactor of the present invention comprises a toroidal chamber 115 constructed from porcelain, quartz, or other insulating material. The toroidal chamber functions as the original container for the gas and is the volume within which the nuclear fusion reaction takes place. The toroidal chamber 115 is enclosed within a conducting shell 116 which is made from copper or other electrically conducting material. The conducting shell 116 is the electrical primary for creating the pinched plasma as described in detail hereinafter. The conducting shell 116 has a slot or discontinuity 117 which is defined by two electrically conductive ring plates 118 and 119 (girthing toroidal chamber 115 spaced apart with insulating material (not shown) between plates 118 and 119. Around the shell 116 a $B_z$ winding 120 is placed which is the longitudinal magnetic field winding and creates the longitudinal magnetic field within the plasma. One end 114 of the $B_z$ winding 120 is connected through lead 180 to a source of voltage 121, the other end, 122, of the winding 120 being connected to the plate 118 (see also FIG. 30). The $B_z$ source is also connected to the conducting shell 116, through lead 185, on the side opposite the connection 122, so that the shell 116 is the return conductor for the $B_z$ source 121. The $B_z$ winding 120 is a tube through which distilled water or other coolant is passed. FIGURE 30 shows a more detailed view of the outside of the nuclear fusion reactor of the present invention. The $B_z$ winding 120 has its end 122 connected to a heat exchanger (not shown) through lead 123. The heat exchanger is electrically insulated from the winding 120 and the source 121 to which it returns the coolant.

A gas inlet pipe 124 is provided to the toroidal chamber 115 and it is through inlet pipe 124 that the thermonuclear fuel, preferably a tritium-deuterium mixture of equal proportion, flows into the toroidal chamber 115.

A plurality of non-conducting coolant inlet pipes 125 (see FIG. 30) are connected to the conducting shell 116 for cooling the conducting shell and removing much of the heat created by the nuclear fusion reaction taking place within the toroidal chamber 115. Coolant inlet pipes 125 are connected through the conducting shell as is apparent from FIG. 31 to the coolant outlet pipes 126. FIGURE 31 is a cross-sectional view of the minor toroidal diameter taken along section A—A of FIG. 30. From this figure it is apparent that the coolant inlet pipes 125 are manifolded in two inlet manifolds 127 and 128, the coolant inlet manifolds being associated with the top and bottom halves of the split conducting shell 116. The conducting shell 116 is made in two parts insulated from each other in order to provide a non-conducting path for the $B_z$ field. The manifold 127 is connected through channel 129 in the conducting shell 116 to outlet manifold 130 from which electrically insulated outlet pipes 126 remove the heated water and/or steam to a common steam header for use in producing power. Manifold 128 is connected in a similar manner to outlet manifold 131, the bottom portion of FIG. 31 being symmetrically identical with the top portion shown.

The electrical insulator 132 separating the upper and lower portions of the conducting shell 116 need only be approximately ⅛-inch thick, since it must withstand the voltage of only one turn of the $B_z$ winding, both portions of the conducting shell 116 being connected to the same electrical source and therefore having the same applied voltage and current flow. The $B_z$ windings 120 are spaced from the conducting shell 116 by means of spacers 133 in order to provide room for the bolts 134 which hold the semicircular segments of the conducting shell 116 around the toroidal chamber 115. It should be noted that windings 120 need be insulated from the conducting shell 116 sufficient to withstand only the $B_z$ voltage.

Referring now to FIG. 32, which is a sectional view along line B—B of FIG. 31, the detailed arrangement of the components in the toroidal chamber is immediately apparent. The coolant (distilled water) is pumped through inlets 125 into the manifold 127, where it divides and enters a plurality of passages 140 defined by the reentrant walls 141 of manifold 127. These walls 141 are of insulating material, as is manifold 127 and inlets 125. The passages 140 are connected to openings 142 in the conducting shell 116. Openings 142 are connected to the channel 129 in the conducting shell 116. Thus water pumped into inlets 125 passes into the channel 129 and to the outlet manifold which is constructed in the same manner as the inlet manifold assembly described, and is not shown in detail.

Adjacent and within the conducting shell 116 is the toroidal chamber 115 which contains a non-conducting, hollow, wall-protecting chamber 135 arranged inside of the toroidal chamber 115. This chamber has a water inlet 136 passing through an opening 144 in the inlet manifold assembly, which connects to the channel 143 within the chamber 135 through which the coolant flows. The chamber 135 is constructed so that no large portion of the wall of the chamber 115 is exposed with respect to the center line 138 of the toroidal chamber 115. Further, the water inlet and outlet for chamber 135 are placed so that the water or other coolant passing through the channel 143 of chamber 135 travels completely around the inside of the toroidal chamber 115 to a point adjacent but spaced from the inlet point and is there connected to the outlet 137. The outlet 137 passes through gas outlet 139 of the toroidal chamber 115, the gas outlet 139 being located diametrically opposite the gas inlet 124. The non-conducting, hollow, wall-protecting chamber 135 is preferably constructed of insulating material and has distilled water running through it to carry away the heat deposited by the bremsstrahlung as described in more detail hereinafter.

Gas supply system

As stated hereinbefore, the present invention utilizes low density ionized gas to produce a thermonuclear reaction. This gas, preferably either deuterium, tritium or a mixture thereof, is supplied to the toroidal chamber 115 through gas inlet 124. The apparatus of FIG. 33 is connected to inlet pipe 124. The supply means consists of a gas supply tank 160 from which the pure thermonuclear fuel is passed through a pressure regulating valve 161. The regulated gas is then passed through a palladium leak 162. A lead pipe 163 is provided so that the palladium leak 162 may be evacuated before actual operation begins. A by-pass line 164 is provided through a normally closed valve 165 so that the entire vacuum system, as well as the toroidal chamber 115, can be flushed with gas directly from the gas supply system. The by-pass line 164, as well as the output of the palladium leak 162, are fed through gauge 166, and valve 167 to a terminal pipe which is connected to the inlet pipe 124. The gauge 166 indicates the various gauges that may be used in maintaining the proper amount of gas to be allowed to enter the reaction chamber 115.

Vacuum system

Connected to the gas outlet 139 is the vacuum system shown in FIG. 34. Since there must be a constant flow of gas through the toroidal chamber 115 to provide new fuel to sustain the nuclear fusion reaction taking place and to remove the reaction products, i.e., hydrogen, helium and to a limited extent tritium and $HE^3$, the outlet 139 from the reaction chamber is connected by pipe 169 to a flow control valve 170. This valve controls the aperture through which the drawn-off gas passes and thereby controls the rate of such flow. Attached to the control flow aperture of this valve is the vacuum system. This system consists of a large aperture stopcock 171, a liquid air trap 172, a two-stage mercury diffusion pump 173, and a standard motor driven vacuum pump 174 vented through outlet 175 to any convenient gas tight chamber. The reaction products confined in this chamber may then be separated in any manner known in the art. All the latter named elements are well-known in the art.

Initial ionization system

As pointed out hereinbefore, the operating characteristics of the present device require that the gas present in the toroidal reaction chamber be ionized before the actual operating cycle is begun. For this purpose a pre-operation gas ionizing R.F. system is provided. This R.F. system (see FIG. 35) consists of the following components. The master oscillator 145 feeds its output of from 5-10 megacycles into a frequency multiplier circuit 146. The output of the multiplier circuit, which has frequencies of from 5 to 110 megacycles, is amplified by power amplifier 147 which has a power output of many kilowatts. This amplifier output is fed through a coaxial cable 148 to a tuning circuit indicated generally at 149.

The above-indicated circuits, i.e., the master oscillator, frequency multiplier and power amplifier circuits, are diagrammatically indicated in FIG. 35, since their respective components and interconnections are well-known in the art.

The tuning circuit 149 consists of a tank circuit 150 having an impedance coil 151 in parallel with a variable capacitance 152. The tank circuit 150 is impedance coupled to the output of power amplifier 147. Thus, by means of variable capacitance 152, the tank circuit can be tuned to the R.F. output and will have the same frequency as the driving circuit.

The two leads 153 and 154 are the output of the tuning circuit 149, and are connected to semi-cylindrical capacitance electrodes 155 and 156, respectively. The electrode 155 is sealed within the tubular gas inlet pipe 124 (see FIG. 30). The second electrode 156 is sealed within the gas outlet pipe 139 which is located diametrically opposite to the first member (see FIG. 32). Electrode 156 constitutes the second plate of a capacitor, while electrode 155 constitutes the first plate. Thus, the capacitance between these two electrodes will ionize the gas present between them, i.e., the gas contained within the toroidal reaction chamber 115.

Primary circuits

The various electronic circuits associated with the nuclear fusion reactor of the present invention are shown schematically in FIGURE 36. Specifically the $B_z$ coil 120 is connected through lead 180 to the plate of ignitrons 181, two ignitrons in parallel being shown to indicate that a plurality of these tubes are required for the particular circuit. The cathode of each of these ignitrons is connected to a pole 182 of a double pole double throw motor operated switch indicated generally at 183. The associated pole 184 of each of these switches is connected through lead 185 to the conducting shell 116. The poles 182 are connected to a charging circuit 186 and to the opposite associated pole 187 of the switch 183. The poles 184 are connected to the associated opposite poles 188. The central poles 189 are connected to condensers 190. These condensers indicate a condenser bank having a capacitance of 1400 microfarads with a rating of 10 kv. At the operating condition of 5 kv. the total stored energy is $7 \times 10^4$ joules. The starter electrodes 191 are connected through switch 192 to a trigger voltage source 193. Lead 180 is connected through a voltage monitoring trigger circuit 174 by lead 195 to a firing circuit 196. Plate 118 of conducting shell 116 is connected to common lead 197 and plate 119 of conducting shell 116 is connected to common lead 222.

Stage I of the primary voltage circuit consists of spark gaps 198 having a triggering probe 199. The gaps 198 insulate the condensers 200, one side of the condensers 200 is connected to common lead 222, the other side of the condensers 200 being connected to one electrode of the spark gap 198. The other electrode of the spark gap is connected to common lead 197. The condensers 200 indicate a condenser bank having a total capacitance of 10 µf. at 100 kv. with a total stored energy of $10^5$ joules. The trigger probe 199 is connected inductively at 201 to the firing circuit 196. The condensers 200 are connected through leads 202 to a common charging circuit 203.

Stage II consists of ignitrons 204 having their plates connected to common lead 197 and their cathodes connected by leads 205 to a charging circuit 206. The cathodes are also connected to one side of condensers 207, the other sides of 207 being connected to common lead 222. The starter electrodes 208 of the ignitrons 204 are connected to a firing circuit 209 which is connected through lead 210 to a voltage monitoring trigger 211 which monitors the voltage on common lead 197 through lead 212.

Stage III of the primary voltage circuit consists of ignitrons 213 having their plates connected to common lead 197 and their cathodes connected through leads 214 to a common charging circuit 215. The cathodes are also connected to double pole double throw motor operated switches 216 which are connected in the same manner as switches 183 above described. The condensers 217 represent a condenser bank of 28,000 µf. at 20 kv. with a total stored energy of $5.6 \times 10^6$ joules. The starter electrodes 218 are connected to a common firing circuit 219 which is connected to a time delayed trigger 220 which is connected through lead 221 to the firing circuit 209. The common lead 197 is connected through circuit breaker 225 to lead 226 which is connected to the plates of ignitrons 227. The cathodes of ignitrons 227 are connected through leads 228 to a charging circuit 229. The cathodes of ignitrons 227 are also connected to double pole double throw motor driven switches 230 which are similar to the above described switches 183. The condensers 231 connected across the central poles 230 represent a bank of condensers having a total capacity of 10 f. at 500 volts with a total stored energy of $5 \times 10^5$ joules. The starter electrodes 232 of ignitrons 227 are connected to a voltage monitoring trigger 233 which is connected by lead 234 to secondary lead 235 which is connected to common lead 197. The voltage monitoring trigger 233 monitors the voltage on lead 235. The circuit breaker 225 is set to break the circuit at 500 volts by means of voltage monitoring trigger 236 which is connected to common lead 197 and to the circuit breaker 225.

The secondary lead 235 is connected to the plate of ignitron 237 and to a voltage monitoring trigger 238 which is connected through lead 239 to the starter electrode 240 of the ignitron 237. The cathode of ignitron 237 is connected through lead 241 to one side of a load (not shown), the other side of the load being connected to common lead 222.

Reactor statistics

Toroidal chamber:
　　Major diameter_____ 12½ in.
　　Minor diameter_____ 2⅛ in.
　　Wall thickness_____ ⅛ in.
　　Material_____ Porcelain.
Conducting shell:
　　Major diameter_____ 12½ in.
　　Thickness (total)_____ 1 in.
　　Width of channel 129_____ ¼ in.
　　Insulator 132, thickness_____ 1/16 in.
　　Material_____ Copper.
　　Discontinuity 117 (width)_____ ¼ in.
　　Coolant_____ Distilled water.
　　Coolant flow rate_____ 12 liters/sec.
　　Coolant inlet temperature_____ 20° C.
　　Coolant outlet temperature_____ ~100° C.
Primary pulse (stage I($C_1$)):
　　Voltage_____ 100 kv.
　　Length of time_____ 2.2 µsec.
　　Capacitance (total)_____ 10 µfd.
　　Total energy stored_____ $10^5$ joules.

*Reactor statistics*—Continued

Heating pulse (stage II ($C_2$)):
    Voltage _____ 500 μsec.
    Length of time applied____ 2 f.
    Capacitance (total) _____ 500 volts.
    Number of condensers____ 1000 at $2 \times 10^{-3}$ f. each.
    Total energy stored_____ $2.5 \times 10^5$ joules.
Pinching pulse (stage III):
    Voltage_____ 20 kv.
    Length of time applied_____ 622 μsec.
    Capacitance (total)_____ 28,000 μf.
    Number of condensers (20 kv.)__ 840 at 33 μf. each.
    Total energy stored_____ $5.6 \times 10^6$ joules.
Reaction pulse (stage IV ($C_4$)):
    Voltage_____ 500 volts.
    Length of time applied_____ ~.1 sec.
    Capacitance (total)_____ 10 f.
    Number of condensers (.5 kv.) 1000 at $10^{-2}$ f. each.
    Total energy stored_____ $5 \times 10^5$ joules.
$B_z$ winding:
    Material_____ Copper.
    Outside diameter_____ ¼ in.
    Inside diameter_____ ⅛ in.
    Coolant_____ Distilled water.
    Coolant flow rate_____ 150 cc./sec.
    Coolant inlet temperature_____ 20° C.
    Coolant outlet temperature_____ 70° C.
    Coolant outlet pressure_____ 100 p.s.i.
    Voltage_____ 5 kv.
    Field (initial)_____ 50 kilogauss.
    Capacitance of source (total)___ 1400 μf.
    Total energy stored_____ $7 \times 10^4$ joules.
Coolant chamber 135:
    Thickness (total)_____ 4 mm.
    Coolant channel thickness 2 mm.
    Electrical connections____ None.
    Coolant _____ Distilled water.
    Coolant flow_____ 200 cc./sec. (pressurized).
    Coolant inlet temperature 20° C.
    Coolant outlet temperature 70° C.
    Applied voltage_____ None.
Gas input rate_____ 1200 cc./sec. at 0.1 mm. Hg pressure.
Gas extraction rate 1200 cc./sec. at 0.1 mm. Hg pressure.
Gas pressure—Adjusted during operation to the lowest possible value to minimize cooling difficulties of lining, and minimize damage to porcelain liner, 100 microns or less.
Gas composition_____ 50% deuterium–50% tritium.
Pre-ionization
    Voltage_____ 5 kv.
    Frequency_____ 27 mm./cycles/sec.
Energy input
    (total/pulse) _____ 6 megajoules.
Energy output
    (total/pulse) _____ 17 megajoules.
Bremsstrahlung energy____ ~10% of total.
Neutron energy_____ ~75% of total.
Electrical energy_____ ~6% of total.
Heat_____ ~9% of total
Plasma current
    (maximum) _____ ~5 megamps.
Plasma temperature
    (maximum) _____ ~10 kev.

*Operation*

In preparing to operate the present device, a very high vacuum is first attained within the toroidal reaction chamber 115. The gas supply 160 is turned off by means of valve 161 and the palladium leak 162 (see FIG. 33) is evacuated through lead 163 to remove all contaminants in toroidal chamber 115.

The next operation is to close the lead 163, open the gas supply valve 161 and open valve 165 to permit the gas to by-pass the palladium leak 162 so that the gas supply system and the reaction chamber will be flushed with the gas to be used as the thermonuclear fuel. The flushing of the system is continued initially for a relatively long period of time to insure that all of the high Z reactants have been removed from the toroidal reaction chamber 115.

The by-pass valve 165 is then closed and the gas flow thereafter is regulated by the palladium leak 162 and valve 167 in such a manner that the stabilized pressure within the toroidal chamber 115 has a value of from 1 to 100 microns, preferably the order of 10 microns, prior to actual electrical operation. The palladium leak 162 will regulate the flow of gas into the supply system up to valve 167. The vacuum system (see FIG. 34) is capable of removing the gas at a much faster rate than the supply system is capable of supplying it. A variable aperture electrically operated valve 170 of any type well-known in the art of vacuum systems is provided so that the gas within the reaction chamber prior to electrical operation is maintained at a constant density of about $10^{15}$ particles per cc. (the order of 10 microns). Thus con-continual thermonuclear fuel flow through the chamber 115 during operation is employed.

The initial ionizing system is then energized, i.e., an R.F. field is created between the two electrodes 155 and 156. Since these electrodes are located between the two diametrically opposed gas inlet and outlet members 124 and 139 respectively, this field will be divided into two paths, each circumscribing one half circle. The gas within the reaction chamber 115 will be subject to this field, will be initially slightly ionized and is referred to hereinafter as the pre-ionizing stage.

In preparing the electrical circuit shown in FIG. 36 for operation, the condensers 190 of the circuit 121 are charged through charging circuit 186 by connecting poles 182 and 184 to poles 189. In this manner the condensers 190 will have a particular predetermined polarity.

Charging circuits 203, 206, 215 and 229 are energized and condensers 200, 207, 217 and 231 respectively, are charged to their rated capacity. It should be noted that condensers 217 and 231 will be charged with a particular polarity dependent upon switches 216 and 230 respectively. In general it may be stated that upon discharge of any one of the four stages of condensers the voltage on common lead 197 would be negative with respect to ground in the preferred embodiment. Stages I through IV are now ready for operation.

The various coolants supplied are now activated in the following manner. Distilled water used as a coolant in the preferred embodiment is passed through non-conducting coolant pipes 125, through coolant inlet manifold 127, around channel 129 through coolant outlet manifold 130 into nonconducting coolant outlet pipes 126. This coolant is passed through channel 129 at a rate of 12 liters/sec. and has an inlet temperature of 20° C. and an outlet temperature of 100° C. with the appropriate pressure on the inlet side. The $B_z$ winding 120 has distilled water passing through it at a rate of approximately 150 cc./sec. at an inlet temperature of 20° C. and an outlet temperature of 70° C. at 120 pounds pressure, and is passed into lead 123 around the toroidal shaped $B_z$ winding to a heat exchanger located external to the apparatus of the reactor. Chamber 135 is provided with a coolant through inlet 136 at an initial temperature of 20° C. at the appropriate pressure. The coolant passing through this chamber passes entirely around the torus to a point adjacent to inlet 136 where it flows out through outlet 137 at a temperature of approximately 70° C. This water then passes through a heat exchanger (not shown) and back into inlet 136.

Other coolant jackets may be provided with liquid metals, e.g., acting as a coolant which would substantially surround the entire reactor and carry away a large percentage of the energy being dissipated in the form of radiation of charged particles and neutrons. Liquid metal coolant may be preferable for the primary, both on account of the higher working temperature, and the more efficient heat transfer. It should be noted that no description has been made of the shielding facilities, port facilities or other personnel protecting apparatus which would normally surround a nuclear reactor. Such facilities could be of the type ordinarily required for a nuclear chain-reacting system, including special facilities the utilizing the copious supply of neutrons provided by the reactor of this invention. Furthermore, the neutrons produced in the reactor of this invention could be used for breeding purposes as has been disclosed in the above referenced co-pending application of James L. Tuck, Ser. No. 490,705, a disclosure of which has been incorporated herein by reference.

The reactor is now ready for initial operation. Switch 192 is closed thereby connecting trigger voltage source 193 to the starter electrodes 191 thereby making ignitrons 181 conducting and discharging condensers 190 through lead 180 winding 120 to connection 122 back through conducting shell 116 and through lead 185. When the voltage on lead 180 drops to zero, that is, when the $I_{B_Z}$ current is a maximum, the voltage monitoring trigger 194 will trigger firing circuit 196. The firing circuit 196 will pulse triggering electrodes 199 of spark gaps 198 through the inductive coupling 201 so that condensers 200 will discharge through spark gaps 198 and and apply the stage I potential to the conducting shell 116. When the voltage on common lead 197 drops to about 500 volts, the voltage monitoring trigger 211 will trigger firing circuit 209. Firing circuit 209 through starter electrodes 208 will make ignitrons 204 conducting and apply the voltage of condensers 207 through common leads 197 and 222 to conducting shell 116.

Firing circuit 209 also pulses time delay trigger 220 through lead 221 and at a predetermined time after condensers 207 have been discharged, firing circuit 219 will cause condensers 217 to be connected between ignitrons 213 to the common lead 197 thereby applying the potential of condensers 217 to the conducting shell 116.

The voltage monitoring trigger 233 which monitors the voltage on secondary lead 235 and on common lead 197 will, at the time the voltage from stage III reaches a value of 500 volts, trigger ignitrons 227 thereby applying the potential from condensers 231 across the common leads 197 and 222 and to the conducting shell 116. The circuit breaker 225 effectively isolates the stage IV condensers from any of the previous voltage applications and is closed only when voltage monitor 236 indicates that the voltage on common lead 197 is 500 volts. The sequence of events with respect to the gaseous discharge within the toroidal chamber 115, the conducting shell 116 and the $B_z$ winding 120 is graphically shown in FIGS. 37 and 38. In general since the gas within the reactor chamber 115 is ionized there are numerous free electrons within the gas. The flow of current through the conducting shell 116 will induce an electron flow within this gas. These electrons are the secondary electrical circuit for the primary electrical circuit for the conducting shell 116.

The induced current in the gas, i.e., the flow of the free electrons and ions within the gas, will pass around the toroidal chamber 115. As these electrons are accelerated, their energy is passed on to ions by collision. These collisions, as explained above, give rise to bremsstrahlung. Furthermore, the secondary current continues to increase during the presence of primary inducing current and reaches a maximum value by a multi-stage process greater than about 5 megamps. This large current flow will pinch or constrict in acordance with the above-described pinch effect. The electrons and the ions will be dragged towards the center of the toroidal chamber 115 so that a net space charge of zero will be maintained.

The exact sequence of operation with respect to the various stages of operation is shown in FIG. 37. The area shown by the bracket 247 is the pre-ionization stage and longitudinal magnetic field ($B_z$) application stage; 248 is referred to as the ionization and partial pinch stage or stage I; 249 is referred to as the joule heating stage or stage II; 250 is the adiabatic compression and heating stage or stage III; 251 is the intermixing heating stage or stage IV; and 252 is intermixing heating and $B_z$ recovery stage. In particular, the pre-ionization stage 247 includes the time during which the gas is partially ionized by the R.F. system as described above and terminates at the time when the curve of the $B_z$ field 254 has attained its maximum value 255, which in the presently disclosed device is approximately 50 kilogauss. This maximum is reached when the $B_z$ voltage has reached zero and the $I_{B_Z}$ is a maximum. At this maximum value 255 stage I of the primary voltage is discharged into the conducting shell 116 and the voltage pulse 256 (see FIG. 38) is impressed on the conducting shell 116. This pulse dissipates rapidly and after about 2 microseconds it has reached a value of 0.5 kv. at point 257. During this 2 microsecond pulse the discharge current curve 258 shows that the electrical current flowing within the gas has been raised to a value of approximately 700 kiloamps at point 259.

It is also apparent from the curve 260 (see FIG. 37) that the gas within the chamber 115 has a radius $R_0$ the same as the chamber 135 during the preionization stage 247, but during the primary voltage pulse 256 this radius $R_p$ is reduced by approximately 10 percent. This means that at the point 261 the plasma is no longer in contact with any physical member and is being held suspended in axial symmetry within the toroidal chamber 115. During this same primary voltage pulse of stage I the $B_z$ field curve 254 indicates that the field contained within the gas, which has been reduced in radius, is increased approximately 10 percent, as is indicated by point 262. This increase in the $B_z$ field inside of the pinch is apparent when it is considered that since field is measured by the number of lines of force per square centimeter, any action which reduces the area through which the field lines pass and which does not allow the field lines to escape, will have the effect of increasing the field line density. The current sheath as explained in detail hereinafter prevents the $B_z$ field from escaping.

The temperature of the gas is shown by curve 263. It is apparent from this curve that the temperature of the gas was essentially zero and that during the primary voltage pulse this temperature was raised to a value of 0.1 kv. When the primary voltage pulse reaches point 257, the second stage condensers are triggered and a joule heating stage is entered. Stage II maintains a voltage of about 0.5 kv. on the pinched discharge and, during this time, the discharge current curve 258 increases from 700 kiloamps to about 1 megamp, while the pinched radius curve 260, and the $B_z$ field curve 254 show essentially no change. However, during this time, which can be regulated from a minimum of about 100 microseconds to the order of 500 microseconds, the temperature of the plasma will be raised to a value of about 500 ev. at point 264.

By ordinary time delay methods described above the third stage of the primary voltage pulse is initiated after the pre-heating stage has been completed. Thus, at point 265 (see FIG. 38) the third stage of the condensers is discharged into the conducting shell 116 and has a total time lapse of approximately 620 microseconds with a maximum of —20 kv. During this stage the $B_z$ field inside of the pinch is raised from a value of 55 kilogauss to a value of 550 kilogauss at point 266. The discharge current which has reached a value of about 1 megamp is raised to a value of about 5 megamperes at point 267. The primary reason for this sudden increase is the fact that the pinched discharge radius has been reduced to a value one-third of its original radius $R_0$ at point 268, which means that the $B_z$ field inside will be raised by a factor of ten and that the temperature will attain values of 2 kev. at point 269. When the stage III pulse has been reduced in value to about 0.5 kv., point 270 the stage IV capacitance is connected to the primary circuit. At this time the fourth stage maintains a value of 0.5 kv. on the highly pinched plasma. The pinched plasma radius is maintained at about one-third its original value. However, the temperature shows a steady rise during the remainder of the pulse due to intermixing heating and reaches values of about 10 kev. The $B_z$ curve 254 (see FIG. 37) which has now attained a value of 550 kilogauss will then decrease steadily due to the diffusion of the $B_z$ field through the current sheath and the $B_\theta$ field surrounding the pinch, as is described in more detail hereinafter. At approximately one-tenth second or slightly less, the amount of energy due to the nuclear fusion reaction taking place within the pinched plasma will become greater than the amount of energy in the surrounding fields, so that the pinched plasma will start to expand, pushing the $B_z$ field through the external conducting shell 116 and re-inducing a voltage in the primary circuit. This re-induced voltage will be opposite in sign to the original voltage supplied on the outside and will be used to recharge the condenser of stages III and IV. Furthermore, this re-induced voltage will be about 10 percent larger than the applied voltage and therefore this excess of 10 percent can be drained off and constitutes a useful source of electrical energy generated directly by the device. Curve 272 shows the direction of this re-induced voltage.

It can be seen from FIG. 37 that the plasma is being compressed by a factor of 10 and that the compression followed by the intermixing is the means by which the temperatures of the order of 10 million ° C. are attained. It should also be noted that this compression is being attained by means of magnetic fields so that by the time the pinched plasma expands and comes in contact with the chamber 135 the temperatures reached by the walls during the heat transfer to the coolant stays below the melting point of ordinary materials.

FIGURE 39 is a time diagram showing the relative position of the pinched plasma with respect to chamber 135. The pre-ionization stage 247 is shown on the left of FIG. 39 with the stages 249, 250, 251 and 252 corresponding to those stages in FIGS. 37 and 38 shown in sequence to the right. At the point where stage 247 ends and stage 248, the ionization stage begins, i.e., upon the application of the primary voltage pulse 256, see FIG. 38, the gas is pulled away from the walls and a current sheath 273 is created which is essentially tubular in form and is the primary volume through which the current is flowing along the pinched discharge. At the end of stage 248 and during the joule heating stage 249 the radius of the pinched discharge is significantly reduced. It is during this stage that the tremendously high currents and temperatures are first attained. The adiabatic compression and heating stage 250 shows that the pinched discharge, which contains all of the $B_z$ lines which the full gas toroid originally contained, has been reduced to one-third its original radius $R_0$, which necessarily means that the gas contained within the current sheath 273 has been compressed by a factor of about ten.

A more meaningful picture in terms of the field lines is shown in FIG. 40, which shows diagrammatically the sequence of events with respect to the pinched discharge in terms of time. During the pre-ionization stage 247, the $B_z$ lines in the contained volume 274, i.e., contained within the chamber 135 which is in turn contained within the ceramic-walled chamber 115, are uniformly spaced across the volume as shown on the left of FIG. 40. Upon the application of the stage I pulse, i.e., during the ionization and partial pinch stage 248, the $B_z$ lines are compressed as indicated at 275. The volume 276 contains the $B_\theta$ field, which is created by the current flowing through the pinched gas in the direction of the $B_z$ field confined within the pinched gas. Thus, during stage 248 the $B_z$ field lines are compressed within the plasma and confined within the current sheath 273 and a field, determined by the righthand rule, is created in the volume 276 by the current flowing in the pinched discharge. At the point 265 at the end of stage 249 the stage III pulse further compresses the $B_z$ field within the pinch and a greater $B_\theta$ field is created in the volume 276 because of the increased current flow in the pinched plasma. After the point 270 the $B_\theta$ and $B_z$ fields interdiffuse, and in so doing, magnetic energy is converted into heating of the pinch still further, to bring the temperature up to a point where the thermonuclear reaction is energetically profitable.

FIGURE 41 shows the relation between the $B_\theta$ field at pinch and the $B_\theta$ field at the wall with respect to time. Thus, in FIG. 41 at point 257 (see FIG. 38 also) the $B_\theta$ field at the pinch has attained a slightly greater value than the $B_\theta$ at the wall, as shown by curves 278 and 279, which represent the $B_\theta$ field at the pinch and the $B_\theta$ field at the wall, respectively. At the point 265, i.e., the application of the stage III condensers, the $B_\theta$ field at the pinch, rises very much more rapidly than the $B_\theta$ field at the wall and attains values during stages 251 and 252 which are three times the values of the $B_\theta$ field at the wall. This is apparent since the radius of the pinch has been reduced to one-third its original value.

As can be seen from the right-hand portion of FIG. 37 at approximately 0.1 second the $B_z$ field leakage will become appreciable so that $B_\theta$ and $B_z$ no longer have the values required, as described above, for the pinch to be stable. It is important to arrange the operating voltages so that the pinch re-expands to the wall, and the electromagnetic energy is recovered, before the instability is fully developed, otherwise the electromagnetic energy is not recoverable directly, but appears as heat. See curves 287, 288 and 289. At the same time the radius of the pinched plasma will increase and the plasma will expand, coming in contact with chamber 135 which will carry away the heat produced upon contact. Thus it is apparent that one operating cycle will last approximately 0.1 second and that for half of this cycle the thermonuclear reaction is taking place and creating energy in the form of bremsstrahlung, neutrons and charged particles. The reacting plasma contains fusion products which are swept out into a gas recovery and purification system. Further since the various condensers of stages I through IV of the primary electrical system have been recharged to their full value by the reinduced voltage (see curve 272) the electrical system is likewise ready to operate. It should also be noted that during the interval between pulses the coolant system of the various components has been continually operating and has reduced the temperature of the various components to room temperature so that no large portion of the heat created in the previous cycle resides in the apparatus at the beginning of the next cycle. Thus the second cycle primary voltage pulse 256 can be applied and the second cycle of operation begun. In this manner the reactor is discontinuously operated with the thermonuclear reaction taking place at the latter portion of each operating cycle. Thus 0.1 sec. represents the energy generating cycle. The repetition of the cycle can in principle come immediately thereafter. In the preferred embodiment, 0.9 sec. is allowed after the energy generation is used to remove heat. Thus a one second period of operation is preferred.

In considering first the electricity generating phenomenon which takes place within the reacting gas, it will be remembered that in order to attain a pinched discharge a certain amount of work had to be done, i.e., a specific amount of energy was utilized in obtaining the pinch. After this pinch is obtained and the gas is heated to sufficiently high temperatures, a thermonuclear reaction takes place. This reaction liberates energized charged particles which were not present in free form before the reaction took place. The charged particles tend to expand against the action of the confining magnetic field. In so doing they perform work. This work expands the confining magnetic fields, and in so doing induces a secondary current in the primary coil. The work done on the external circuit during the expansion is greater than that required to obtain the pinch originally.

This will be apparent by considering the number and energy of the particles present in the reacting gas. In a mixture of deuterium and tritium gas the (T, D) reaction results in the production of alpha particles. These charged particles, which have high energies, will move radially outward against the constraining force of the magnetic field. The energy imparted to these particles will result from the thermonuclear reaction. Thus, since there is now present within the gas particles having a total energy greater than the energy deposited originally from the outside, i.e., the primary coil energy, more energy would be required in order to confine them. Since no such additional confiing energy is present, these particles will expand. However, these particles have very large energies, since a portion of the energy released in the (T, D) reaction is imparted to them. Thus, the total energy present within the magnetically confined gas is very much greater than was present before the thermonuclear reaction was attained. It follows, therefore, that the expansion of these charged particles against the magnetic field can put energy back into the primary which, if there were no irreversible processes would be equivalent to the work done originally to obtain the pinch, the local thermonuclear energy, i.e., excluding that carried away by neutrons. There are several irreversible processes which act to diminish the amount of energy returned by direct conversion: these are (1) electrical losses in conductors because of resistance, (2) diffusion of charged particles across the magnetic field, (3) interdiffusion of the magnetic fields.

Similarly, if the (D, D) reaction is considered, the ionized protons, tritons and $He^3$ liberated by the thermonuclear reaction taking place within the gas will likewise result in an induced electrical current within the primary. However, in this case, the starting temperature must be higher.

The magnitude of this electrical energy will depend upon the temperature present in the gas, the degree of pinch obtained, i.e., the amount of work required to escape against the magnetic forces, and the total energy of the particles. For the specific example given here, ten percent more energy will be reinduced in the primary circuit than was originally deposited there from outside.

The energy present which is not reflected in the form of induced current, i.e., about two-thirds, either raises the temperature of the gas or is lost to the outside in the form of neutrons and other escaping patricles. As to the former, i.e., the energy imparted to the gas thereby raising its temperature, when the pinch is lost through lateral displacement so that the symmetry of the gaseous discharge is disrupted, the heated gas will come into contact with the chamber 135 imparting a portion of its energy to the coolant therein. The coolant will thus be heated. The heated coolant is then passed through a heat exchanger so that the energy can be utilized.

The escaping particles, i.e., the protons, $He^3$, alpha particles, etc., will be absorbed either in the chamber 135 or its coolant thereby raising its temperature. The neutrons produced by the reaction taking place within the confined gas will be fast neutrons, i.e., they will have energies of from 2 to 14 m.e.v. Therefore, they will not be captured or reduced to thermal energies by the coolant or confining chamber, but will escape from the system. The escaping neutrons may be utilized in any conventional manner, for example, to produce fission in a uranium or lithium jacket thereby producing reaction products and heat, as is well-known in the art.

FIGURE 36 shows the manner in which the reinduced voltage and resulting current are utilized to recharge the condensers and to provide useful energy. When the reinduced voltage appears across common leads 197 and 222 condensers 200 and 207 will be charged up with the opposite polarity than they had during discharge. In the preferred embodiment charging circuits 203 and 206 are relied upon to overcome this opposite polarity and recharge these two stages in the same manner as they were originally charged. This can be done for stages I and II since the total energy stored is not too great. However, for stages III and IV the reversing switches 216 and 230 respectively are provided so that during the later portion of the energy producing cycle these condensers are charged to their full capacity by the expanding magnetic field and the excess over this amount is drained off through leads 222 and 241.

Specifically condensers 231 and 217 will be recharged. When the condensers 231 have been fully charged to 500 volts the circuit breaker 225 will disconnect stage IV from common lead 197. The reinduced voltage will continue to recharge condensers 217 until voltage monitoring trigger 238 triggers ignitron 237. Ignitron 237 is triggered when the voltage on leads 235 and 197 reach 20 kv. In this manner energy in excess of that required to recharge stages III and IV is drained off through leads 198 and 241 to be used for producing power in a load (not shown).

After stages III and IV are recharged the switches 216 and 230 (motor driven, automatic) reverse and the condensers are then connected in the circuit with the same polarity as initially charged.

The $B_z$ condensers 190 are only partially recharged in the same manner as condensers 217 and 231. Thus switches 183 are provided so that they can be fully recharged by charging circuit 186. The graph of $V_{B_z}$ in FIG. 38 shows that the reinduced voltage will recharge the condensers 190 to about 2.5 kv. so that 0.5 kv. will have to be supplied from charging circuit 186 during the resetting time of 0.9 sec.

In the heated, ionized gas, the electrons are interacting with the ions, i.e., the electrons are inelastically colliding with the ions. These collisions, although confined to the pinched gas, give rise to bremsstrahlung as explained above.

Bremsstrahlung is easily absorbed by the surrounding materials, particularly the coolant flowing through chamber 135 since the energies present are not large. This will result in the raising of the temperature of the liquid coolant.

This then represents one cycle of operation of the device. With a time interval of about one second, for example, between discharge of the capacitors and subsequent recharge by the re-induced voltage, the present device, although in the nature of a pulsed reactor, represents a virtually constant supply of easily usable energy.

After the initial cycle is completed, the resonant effect of the primary coil circuit (see FIG. 36) will induce another current in the secondary as represented in the present device by the highly ionized gas. Thus, since the electrical output of the reactor may be utilized to recharge the capacitors, the device will continue to run as long as fresh gas is added to the reaction chamber, the reaction particles are removed either by the vacuum system or by escape into the surrounding areas, and the surplus heat is removed from the reaction area.

The attainment of a thermonuclear reaction is a result of applying an inducing voltage to the ionized gas which is sufficient to induce a current in the gas greater than the value required to obtain a pinch effect. This voltage must be applied for a time sufficient to insure that much of the energy of the electrons is transferred by collision to the gas ions thereby raising the gas temperature.

Furthermore, the reaction taking place is not allowed to assume uncontrolled proportions because the density of the gas within the chamber is low, i.e., about $10^{14}$ or $10^{15}$ particles per cc. but not more than $10^{16}$ particles per cc., and the amount of thermonuclear fuel within the chamber upon which the pinch is acting will not sustain a thermonuclear reaction for an indefinite length of time. The utilization of low density gaseous thermonuclear fuels in the present device is the primary factor in controlling the rate of reaction within the chamber. Further control over the reaction taking place is present in the form of the electrical circuit connected to the primary coils. By merely disconnecting the energizing circuit for the primary coil or coils, the pinch effect will no longer be created in the gas, and therefore no thermonuclear reaction will take place.

It is therefore apparent that the present invention provides a method and apparatus for attaining and controlling a nuclear fusion reaction. Furthermore, means are provided whereby the energy released by the controlled thermonuclear reaction is converted into various forms of useful energy, i.e., heated matter, electricity or radiation by-products. It should be clear also that the operation of the device is not dependent on the direct recovery of electrical energy, since most of the energy output of the device appears as heat in the coolant.

While presently preferred embodiments of the invention have been described, it is clear that many other modifications may be made without departing from the scope of the invention. Therefore, the present invention is not limited by the foregoing description, but solely by the appended claims.

What is claimed is:

1. A device for manipulation of a plasma and production of neutrons and other radiations, comprising in combination a gas-tight toroidal insulating chamber containing a filling of ionizable gases, a conducting shell surrounding said chamber over substantially its full length but terminating in spaced apart ends, a coil wound about said chamber along the entire length to provide one end at each of said shell ends, a first D.C. power supply means adapted to discharge a current pulse, said first D.C. power supply means being connected between one end of the conducting shell and the adjacent coil end and the other end of the coil being connected to the adjacent end of the conducting shell, a second D.C. power supply means coupled between the spaced ends of said shell and adapted to initiate discharge of a current pulse through said shell after the current pulse from said first power supply means has reached its maximum current value, a third D.C. power supply means coupled between the spaced ends of said shell and adapted to initiate discharge of a current pulse after said second power supply means has initiated discharge of a current pulse and when the voltage across said shell ends drops below a pre-set level, a fourth power supply means connected across said shell ends and adapted to initiate discharge of a current pulse at a pre-set time interval after said third power supply has initiated discharge, a fifth power supply means coupled across the ends of said shell and adapted to initiate discharge of a current pulse after said fourth power supply means has initiated discharge and when the voltage across said shell drops below a pre-set level, each of said second, third, fourth and fifth D.C. power supply means being connected to discharge current in the same direction through said shell.

2. A device as described in claim 1, wherein each of said D.C. power supply means comprises a capacitor, a charging circuit for said capacitor, and each of said first, fourth and fifth D.C. power supply means comprises means for reversing the connection of the respective capacitor across the shell ends to prepare the device for another cycle of operation after each capacitor has been recharged by the reinduced voltage at the end of a cycle of operation.

3. A device as described in claim 2, wherein said fifth D.C. power supply means is connected to said shell ends through circuit breaker means adapted to disconnect said fifth power supply means after discharge and when a respective capacitor has recharged to a pre-set level, and load means connected across said fourth power supply means after the respective capacitor has been recharged to a pre-set voltage level by the reinduced voltage at the end of a cycle of operation.

References Cited in the file of this patent

UNITED STATES PATENTS 2,910,414      Sptizer      Oct. 27, 1959

OTHER REFERENCES

Nuclear Science and Engineering, I, 313–324 (1956), Edward Teller.

Review of Modern Physics, vol. 28, No. 3, July 1956, pp. 338–340, 344–349, 356–359, R. F. Post.

Journal of Applied Physics, vol. 28, No. 5, May 1957, pp. 519–521.

Physical Review, vol. 106, No. 3, May 1, 1957, pp. 404–412, W. H. Bostick.

Physical Review, vol. 107, No. 2, July 15, 1957, Kolb.

Nucleonics, February 1958, pp. 90, 91, 92, 93, 151, 152, 153, 154, 155.

Proceedings of the Second United Nations International Conference on the Peaceful Uses of Atomic Energy. Held in Geneva Sept. 1–Sept. 13, 1958. Vol. 32, United Nations, Geneva, 1958; pp. 34–39, 3, 4, 14, 15, 23, 40, 41, 100–105, 129–139, 431–439.

C. Breton et al.: Proceedings of the Third International Conference on Ionization Phenomena in Gases, Venice, June 1957, pp. 145–169.

Proc. Phys. Soc. of London, B 70 (1957), pp. 6–10, 49–51.

Nucleonics, August 1957, pp. 50–55. Page 900 of Physical Review, vol. III, No. 3, August 1, 1958.

Science, vol. 128, No. 3320, Aug. 15, 1958 (an article by Colgate and Furth), pp. 337–343.

Project Sherwood, by Amasa S. Bishop; Addison Wesley Publ. Co., Reading, Mass., 1958; page 189.